United States Patent
Fujinami et al.

(10) Patent No.: US 8,107,796 B2
(45) Date of Patent: Jan. 31, 2012

(54) DATA PROCESSING DEVICE, DATA PROCESSING METHOD, PROGRAM, PROGRAM RECORDING MEDIUM, DATA RECORDING MEDIUM, AND DATA STRUCTURE

(75) Inventors: Yasushi Fujinami, Tokyo (JP); Kuniaki Takahashi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1421 days.

(21) Appl. No.: 11/570,262

(22) PCT Filed: Jun. 3, 2005

(86) PCT No.: PCT/JP2005/010627
§ 371 (c)(1),
(2), (4) Date: Dec. 8, 2006

(87) PCT Pub. No.: WO2005/122566
PCT Pub. Date: Dec. 22, 2005

(65) Prior Publication Data
US 2008/0049138 A1 Feb. 28, 2008

(30) Foreign Application Priority Data
Jun. 11, 2004 (JP) ................................ 2004-174570

(51) Int. Cl.
*H04N 5/93* (2006.01)

(52) U.S. Cl. ................... 386/353; 386/E5.064; 348/515
(58) Field of Classification Search ................ 386/353, 386/E5.064; 348/515
See application file for complete search history.

(56) References Cited

U.S. PATENT DOCUMENTS
5,543,847 A * 8/1996 Kato ........................ 375/240.15

FOREIGN PATENT DOCUMENTS

| JP | 6-181569 | | 6/1994 |
|---|---|---|---|
| JP | 6 181569 | | 6/1994 |
| JP | 06181569 | A * | 6/1994 |
| JP | 8-251543 | | 9/1996 |
| JP | 8 251543 | | 9/1996 |
| JP | 2000-341640 | | 12/2000 |
| JP | 2000 341640 | | 12/2000 |

* cited by examiner

Primary Examiner — Thai Tran
Assistant Examiner — Girumsew Wendmagegn
(74) Attorney, Agent, or Firm — Oblon, Spivak, McClelland, Maier & Neustadt, L.L.P.

(57) ABSTRACT

Video data and output data that need to be output in synchronization therewith are synchronized. When an output of video data is later than an output of output data synchronized with the video data, at step S273, a process for one access unit is caused to be skipped. At step S275, it is determined whether the video data are referenced when other video data are decoded according to au_ref_flag of video data of the access unit whose process has been caused to be skipped. When the video data of the access unit whose process has been caused to be skipped are not referenced when the other video data are decoded, at step S277, the access unit whose process has been caused to be skipped is skipped. The present invention can be applied to for example a game device that uses a DVD.

6 Claims, 54 Drawing Sheets

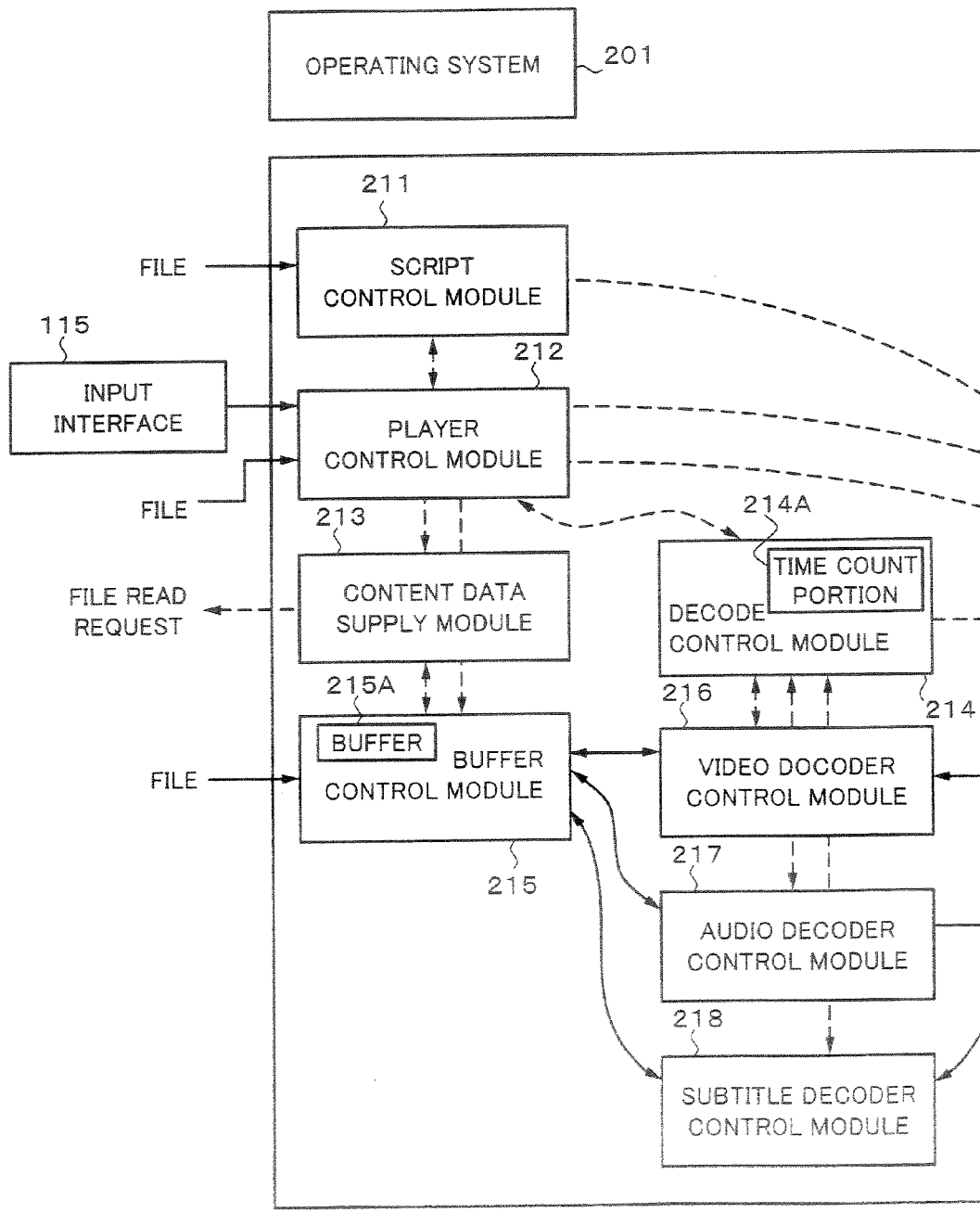

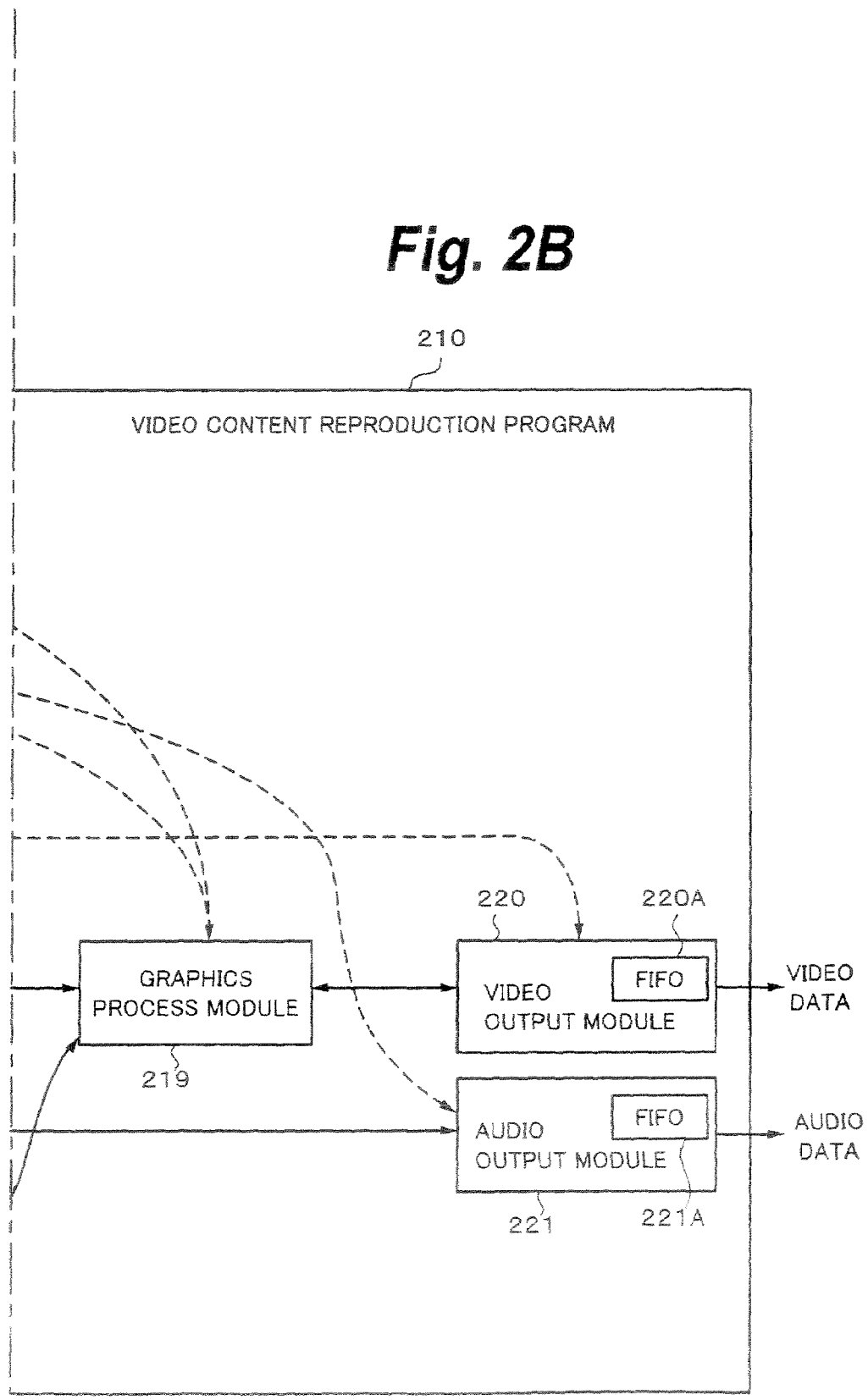

Fig. 5

| SYNTAX | NO. OF BITS | MNEMONIC |
|---|---|---|
| "PLAYLIST.DAT" { | | |
|   name_length | 8 | uimsbf |
|   name_string | 8x255 | bslbf |
|   number_of_PlayLists | 16 | uimsbf |
|   for (i=0;i<number_of_PlayLists;i++) { | | |
|     PlayList() { // A PlayList | | |
|       PlayList_data_length | 32 | uimsbf |
|       // ATTRIBUTE INFORMATION | | |
|       reserved_for_word_alignment | 15 | bslbf |
|       capture_enable_flag_PlayList | 1 | bslbf |
|       PlayList_name_length | 8 | uimsbf |
|       PlayList_name_string | 8*255 | bslbf |
|       // | | |
|       number_of_PlayItems | 16 | uimsbf |
|       for (i=0;i<number_of_PlayItems;i++) { | | |
|         PlayItem() | | |
|       } | | |
|       PlayListMark() | | |
|     } | | |
|   } | | |
| } | | |

Fig. 6

| SYNTAX | NO.OF BITS | MNEMONIC |
|---|---|---|
| PlayItem() { | | |
|   length | 16 | uimsbf |
|   Clip_Information_file_name_length | 16 | uimsbf |
|   Clip_Information_file_name | 8*Clip_Information_file_ name_length | bslbf |
|   IN_time | 32 | uimsbf |
|   OUT_time | 32 | uimsbf |
| } | | |

Fig. 7

| SYNTAX | NO.OF BITS | MNEMONIC |
|---|---|---|
| PlayListMark() { | | |
|   length | 32 | uimsbf |
|   number_of_PlayList_marks | 16 | uimsbf |
|   for (i=0; i < number_of_PlayList_marks; i++) { | | |
|     Mark() { | | |
|       mark_type | 8 | uimsbf |
|       mark_name_length | 8 | uimsbf |
|       ref_to_PlayItem_id | 16 | uimsbf |
|       mark_time_stamp | 32 | uimsbf |
|       entry_ES_stream_id | 8 | uimsbf |
|       entry_ES_private_stream_id | 8 | uimsbf |
|       mark_data | 32 | bslbf |
|       mark_name_string | 8*24 | bslbf |
|     } | | |
|   } | | |
| } | | |

Fig. 8

| mark_type | STREAM CODING |
|---|---|
| 0 | RESERVED |
| 1 | "Chapter" MARK |
| 2 | "Index" MARK |
| 3 | "Event" MARK |
| 4~255 | RESERVED |

Fig. 10

| SYNTAX | NO.OF BITS | MNEMONIC |
|---|---|---|
| XXXXX.CLP { | | |
|   presentation_start_time | 32 | uimsbf |
|   presentation_end_time | 32 | uimsbf |
|   reserved_for_word_alignment | 7 | bslbf |
|   capture_enable_flag_Clip | 1 | bslbf |
|   number_of_streams | 8 | uimsbf |
|   for (i=0; i < number_of_streams; i++) { | | |
|     StreamInfo() { | | |
|       length | 16 | uimsbf |
|       stream_id | 8 | uimsbf |
|       private_stream_id | 8 | uimsbf |
|       StaticInfo() | | |
|       reserved_for_word_alignment | 8 | bslbf |
|       number_of_DynamicInfo | 8 | uimsbf |
|       for (j=0; j < number_of_DynamicInfo; j++) { | | |
|         pts_change_point | 32 | uimsbf |
|         DynamicInfo() | | |
|       } | | |
|     } | | |
|   } | | |
|   EP_map() | | |
| } | | |

Fig. 11

| TYPE OF ELEMENTARY STREAM | stream_id | private_stream_id |
|---|---|---|
| VIDEO | 0xE0~0xEF | (NONE) |
| ATRAC AUDIO | 0xBD | 0x00~0x0F |
| LPCM AUDIO | 0xBD | 0x10~0x1F |
| SUBTITLE | 0xBD | 0x80~0x9F |

Fig. 12

| SYNTAX | NO. OF BITS | MNEMONIC |
|---|---|---|
| StaticInfo() { | | |
|   if(stream == VIDEO) { | | |
|     reserved_for_word_alignment | 16 | bslbf |
|     picture_size | 4 | uimsbf |
|     frame_rate | 4 | uimsbf |
|     reserved_for_word_alignment | 7 | bslbf |
|     cc_flag | 1 | bslbf |
|   }else if (stream == AUDIO) { | | |
|     audio_language_code | 16 | bslbf |
|     channel_configuration | 8 | uimsbf |
|     reserved_for_word_alignment | 3 | bslbf |
|     lfe_existence | 1 | bslbf |
|     sampling_frequency | 4 | uimsbf |
|   }else if (stream == SUBTITLE) { | | |
|     subtitle_language_code | 16 | bslbf |
|     reserved_for_word_alignment | 15 | bslbf |
|     configurable_flag | 1 | uimsbf |
|   } | | |
| } | | |

Fig. 13

| SYNTAX | NO.OF BITS | MNEMONIC |
|---|---|---|
| DynamicInfo(i,j) { | | |
|   reserved_for_word_alignment | 8 | bslbf |
|   if(stream == VIDEO ) { | | |
|     reserved_for_word_alignment | 4 | bslbf |
|     display_aspect_ratio | 4 | uimsbf |
|   } else if(stream == AUDIO ) { | | |
|     reserved_for_word_alignment | 4 | bslbf |
|     channel_assignment | 4 | uimsbf |
|   } else if(stream == SUBTITLE ) { | | |
|     reserved_for_word_alignment | 8 | bslbf |
|   } | | |
| } | | |

Fig. 14

| SYNTAX | NO. OF BITS | MNEMONIC |
|---|---|---|
| EP_map() { | | |
|   reserved_for_word_alignment | 8 | bslbf |
|   number_of_stream_id_entries | 8 | uimsbf |
|   for (k=0;k<number_of_stream_id_entries;k++) { | | |
|     stream_id | 8 | bslbf |
|     private_stream_id | 8 | bslbf |
|     number_of_EP_entries | 32 | uimsbf |
|     for (i=0;i<number_of_EP_entries;i++) { | | |
|       PTS_EP_start | 32 | uimsbf |
|       RPN_EP_start | 32 | uimsbf |
|     } | | |
|   } | | |
| } | | |

Fig. 15A

| TABLE 2-31, PROGRAM STREAM | | |
|---|---|---|
| SYNTAX | NO. OF BITS | MNEMONIC |
| MPEG2_program_stream() {<br>  do {<br>    pack()<br>  } while(nextbits() == pack_start_code)<br>  MPEG_program_end_code<br>} | <br><br><br><br>32 | <br><br><br><br>bslbf |

| TABLE 2-32, PROGRAM STREAM PACK | | |
|---|---|---|
| SYNTAX | NO. OF BITS | MNEMONIC |
| pack() {<br>  pack_header()<br>  while(nextbits()==packet_start_code_prefix) {<br>    PES_packet()<br>  }<br>} | | |

Fig. 15B

TABLE 2-33, PROGRAM STREAM PACK HEADER

| SYNTAX | NO. OF BITS | MNEMONIC |
|---|---|---|
| pack_header () { | | |
|   pack_start_code | 32 | bslbf |
|   '01' | 2 | bslbf |
|   system_clock_reference_base[32..30] | 3 | bslbf |
|   marker_bit | 1 | bslbf |
|   system_clock_reference_base[29..15] | 15 | bslbf |
|   marker_bit | 1 | bslbf |
|   system_clock_reference_base[14..0] | 15 | bslbf |
|   marker_bit | 1 | bslbf |
|   system_clock_reference_extension | 9 | uimsbf |
|   marker_bit | 1 | bslbf |
|   program_mux_rate | 22 | uimsbf |
|   marker_bit | 1 | bslbf |
|   marker_bit | 1 | bslbf |
|   reserved | 5 | bslbf |
|   pack_stuffing_length | 3 | uimsbf |
|   for (i=0;i<pack_stuffing_length;i++) { | | |
|     stuffing_byte | 8 | bslbf |
|   } | | |
|   if(nextbits()==system_header_start_code) { | | |
|     system_header () | | |
|   } | | |
| } | | |

TABLE 2-17, PES PACKET

| SYNTAX | NO. OF BITS | MNEMONIC |
|---|---|---|
| PES_packet () { | | |
|   packet_start_code_prefix | 24 | bslbf |
|   stream_id | 8 | uimsbf |
|   PES_packet_length | 16 | uimsbf |
|   if(stream_id !=program_stream_map | | |
|   && stream_id !=padding_stream | | |
|   && stream_id !=private_stream_2 | | |
|   && stream_id !=ECM | | |
|   && stream_id !=EMM | | |
|   && stream_id !=program_stream_directory | | |
|   && stream_id !=DSMCC_stream | | |

Fig. 16B

```
&& stream_id !=[ITU-T Rec. H.222.1 type E stream) [
 '10'                                              2    bslbf
 PES_scrambling_control                            2    bslbf
 PES_priority                                      1    bslbf
 data_alignment_indicator                          1    bslbf
 copyright                                         1    bslbf
 original_or_copy                                  1    bslbf
 PTS_DTS_flags                                     2    bslbf
 ESCR_flag                                         1    bslbf
 ES_rate_flag                                      1    bslbf
 DSM_trick_mode_flag                               1    bslbf
 additional_copy_info_flag                         1    bslbf
 PES_CRC_flag                                      1    bslbf
 PES_extension_flag                                1    bslbf
 PES_header_data_length                            8    uimsb-
 if (PTS_DTS_flags == '10' ) [
  '0010' 4 bslbf                                   4    bslbf
  PTS [32..30]                                     3    bslbf
  marker_bit                                       1    bslbf
  PTS [29..15]                                    15    bslbf
  marker_bit                                       1    bslbf
  PTS [14..0]                                     15    bslbf
  marker_bit                                       1    bslbf
]
```

Fig. 17A

| Fig. 17 |
|---|
| Fig. 17A |
| Fig. 17B |
| Fig. 17C |

TABLE 2-17, PES PACKET (CONTINUED)

| SYNTAX | NO. OF BITS | MNEMONIC |
|---|---|---|
| if(PTS_DTS_flags=='11') { | | |
|   '0011' | 4 | bslbf |
|   PTS[32..30] | 3 | bslbf |
|   marker_bit | 1 | bslbf |
|   PTS [29..15] | 15 | bslbf |
|   marker_bit | 1 | bslbf |
|   PTS [14..0] | 15 | bslbf |
|   marker_bit | 1 | bslbf |
|   '0001' | 4 | bslbf |
|   DTS [32..30] | 3 | bslbf |
|   marker_bit | 1 | bslbf |
|   DTS [29..15] | 15 | bslbf |
|   marker_bit | 1 | bslbf |
|   DTS [14..0] | 15 | bslbf |
|   marker_bit | 1 | bslbf |
| } | | |

*Fig. 17B*

```
if (ESCR_flag=='1') {
    reserved                    2     bslbf
    ESCR_base[32..30]           3     bslbf
    marker_bit                  1     bslbf
    ESCR_base[29..15]          15     bslbf
    marker_bit                  1     bslbf
    ESCR_base[14..0]           15     bslbf
    marker_bit                  1     bslbf
    ESCR_extension              9     uimsbf
    marker_bit                  1     bslbf
}
if(ES_rate_flag=='1') {
    marker_bit                  1     bslbf
    ES_rate                    22     uimsbf
    marker_bit                  1     bslbf
}
```

Fig. 17C

| | | |
|---|---|---|
| if(DSM_trick_mode_flag=='1') { | | |
|   trick_mode_control | 3 | uimsbf |
|   if(trick_mode_control==fast_forward ) { | | |
|     field_id | 2 | bslbf |
|     intra_slice_refresh | 1 | bslbf |
|     frequency_truncation | 2 | bslbf |
|   } | | |
|   else if(trick_mode_control==slow_motion ) { | | |
|     rep_cntrl | 5 | uimsbf |
|   } | | |
|   else if(trick_mode_control==freeze_frame ) { | | |
|     field_id | 2 | uimsbf |
|     reserved | 3 | bslbf |
|   } | | |
|   else if(trick_mode_control==fast_reverse ) { | | |
|     field_id | 2 | bslbf |
|     intra_slice_refresh | 1 | bslbf |
|     frequency_truncation | 2 | bslbf |
|   } | | |
|   else if(trick_mode_control==slow_reverse) { | | |
|     rep_cntrl | 5 | uimsbf |
|   } | | |
|   else reserved | 5 | bslbf |
| } | | |
| if( additional_copy_info_flag=='1') { | | |
|   marker_bit | 1 | bslbf |
|   additional_copy_info | 7 | bslbf |
| } | | |
| if( PES_CRC_flag=='1') { | | |
|   previous_PES_packet_CRC | 16 | bslbf |
| } | | |

TABLE 2-17, PES PACKET (CONCLUDED)

| SYNTAX | NO.OF BITS | MNEMONIC |
|---|---|---|
| if(PES_extension_flag=='1') { | | |
|   PES_private_data_flag | 1 | bslbf |
|   pack_header_field_flag | 1 | bslbf |
|   program_packet_sequence_counter_flag | 1 | bslbf |
|   P-STD_buffer_flag | 1 | bslbf |
|   reserved | 3 | bslbf |
|   PES_extension_flag_2 | 1 | bslbf |
|   if(PES_private_data_flag=='1') { | | |
|     PES_private_data | 128 | bslbf |
|   } | | |
|   if (pack_header_field_flag == '1') { | | |
|     pack_field_length | 8 | uimsbf |
|     pack_header () | | |
|   } | | |
|   if (program_packet_sequence_counter_flag == '1') { | | |
|     marker_bit | 1 | bslbf |
|     program_packet_sequence_counter | 7 | uimsbf |
|     marker_bit | 1 | bslbf |
|     MPEG1_MPEG2_identifier | 1 | bslbf |
|     original_stuff_length | 6 | uimsbf |
|   } | | |
|   if(P-STD_buffer_flag == '1') { | | |
|     '01' | 2 | bslbf |
|     P-STD_buffer_scale | 1 | bslbf |
|     P-STD_buffer_size | 13 | uimsbf |

*Fig. 18B*

| | | |
|---|---|---|
| `if( PES_extension_flag_2 == '1') {` | | |
| `    marker_bit` | 1 | bslbf |
| `    PES_extension_field_length` | 7 | uimsbf |
| `    for (i=0; i<PES_extension_field_length; i++) {` | | |
| `        reserved` | 8 | bslbf |
| `    }` | | |
| `}` | | |
| `for (i=0; i<N1; i++) {` | | |
| `    stuffing_byte` | 8 | bslbf |
| `}` | | |
| `for (i=0; i<N2; i++) {` | | |
| `    PES_packet_data_byte` | 8 | bslbf |
| `}` | | |
| `else if(stream_id == program_stream_map` | | |
| `    || stream_id == private_stream_2` | | |
| `    || stream_id == ECM` | | |
| `    || stream_id == EMM` | | |
| `    || stream_id == program_stream_directory` | | |
| `    || stream_id == DSMCC_stream` | | |
| `    || stream_id == ITU-T Rec.H.222.1 type E stream) {` | | |
| `    for (i=0; i<PES_packet_length; i++) {` | | |
| `        PES_packet_data_byte` | 8 | bslbf |
| `    }` | | |
| `}` | | |
| `else if(stream_id == padding_stream) {` | | |
| `    for (i=0; i<PES_packet_length; i++) {` | | |
| `        padding_byte` | 8 | bslbf |
| `    }` | | |
| `}` | | |

Fig. 19A

| Fig. 19 |
|---|
| Fig. 19A |
| Fig. 19B |

TABLE 2-18, stream_id ASSIGNMENTS

| stream_id | NOTE | STREAM CODING |
|---|---|---|
| 1011 1100 | 1 | program_stream_map |
| 1011 1101 | 2 | private_stream_1 |
| 1011 1110 | | padding_stream |
| 1011 1111 | 3 | private_stream_2 |
| 110x xxxx | | ISO/IEC 13818-3 or ISO/IEC 11172-3 or ISO/IEC 13818-7 or ISO/IEC 14496-3 audio stream number x xxxx |
| 1110 xxxx | | ITU-T Rec. H.262 | ISO/IEC 13818-2 or ISO/IEC 11172-2 or ISO/IEC 14496-2 video stream number xxxx |
| 1111 0000 | 3 | ECM_stream |
| 1111 0001 | 3 | EMM_stream |
| 1111 0010 | 5 | ITU-T Rec. H.222.0 | ISO/IEC 13818-1 Annex A or ISO/IEC 13818-6_DSMCC_stream |
| 1111 0011 | 2 | ISO/IEC_13522_stream |
| 1111 0100 | 6 | ITU-T Rec. H.222.1 type A |
| 1111 0101 | 6 | ITU-T Rec. H.222.1 type B |
| 1111 0110 | 6 | ITU-T Rec. H.222.1 type C |
| 1111 0111 | 6 | ITU-T Rec. H.222.1 type D |
| 1111 1000 | 6 | ITU-T Rec. H.222.1 type E |
| 1111 1001 | 7 | ancillary_stream |
| 1111 1010 | | ISO/IEC14496-1_SL-packetized_stream |
| 1111 1011 | | ISO/IEC14496-1_FlexMux_stream |
| 1111 1100 ... 1111 1110 | | reserved data stream |
| 1111 1111 | 4 | program_stream_directory |

Fig. 19B

The notation x means that the values '0' or '1' are both permitted and results in the same stream type. The stream number is given by the values taken by the x's.
NOTE 1: PES packets of type program_stream_map have unique syntax specified in 2.5.4.1.
NOTE 2: PES packets of type private_stream_1 and ISO/IEC_13552_stream follow the same PES packet syntax as those for ITU-T Rec. H.262 | ISO/IEC 13818-2 video and ISO/IEC 13818-3 audio streams.
NOTE 3: PES packets of type private_stream_2, ECM_stream and EMM_stream are similar to private_stream_1 except no syntax is specified after PES_packet_length field.
NOTE 4: PES packets of type program_stream_directory have a unique syntax specified in 2.5.5.5.
NOTE 5: PES packets of type DSM-CC_stream have a unique syntax specified in ISO/IEC 13818-6.
NOTE 6: This stream_id is associated with stream_type 0x09 in Table 2-29.
NOTE 7: This stream_id is only used in PES packets, which carry data from a Program Stream or an ISO/IEC 11172-1 System Stream, in a Transport Stream (refer to 2.4.3.7).

Fig. 20

| stream_id | STREAM CODING<br>( TYPE OF STREAM ) |
|---|---|
| 1011 1101 | private_stream_1 |
| 1011 1110 | padding_stream |
| 1011 1111 | private_stream_2 |
| 110x xxxx | AUDIO STREAM NUMBER x xxxx |
| 1110 xxxx | VIDEO STREAM NUMBER xxxx |

Fig. 21

| SYNTAX | NO. OF BITS | MNEMONIC |
|---|---|---|
| private_stream1_PES_payload() { | | |
|   private_header () { | | |
|     private_stream_id | 8 | uimsbf |
|     if(stream == ATRAC ){ | | |
|       reserved_for_future_use | 8 | bslbf |
|       AU_locator | 16 | uimsbf |
|     if(stream == LPCM ){ | | |
|       fs_flag | 1 | uimsbf |
|       reserved_for_future_use | 3 | bslbf |
|       ch_flag | 4 | uimsbf |
|       AU_locator | 16 | uimsbf |
|     }else if (stream == SUBTITLE ){ | | |
|       reserved_for_future_use | 8 | bslbf |
|       AU_locator | 16 | uimsbf |
|     } | | |
|   } | | |
|   private_payload() | | |
| } | | |

Fig. 22

| private_stream_id | STREAM CODING (TYPE OF STREAM) |
|---|---|
| 0000 xxxx | ATRAC AUDIO STREAM NUMBER xxxx |
| 0001 xxxx | LPCM STREAM NUMBER xxxx |
| 100x xxxx | SUBTITLE STREAM NUMBER x xxxx |

Fig. 23

| SYNTAX | NO. OF BITS | MNEMONIC |
|---|---|---|
| private_stream2_PES_payload() { | | |
| reserved_for_future_use | 8 | bslbf |
| video_stream_id | 8 | uimsbf |
| 1stRef_picture | 16 | uimsbf |
| 2ndRef_picture | 16 | uimsbf |
| 3rdRef_picture | 16 | uimsbf |
| 4thRef_picture | 16 | uimsbf |
| au_information() | | |
| VBI() | | |
| for (i=0; i<N1; i++) { | | |
| padding_word | 16 | bslbf |
| } | | |
| } | | |

Fig. 24

| SYNTAX | NO. OF BITS | MNEMONIC |
|---|---|---|
| au_information() { | | |
|   length | 16 | uimsbf |
|   reserved_for_word_alignment | 8 | bslbf |
|   number_of_access_unit | 8 | uimsbf |
|   for (i=0; i<number_of_access_unit; i++) { | | |
|     reserved | 4 | bslbf |
|     pic_struct_copy | 4 | uimsbf |
|     au_ref_flag | 1 | uimsbf |
|     reserved | 2 | bslbf |
|     AU_length | 21 | uimsbf |
|   } | | |
| } | | |

Fig. 25

| // "PLAYLIST.DAT" | | | | |
|---|---|---|---|---|
| number_of_PlayLists | | 2 | | |
| // PlayList() | | PlayList #0 | | PlayList #0 |
| capture_enable_flag_PlayList | | 1 | | 0 |
| number_of_PlayItems | | 2 | | 1 |
| // PlayItem #0 | | | | |
| Clip_Information_file_name | | "00001.CLP" | | "00003.CLP" |
| IN_time | | 180,090 | | 90,000 |
| OUT_time | | 27,180,090 | | 81,090,000 |
| // PlayItem #1 | | | | |
| Clip_Information_file_name | | "00002.CLP" | | |
| IN_time | | 90,000 | | |
| OUT_time | | 27,090,000 | | |

Fig. 26

| Fig. 26A |
|----------|
| Fig. 26B |

Fig. 26A

| | "00001.CLP" | | "00002.CLP" | |
|---|---|---|---|---|
| //Clip() | | | | |
| presentation_start_time | 90,000 | | 90,000 | |
| presentation_end_time | 27,990,000 | | 27,090,000 | |
| capture_enable_flag_Clip | 1 | | 0 | |
| number_of_streams | 4 | | 4 | |
| //stream #0 | StreamInfo() | | StreamInfo() | |
| stream_id | 0xE0 (video stream) | | 0xE0 (video stream) | |
| private_stream_id | 0x00 | | 0x00 | |
| | picture_size='720x480' | | picture_size='720x480' | |
| | frame_rate='29.97Hz' | | frame_rate='29.97Hz' | |
| | cc_flag='Yes' | | cc_flag='Yes' | |
| number_of_DynamicInfo | 0 | | 0 | |
| //stream #1 | StreamInfo() | | StreamInfo() | |
| stream_id | 0xBD (private_stream_1) | | 0xBD (private_stream_1) | |
| private_stream_id | 0x00 (ATRAC) | | 0x00 (ATRAC) | |
| | audio_language_code='Japanese' | | audio_language_code='Japanese' | |
| | channel_configuration='STEREO' | | channel_configuration='STEREO' | |
| | lfe_existence='NO' | | lfe_existence='NO' | |
| | sampling_frequency='48KHz' | | sampling_frequency='48KHz' | |
| number_of_DynamicInfo | 0 | | 0 | |

Fig. 26B

| | "00003.CLP" | |
|---|---|---|
| //Clip() | | |
| presentation_start_time | 90,000 | |
| presentation_end_time | 81,090,000 | |
| capture_enable_flag_Clip | 1 | |
| number_of_streams | 3 | |
| //stream #0 | StreamInfo() | |
| stream_id | 0xE0 (video stream) | |
| private_stream_id | 0x00 | |
| | picture_size='720x480' | |
| | frame_rate='29.97Hz' | |
| | cc_flag='No' | |
| number_of_DynamicInfo | 2 | |
| //stream #1 | StreamInfo() | |
| stream_id | 0xE1 (video stream) | |
| private_stream_id | 0x00 | |
| | picture_size='720x480' | |
| | frame_rate='29.97Hz' | |
| | cc_flag='No' | |
| number_of_DynamicInfo | 0 | |

Fig. 26B

| | StreamInfo() | StreamInfo() | StreamInfo() |
|---|---|---|---|
| // stream #2 | | | |
| stream_id | 0xBD(private_stream_1) | 0xBD(private_stream_1) | 0xBD(private_stream_1) |
| private_stream_id | 0x80(Subtitle) | 0x80(Subtitle) | 0x00(ATRAC) |
| | subtitle_language_code='Japanese' | subtitle_language_code='Japanese' | audio_language_code='Japanese' |
| | configurable_flag=0 | configurable_flag=0 | channel_configuration='STEREO' |
| | | | lfe_existence='NO' |
| | | | sampling_frequency='48KHz' |
| number_of_DynamicInfo | 0 | 0 | 3 |
| // stream #3 | | | |
| stream_id | 0xBD(private_stream_1) | 0xBD(private_stream_1) | |
| private_stream_id | 0x81(Subtitle) | 0x81(Subtitle) | |
| | subtitle_language_code='Japanese' | subtitle_language_code='Japanese' | |
| | configurable_flag=1 | configurable_flag=1 | |
| number_of_DynamicInfo | 0 | 0 | |

Fig. 27

| EP_map() for "00001.CLP" | | |
|---|---|---|
| number_of_stream_id_entries | 1 | |
| stream_id | 0xE0(video stream) | |
| private_stream_id | 0x00 | |
| | PTS_EP_start | RPN_EP_start |
| | 90000 | 0 |
| | 135045 | 244 |
| | 180090 | 305 |
| | 225135 | 427 |
| | 270180 | 701 |

Fig. 28

PlayListMark() OF PlayList #0
number_of_PlayList_marks==7

| Mark() | mark_type | ref_to_PlayItem_id | mark_time_stamp | entry_ES_stream_id | entry_ES_private_stream_id | mark_data | |
|---|---|---|---|---|---|---|---|
| #0 | Chapter | 0 | 180,090 | 0 | 0 | 1 | BEGINNING BEGINNING |
| #1 | Index | 0 | 5,580,090 | 0 | 0 | 1 | 1 MINUTE 1 MINUTE |
| #2 | Index | 0 | 10,980,090 | 0 | 0 | 2 | 2 MINUTES 2 MINUTES |
| #3 | Event | 0 | 16,380,090 | 0 | 0 | 0 | 3 MINUTES 3 MINUTES |
| #4 | Chpater | 1 | 90,000 | 0 | 0 | 2 | BEGINNING 5 MINUTES |
| #5 | Index | 1 | 5,490,000 | 0 | 0 | 1 | 1 MINUTE 6 MINUTES |
| #6 | Index | 1 | 10,890,000 | 0 | 0 | 2 | 2 MINUTES 7 MINUTES |

PlayListMark() OF PlayList #1
number_of_PlayList_marks==3

| Mark() | mark_type | ref_to_PlayItem_id | mark_time_stamp | entry_ES_stream_id | entry_ES_private_stream_id | mark_data | |
|---|---|---|---|---|---|---|---|
| #0 | Chapter | 0 | 90,000 | 0 | | 0 | BEGINNING |
| #1 | Event | 0 | 27,090,000 | 0xE0 | | 0 | 5 MINUTES |
| #2 | Event | 0 | 27,540,000 | 0xE1 | | 0 | 5 MINUTES 5SECONDS (305 SECONDS) |

Fig. 45

| SYNTAX | NO. OF BITS | MNEMONIC |
|---|---|---|
| private_stream2_PES_payload() { | | |
| reserved_for_future_use | 7 | bslbf |
| capture_enable_ps2 | 1 | uimsbf |
| video_stream_id | 8 | uimsbf |
| 1stRef_picture | 16 | uimsbf |
| 2ndRef_picture | 16 | uimsbf |
| 3rdRef_picture | 16 | uimsbf |
| 4thRef_picture | 16 | uimsbf |
| au_information() | | |
| grain_variance_information() | | |
| VB1() | | |
| for (i=0; i<N1; i++) { | | |
| padding_word | 16 | bslbf |
| } | | |
| } | | |

Fig. 46

| SYNTAX | NO. OF BITS | MNEMONIC |
|---|---|---|
| au_information() { | | |
|   length | 16 | uimsbf |
|   reserved_for_word_align | 8 | bslbf |
|   number_of_access_unit | 8 | uimsbf |
|   for (i=0;i<number_of_access_unit; i++) { | | |
|     reserved | 3 | bslbf |
|     capture_enable_flag_AU | 1 | uimsbf |
|     pic_struct_copy | 4 | uimsbf |
|     au_ref_flag | 1 | uimsbf |
|     reserved | 2 | bslbf |
|     AU_length | 21 | uimsbf |
|   } | | |
| } | | |

DATA PROCESSING DEVICE, DATA PROCESSING METHOD, PROGRAM, PROGRAM RECORDING MEDIUM, DATA RECORDING MEDIUM, AND DATA STRUCTURE

TECHNICAL FIELD

The present invention relates to a data processing apparatus a data processing method, a program, a program recording medium, a data recording medium, and a data structure. In particular, the present invention relates to those that allow data to be highly conveniently processed.

BACKGROUND ART

In recent years, as a recording medium that has a large storage capacity and that can be randomly accessed, for example a digital versatile disc (DVD) has been outspread. In addition, a DVD device that performs various processes with a DVD has been also outspread.

As DVD devices, there are a DVD recorder that records and reproduces data of television broadcast programs and so forth to and from a DVD, a car navigation system that uses a DVD on which map information and so forth have been recorded, reproduces the map information therefrom, and displays it, a game device that uses a DVD on which a game program and so forth have been recorded, reads the program therefrom, and executes it, and other devices.

The details of the DVD are described for example in Non-Patent Document 1, "DVD Specifications for Read-Only Disc Part 3; Version 1.1 December 1997".

A recording medium such as a DVD on which a large amount of data is recorded and a DVD device that uses it need to allow such a large amount of data to be highly conveniently processed.

DISCLOSURE OF THE INVENTION

The present invention is made from the foregoing point of view and an object of the present invention is to highly conveniently process data.

The present invention is a data processing apparatus that processes encoded data, the encoded data containing encoded video data obtained by encoding video data every a predetermined unit that is an access unit, output data that are output in synchronization with the video data, and utilization information immediately followed by at least one decode startable point of the encoded video data and utilized for decoding the encoded video data, the utilization information containing reference information that represents whether video data corresponding to the encoded video data of at least one access unit that are present from the utilization information to the next utilization information are referenced when other encoded video data are decoded, the data processing apparatus comprising first determination means for determining whether an output of the video data is later than an output of the output data, command means for causing a process for one access unit of the encoded video data to be skipped when the determined result of the first determination means represents that the output of the video data is later than the output of the output data, second determination means for determining whether the video data are referenced when other encoded video data are decoded corresponding to the reference information of the encoded video of the access unit whose process has been caused to be skipped by the command means, and skip control means for skipping the process of the encoded video data of the access unit whose process has been caused to be skipped by the command means when the second determination means has determined that video data corresponding to the encoded video data of the access unit whose process has been caused to be skipped by the command means are not referenced when the other encoded data are decoded.

The present invention is a data processing method of processing encoded data, the encoded data containing encoded video data obtained by encoding video data every a predetermined unit that is an access unit, output data that are output in synchronization with the video data, and utilization information immediately followed by at least one decode startable point of the encoded video data and utilized for decoding the encoded video data, the utilization information containing reference information that represents whether video data corresponding to the encoded video data of at least one access unit that are present from the utilization information to the next utilization information are referenced when other encoded video data are decoded, the data processing method comprising the steps of: determining whether an output of the video data is later than an output of the output data; causing a process for the encoded video data of one access unit to be skipped when the determined result at the first determination step represents that the output of the video data is later than the output of the output data; determining whether the video data are referenced when other encoded video data are decoded corresponding to the reference information of the encoded video of the access unit whose process has been caused to be skipped at the command step; and skipping the process of the encoded video data of the access unit whose process has been caused to be skipped at the command step when it has been determined at the second determination step that video data corresponding to the encoded video data of the access unit whose process has been caused to be skipped at the command step are not referenced when the other encoded video data are decoded.

The present invention is a program that causes a computer to execute a data process of processing encoded data the encoded data containing encoded video data obtained by encoding video data every a predetermined unit that is an access unit, output data that are output in synchronization with the video data, and utilization information immediately followed by at least one decode startable point of the encoded video data and utilized for decoding the encoded video data, the utilization information containing reference information that represents whether video data corresponding to the encoded video data of at least one access unit that are present from the utilization information to the next utilization information are referenced when other encoded video data are decoded, the program comprising the steps of: determining whether an output of the video data is later than an output of the output data; causing a process for the encoded video data of one access unit to be skipped when the determined result at the first determination step represents that the output of the video data is later than the output of the output data; determining whether the video data are referenced when other encoded video data are decoded corresponding to the reference information of the encoded video of the access unit whose process has been caused to be skipped at the command step; and skipping the process of the encoded video data of the access unit whose process has been caused to be skipped at the command step when it has been determined at the second determination step that video data corresponding to the encoded video data of the access unit whose process has been caused to be skipped at the command step are not referenced when the other encoded video data are decoded.

The present invention is a program recording medium on which a program has been recorded the program causing a computer to execute a data process of processing encoded data, the encoded data containing encoded video data obtained by encoding video data every a predetermined unit that is an access unit, output data that are output in synchronization with the video data, and utilization information immediately followed by at least one decode startable point of the encoded video data and utilized for decoding the encoded video data, the utilization information containing reference information that represents whether video data corresponding to the encoded video data of at least one access unit that are present from the utilization information to the next utilization information are referenced when other encoded video data are decoded, the program comprising the steps of: determining whether an output of the video data is later than an output of the output data; causing a process for the encoded video data of one access unit to be skipped when the determined result at the first determination step represents that the output of the video data is later than the output of the output data; determining whether the video data are referenced when other encoded video data are decoded corresponding to the reference information of the encoded video of the access unit whose process has been caused to be skipped at the command step; and skipping the process of the encoded video data of the access unit whose process has been caused to be skipped at the command step when it has been determined at the second determination step that video data corresponding to the encoded video data of the access unit whose process has been caused to be skipped at the command step are not referenced when the other encoded video data are decoded.

The present invention is a data recording medium on which encoded data have been recorded the encoded data containing encoded video data obtained by encoding video data every a predetermined unit that is an access unit, output data that are output in synchronization with the video data and utilization information immediately followed by at least one decode startable point of the encoded video data and utilized for decoding the encoded video data the utilization information containing reference information that represents whether video data corresponding to the encoded video data of at least one access unit that are present from the utilization information to the next information are referenced when other encoded video data are decoded.

The present invention is a data structure of an encoded data, the encoded data containing encoded video data obtained by encoding video data every a predetermined unit that is an access unit, output data that are output in synchronization with the video data, and utilization information immediately followed by at least one decode startable point of the encoded video data and utilized for decoding the encoded video data, the utilization information containing reference information that represents whether video data corresponding to the encoded video data of at least one access unit that are present from the utilization information to the next utilization information are referenced when other encoded video data are decoded.

In a data processing apparatus, a data processing method, a program, and a program recorded on a program recording medium of the present invention, utilization information is immediately followed by at least one decode startable point of encoded video data, the utilization information containing reference information that represents whether video data corresponding to the encoded video data of at least one access unit that are present from the utilization information to the next utilization information are referenced when other encoded video data are decoded. It is determined whether an output of the video data is later than an output of the output data. A process for the encoded video data of one access unit is caused to be skipped when the determined result represents that the output of the video data is later than the output of the output data. It is determined whether the video data are referenced when other encoded video data are decoded corresponding to the reference information of the encoded video of the access unit whose process has been caused to be skipped. The process of the encoded video data of the access unit whose process has been caused to be skipped is skipped when it has been determined that video data corresponding to the encoded video data of the access unit whose process has been caused to be skipped are not referenced when the other encoded video data are decoded.

In a data recording medium and a data structure of the present invention, encoded data contains encoded video data obtained by encoding video data every a predetermined unit that is an access unit, output data that are output in synchronization with the video data, and utilization information immediately followed by at least one decode startable point of the encoded video data and utilized for decoding the encoded video data, the utilization information containing reference information that represents whether video data corresponding to the encoded video data of at least one access unit that are present from the utilization information to the next utilization information are referenced when other encoded video data are decoded.

According to the present invention, data can be highly conveniently processed. In particular, video data and output data that need to be output in synchronization therewith can be easily synchronized.

BRIEF DESCRIPTION OF DRAWINGS

FIG. 2A and FIG. 2B are block diagrams showing an example of the structure of a software module group that a CPU 112 executes;

FIG. 5 is a schematic diagram showing the syntax of a file "PLAYLIST.DAT";

FIG. 6 is a schematic diagram showing the syntax of PlayItem( );

FIG. 7 is a schematic diagram showing the syntax of PlayListMark( );

FIG. 8 is a schematic diagram showing the relationship of the value of mark_type and the type of Mark( );

FIG. 10 is a schematic diagram showing the syntax of a clip information file Clip( );

FIG. 11 is a schematic diagram showing the relationship of stream_id, private_stream_id, and elementary streams identified thereby;

FIG. 12 is a schematic diagram showing the syntax of StaticInfo( );

FIG. 13 is a schematic diagram showing the syntax of DynamicInfo( );

FIG. 14 is a schematic diagram showing the syntax of EP_map( );

FIG. 15A and FIG. 15B are schematic diagrams showing the syntax of a program stream a program stream pack, and a program stream pack header of the MPEG-2 system;

FIG. 16A and FIG. 16B are schematic diagrams showing the syntax of a PES_packet of the MPEG-2 system;

FIG. 17, FIG. 17B and FIG. 17C are schematic diagrams showing the syntax of the PES_packet of the MPEG-2 system;

FIG. 18A and FIG. 18B are schematic diagrams showing the syntax of the PES_packet of the MPEG-2 system;

FIG. 19A and FIG. 19B are schematic diagrams showing the relationship of the value of stream_id of PES_packet( ) and the attribute (type) of an elementary stream of the MPEG-2 system;

FIG. 20 is a schematic diagram showing stream_id that the disc device uses;

FIG. 21 is a schematic diagram showing the syntax of private_stream1_PES_payload( );

FIG. 22 is a schematic diagram showing the relationship of the value of private_stream_id and the attribute of an elementary stream stored in private_payload( );

FIG. 23 is a schematic diagram showing the syntax of private_stream2_PES_payload( );

FIG. 24 is a schematic diagram showing the syntax of au_information( );

FIG. 25 is a schematic diagram showing a specific example of a file "PLAYLIST.DAT";

FIG. 26A and FIG. 26B are schematic diagrams showing specific examples of clip information files "00001.CLP," "00002.CLP," and "00003.CLP";

FIG. 27 is a schematic diagram showing a specific example of EP_map( ) of a clip information file "00001.CLP";

FIG. 28 is a schematic diagram showing specific examples of PlayListMark( )'s of PlayList#0 and PlayList#1;

FIG. 45 is a schematic diagram showing other syntax of private_stream2_PES_payload( ); and FIG. 46 is a schematic diagram showing other syntax of au_information( ).

BEST MODES FOR CARRYING OUT THE INVENTION

Figure 1:
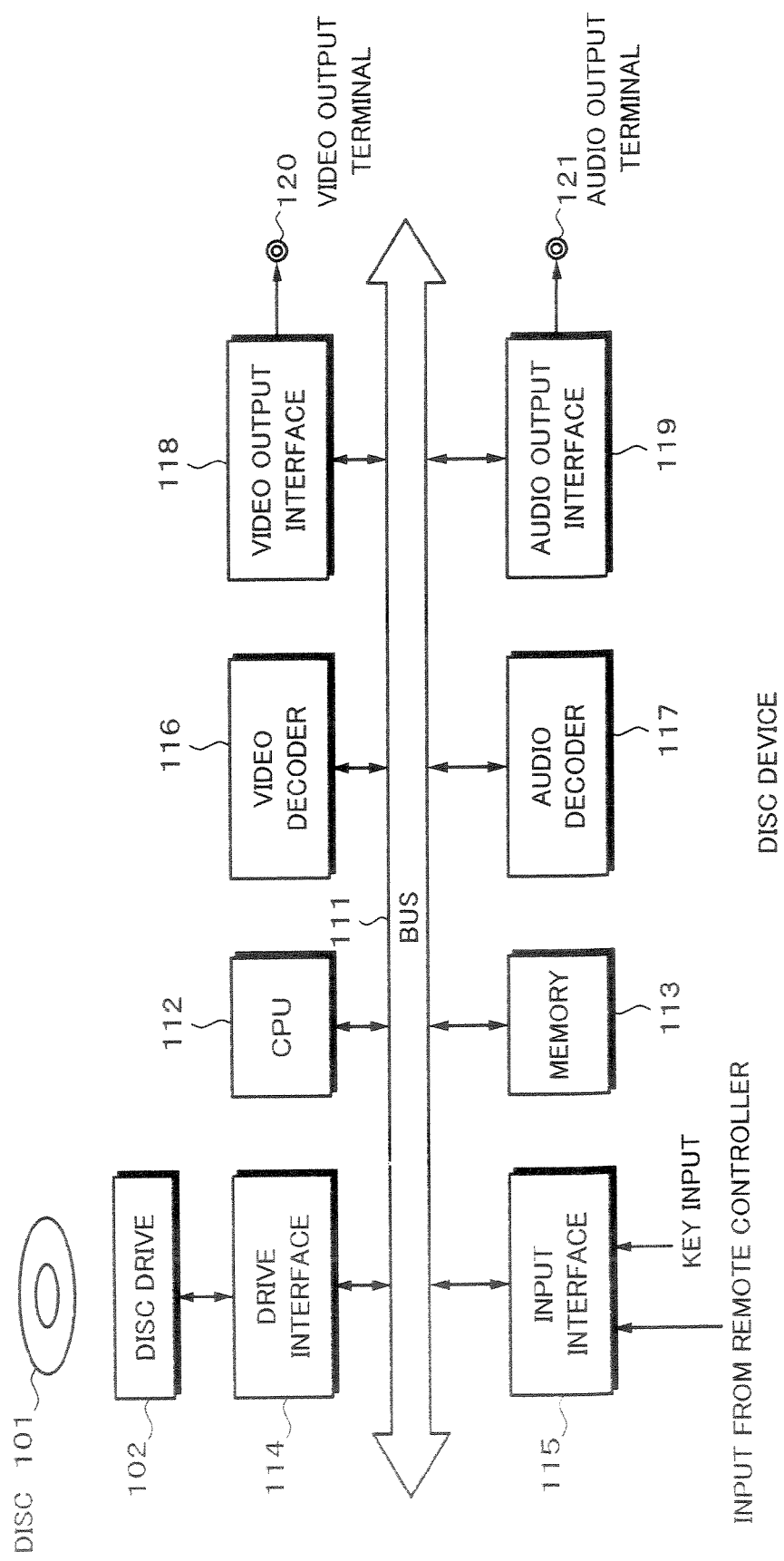
FIG. 1 is a block diagram showing an example of the structure of hardware of a disc device according to the present invention.

Next, embodiments of the present invention will be described. The relationship between elements of claims and embodiments is as follows. The relationship represents that specific examples that support the invention set forth in claims are described in embodiments. Thus, even if some specific examples are not described in elements of claims it is not implied that the specific examples do not correspond to the elements of the claims. Conversely, even if specific examples are described as counterparts or elements of claims in this section, it is not implied that these specific examples do not correspond to other than the elements of the claims.

In this section, it is not implied that all aspects of the invention corresponding to specific examples described in the embodiments of the present invention are set forth in the claims. In other words, the description in this section corresponds to specific examples described in the embodiments of the present invention. Thus, the description in this section does not deny that there are aspects of the present invention that are not set forth in the claims of the present patent application and that divisional patent applications may be made and/or additional aspects of the present invention may be added as amendments.

A data processing apparatus as set forth in claim 1 is a data processing apparatus (for example, a disc device shown in FIG. 1) that processes encoded data, the encoded data containing:

encoded video data obtained by encoding video data every a predetermined unit that is an access unit, output data that are output in synchronization with the video data, and utilization information (for example, private_stream_2_PES_payload( ) shown in FIG. 23) immediately followed by at least one decode startable point of the encoded video data and utilized for decoding the encoded video data, the utilization information containing reference information (for example, au_ref_flag shown in FIG. 24) that represents whether video data corresponding to the encoded video data of at least one access unit that are present from the utilization information to the next utilization information are referenced when other encoded video data are decoded, the data processing apparatus comprising:

first determination means (for example, a decode control module 214, shown in FIG. 2A and FIG. 2B, that performs a process at step S272 shown in FIG. 39) for determining whether an output of the video data is later than an output of the output data;

command means (for examples a decode control module 214, shown in FIG. 2A and FIG. 2B, that performs a process at step S273 shown in FIG. 39) for causing a process for the encoded video data of one access unit to be skipped when the determined result of the first determination means represents that the output of the video data is later than the output of the output data;

second determination (for example, a decode control module 214, shown in FIG. 2A and FIG. 2B, that performs a process at step S275 shown in FIG. 39) means for determining whether the video data are referenced when other encoded video data are decoded correspond in to the reference information of the encoded video of the access unit whose process has been caused to be skipped by the command means; and skip control means (for example, a video decoder control module 216, shown in FIG. 2A and FIG. 2B, that performs a process at step S277 shown in FIG. 39) for skipping the process of the encoded video data of the access unit whose process has been caused to be skipped by the command means when the second determination means has determined that video data corresponding to the encoded video data of the access unit whose process has been caused to be skipped by the command means are not referenced when the other encoded data are decoded.

The data processing apparatus as set forth in claim 2, further comprising:

output control means (for example, a video decoder control module 216, shown in FIG. 2A and FIG. 2B, that performs a process at step S279 shown in FIG. 39) for continuously outputting the video data when the first determination means has determined that the output of the output data is later than the output of the video data.

Figure 39:
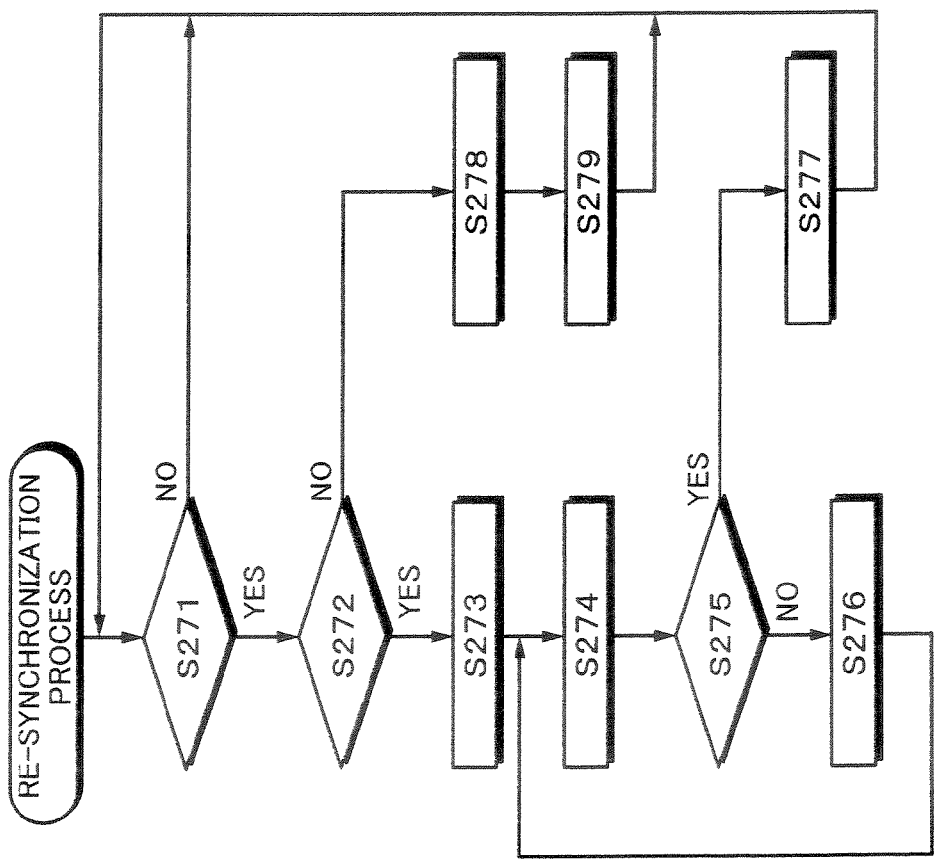
FIG. 39 is a flow chart describing a re-synchronization process.

A data processing method as set forth in claim 3 is a data processing method of processing encoded data, the encoded data containing encoded video data obtained by encoding video data every a predetermined unit that is an access unit, output data that are output in synchronization with the video data, and utilization information (for example, private_stream_2_PES_payload( ) shown in FIG. 23) immediately followed by at least one decode startable point of the encoded video data and utilized for decoding the encoded video data, the utilization information containing reference information (for example, au_ref_flag shown in FIG. 24) that represents whether video data corresponding to the encoded video data of at least one access unit that are present from the utilization information to the next utilization information are referenced when other encoded video data are decoded, the data processing method comprising the steps of:

determining whether an output of the video data is later than an output of the output data (for example, step S272 shown in FIG. 39);

causing a process for the encoded video data of one access unit to be skipped when the determined result at the first determination step represents that the output of the video data is later than the output of the output data (for example, step S273 shown in FIG. 39);

determining whether the video data are referenced when other encoded video data are decoded corresponding to the reference information of the encoded video of the access unit whose process has been caused to be skipped at the command step (for example, step S275 shown in FIG. 39); and skipping the process of the encoded video data of the access unit whose process has been caused to be skipped at the command step when it has been determined at the second determination step that video data corresponding to the encoded video data of the access unit whose process has been caused to be skipped at the command step are not referenced when the other encoded video data are decoded (for example, step S277 shown in FIG. 39).

A program as set forth in claim 4 and a program recorded on a program recording medium as set forth in claim 5 is a program that causes a computer to execute a data process of processing encoded data, the encoded data containing:

encoded video data obtained by encoding video data every a predetermined unit that is an access unit, output data that are output in synchronization with the video data, and utilization information (for example, private_stream_2_PES_payload( ) shown in FIG. 23) immediately followed by at least one decode startable point of the encoded video data and utilized for decoding the encoded video data, the utilization information containing reference information (for example, au_ref_flag shown in FIG. 24) that represents whether video data corresponding to the encoded video data of at least one access unit that are present from the utilization information to the next information are referenced when other encoded video data are decoded, the program comprising the steps of:

determining whether an output of the video data is later than an output of the output data (for example, step S272 shown in FIG. 39);

causing a process for the encoded video data of one access unit to be skipped when the determined result at the first determination step represents that the output of the video data is later than the output of the output data (for example, step S273 shown in FIG. 39);

determining whether the video data are referenced when other encoded video data are decoded corresponding to the reference information of the encoded video of the access unit whose process has been caused to be skipped at the command step (for example, step S275 shown in FIG. 39); and skipping the process of the encoded video data of the access unit whose process has been caused to be skipped at the command step when it has been determined at the second determination step that video data corresponding to the encoded video data of the access unit whose process has been caused to be skipped at the command step are not referenced when the other encoded video data are decoded (for example, step S277 shown in FIG. 39).

A data recording medium as set forth in claim 6 is a data recording medium on which encoded data have been recorded, the encoded data containing:

encoded video data obtained by encoding video data every a predetermined unit that is an access unit, output data that are output in synchronization with the video data, and utilization information (for example, private_stream_2_PES_payload( ) shown in FIG. 23) immediately followed by at least one decode startable point of the encoded video data and utilized for decoding the encoded video data, the utilization information containing reference information (for example, au_ref_flag shown in FIG. 24) that represents whether video data corresponding to the encoded video data of at least one access unit that are present from the utilization information to the next utilization information are referenced when other encoded video data are decoded.

Next, with reference to the accompanying drawings, embodiments of the present invention will be described.

[Hardware Structure]

FIG. 1 is a block diagram snowing an example of the structure of hardware of a disc device according to an embodiment of the present invention.

The disc device shown in FIG. 1 can be applied to for example a disc players a game device, a car navigation system, and so forth.

In the disc device shown in FIG. 1, a disc 101 is an optical disc such as a DVD, a magneto-optical discs a magnetic discs or the like. Content data such as video data, audio data, and subtitle data and additional data necessary to reproduce those data are recorded on the disc 101.

When necessary, data recorded on the disc 101 (referred to as record data) include a program that can be executed by a computer. According to the embodiment of the present invention, as a recording medium, the disc 101 that is a disc-shaped recording medium is used. Alternatively, the recording medium may be for example a semiconductor memory or a tape-shaped recording medium. Data that are read from the disc 101 at a remote location may be transmitted and input to the disc device shown in FIG. 1. In other words, data can be read from the disc 101 by another device connected to the disc device. The data that are read by the other device can be received and processed by the disc device. In addition, the disc device can receive data from a server or the like that stores data similar to those recorded on the disc 101 through a network such as the Internet and process the received data. In addition, the disc device can also receive data from another device such as a server or the like, record the received data to the disc 101, and then process the data recorded to the disc 101.

The disc 101 can be loaded and unloaded to and from a disc drive 102. The disc drive 102 has a build-in interface (not shown). The disc drive 102 is connected to a drive interface 114 through the built-in interface. The disc drive 102 drives the disc 101 reads data from the disc 101 in accordance with for example a read command, and supplies the data to the drive interface 114.

Connected to a bus 111 are a central processing unit (CPU) 112, a memory 113, a drive interface 114, an input interface 115, a video decoder 116, an audio decoder 117, a video output interface 118 and an audio output interface 119.

The CPU 112 and the memory 113 compose a computer system. In other words, the CPU 112 executes a software module group that is a program stored in the memory 113 to control the entire disc device and perform various processes that will be described later. The memory 113 also stores the software module group that the CPU 112 executes. In addition, the memory 113 temporarily stores data necessary to operate the CPU 112. The memory 113 can be composed of only a non-volatile memory or a combination of a volatile memory and a non-volatile memory. When the disc device shown in FIG. 1 has a hard disk to which the software module group is recorded (installed) that the CPU 112 executes, the memory 113 can be composed of only a non-volatile memory.

The program (software module group) that the CPU 112 executes can be pre-recorded (stored) in the memory 113 as a recording medium that is built in the disc device.

Alternatively, the program can be temporarily or permanently stored (recorded) to the disc 101 or a removable recording medium such as a flexible disc, a compact disc read-only memory (CD-ROM), a magneto-optical (MO) disc, a magnetic disc, or a memory card. The removable recording medium may be provided as so-called package software.

The program can be pre-stored in the memory 113 or installed from an above-described removable recording medium to the disc device. Alternatively, the program may be wirelessly transferred from a download site to the disc device through a satellite for a digital satellite broadcast or non-wirelessly transferred to the disc device through a local area network (LAN) or a network such as the internet. The disc device receives the program through the input interface 115 and installs the program to the built-in memory 113.

The program may be executed by one CPU or distributively executed by a plurality of CPUs.

The drive interface 114 controls the disc drive 102 under the control of the CPU 112. The disc drive 102 supplies data that are read from the disc 101 to the CPU 112, the memory 113, the video decoder 116, and the audio decoder 117 through the bus 111.

The input interface 115 receives signals corresponding to user's operations of keys (buttons) and a remote controller (not shown) and supplies the signals to the CPU 112 through the bus 111. The input interface 115 also functions as a communication interface for a modem (including an asymmetric digital subscriber line (ADSL) modem), a network interface card (NIC), or the like.

The video decoder 116 decodes encoded video data (encoded audio data) that have been read from the disc 101 by the disc drive 102 and supplied to the video decoder 116 through the drive interface 114 and the bus 111 and supplies the decoded video data to the CPU 112 and the video output interface 118 through the bus 111.

The audio decoder 117 decodes encoded audio data that have been read from the disc 101 by the disc drive 102 and supplied to the audio decoder 117 through the drive interface 114 and the bus 111 and supplies the encoded audio data to the CPU 112 and the audio output interface 119 through the bus 111.

The video output interface 118 performs a predetermined process for the video data supplied through the bus 111 and outputs the processed video data from a video output terminal 120. The audio output interface 119 performs a predetermined process for the audio data supplied through the bus 111 and outputs the processed audio data from an audio output terminal 121.

The video output terminal 120 is connected to a video output device such as a cathode ray tube (CRT) or a liquid crystal panel (not shown). Thus, the video data that are output from the video output terminal 120 are supplied to the video output device and displayed thereby. The audio output terminal 121 is connected to audio output devices such as a speaker and an amplifier knot shown). Thus the audio data that are output from the audio output terminal 121 are supplied to the audio output devices and output thereby.

Video data and audio data can be wirelessly or non-wirelessly supplied from the disc device to the video output device and the audio output devices.

[Structure of Software Module Group]

FIG. 2A and FIG. 2B show an example of the structure of the software module group that the CPU 112 shown in FIG. 1 executes.

The software module group that the CPU 112 executes is mainly categorized as an operating system (OS) 201 and a video content reproduction program 210 as an application program.

[Operating System 201]

When the disc device is turned on, the operating system 201 gets started (the CPU 112 executes the operating system 201), performs predetermined processes such as initial settings, and calls the video content reproduction program 210, which is an application program.

The operating system 201 provides infrastructural services such as a file read service to the video content reproduction program 210. In other words, the operating system 201 provides a service that operates the disc drive 102 through the drive interface 114 against a file read request received from the video content reproduction program 210, reads data from the disc 101, and provides services to the video content reproduction program 210. In addition, the operating system 201 also interprets the file system.

The operating system 201 has a function of a multitask process. In other words, the operating system 201 can simultaneously (apparently) operate a plurality of software modules on time sharing basis. In other words, although the video content reproduction program 210 is composed of several software modules they can be operated in parallel.

[Video Content Reproduction Program 210]

The video content reproduction program 210 is composed of a script control module 211, a player control module 212, a content data supply module 213, a decode control module 214, a buffer control module 215, a video decoder control module 216, an audio decoder control module 217, a subtitle decoder control module 218, a graphics process module 219, a video output module 220, and an audio output module 221.

The video content reproduction program 210 is software that performs a key role of the reproduction of data from the disc 101. When the disc 101 is loaded (inserted) into the disc drive 102, the video content reproduction program 210 checks whether the disc 101 is a disc on which a content has been recorded in a predetermined format (that will be described later). The video content reproduction program 210 reads a script file (that will be described later) from the disc 101, executes the script, reads a meta data (database information) file necessary to reproduce a content from the disc 101, and controls the reproduction of the content according to the mete data.

Next, the software module that composes the video content reproduction program 210 shown in FIG. 2A and FIG. 2B will be described. In FIG. 2A and FIG. 2B, in general, solid line arrow marks represent content data, whereas dotted line arrow marks represent control data.

[Script Control Module 211]

The script control module 211 interprets and executes a script program (script) recorded on the disc 101. A script program can describe operations such as "operate the graphics process module 219 to create an image such as a menu and display it," "change a menu display corresponding to a signal supplied from a user interface (UI) such as a remote controller (for example, to move a cursor on a menu)," and "to control the player control module 212."

[Player Control Module 212]

The player control module 212 references meta data (database information) and so forth recorded on the disc 101 to control the reproduction of a content recorded on the disc 101. In other words, the player control module 212 analyzes PlayList( ) and Clip( ) recorded on the disc 101 and controls the content data supply module 213, the decode control module 214, and the buffer control module 215 corresponding to the analyzed results. In addition, the player control module 212 performs a stream change control that changes a stream to be reproduced corresponding to commands received from the script control module 211 and the input interface 115 as will be described later. In addition, the decode control module 214 obtains a time from the decode control module 214, displays the time, and performs a process for a mark (Mark( )) (that will be described later).

[Content Data Supply Module 213]

The content data supply module 213 requests the operating system 201 to read content data, meta data, and so forth from the disc 101 under the control of the player control module 212 or according to the amount of data stored in the buffer control module 215.

The meta data and so forth that the operating system 201 has read from the disc 101 in accordance with the request received from the content data supply module 213 are supplied to predetermined modules. On the other hand, the content data that the operating system 201 has read from the disc 101 corresponding to the request received from the content data supply module 213 are supplied to the buffer control module 215.

[Decode Control Module 214]

The decode control module 214 controls the operations of the video decoder control module 216, the audio decoder control module 217, and the subtitle decoder control module 218 under the control of the play control module 212. The decode control module 214 has a time count portion 214A that counts a time. The decode control module 214 manages the synchronization of an output of video data that are output under the control the video decoder control module 216 and an output of data that are synchronized with the video data. In this case, an output of data to be synchronized with an output of video data is audio data that are output under the control of the audio decoder control module 217

[Buffer Control Module 215]

The buffer control module 215 has a buffer 215A as a part of a storage area of the memory 113 shown in FIG. 1. The content data supply module 213 temporarily stores content data read from the disc 101 to the buffer 215A corresponding to a request received from the operating system 201.

In addition, the buffer control module 215 supplies data stored in the buffer 215A to the video decoder control module 216, the audio decoder control module 217, or the subtitle decoder control module 218 in accordance with a request received from the video decoder control module 216, the audio decoder control module 217, or the subtitle decoder control module 218, respectively.

In other words, the buffer control module 215 has a video read function portion 233, an audio read function portion 234, and a subtitle read function portion 235 that will be described later in FIG. 3. The video read function portion 233 of the buffer control module 215 processes a data request received from the video decoder control module 216 to supply data stored in the buffer 215A to the video decoder control module 216. Likewise, the audio read function portion 234 in the buffer control module 215 processes a request received from the audio decoder control module 217 to supply data stored in the buffer 215A to the audio decoder control module 217. The video read function portion 233 in the buffer control module 215 processes a request received from the subtitle decoder control module 218 to supply data stored in the buffer 215A to the subtitle decoder control module 218.

[Video Decoder Control Module 216]

The video decoder control module 216 operates the video read function portion 233 (FIG. 3) of the buffer control module 215 to read encoded video data one video access unit at a time from the buffer 215A of the buffer control module 215 and supply the video data to the video decoder 116 shown in FIG. 1. In addition, the video decoder control module 216 controls the video decoder 116 to decode data one video access unit at a time. In addition, the video decoder control module 216 supplies video data decoded by the video decoder 116 to the graphics process module 219.

One video access unit is for example one picture (one frame or one field) of video data.

[Audio Decoder Control Module 217]

The audio decoder control module 217 operates an audio read function portion 234 (FIG. 3) of the buffer control module 215 to read encoded audio data one audio access unit at a time from the buffer 215A of the buffer control module 215 and supplies the encoded audio data to the audio decoder 117 shown in FIG. 1. The audio decoder control module 217 controls the audio decoder 117 to decode the encoded audio data one audio access unit at a time. In addition, the audio decoder control module 217 supplies audio data decoded by the audio decoder 117 to the audio output module 221.

One audio access unit is a predetermined amount of audio data (for example, an amount of data that are output in synchronization with one picture). According to this embodiments it is assumed that one audio access unit is a predetermined fixed length

[Subtitle Decoder Control Module 218]

The subtitle decoder control module 218 operates the subtitle read function portion 235 (FIG. 3) of the buffer control module 215 to read encoded subtitle data one subtitle access unit at a time from the buffer 215A of the buffer control module 215. In additions the subtitle decoder control module 218 has subtitle decode software (not shown). The subtitle decode software decodes data read from the buffer 215A. The subtitle decoder control module 218 supplies the decoded subtitle data (image data of a subtitle) to the graphics process module 219.

One subtitle access unit is a predetermined amount of subtitle data (for example, an amount of data that are output in synchronization with one picture). According to this embodiment, it is assumed that the size of one subtitle access unit is described at the beginning thereof.

[Graphics Process Module 219]

The graphics process module 219 enlarges or reduces subtitle data received from the subtitle decoder control module 218 under the control (corresponding to a command) of the player control module 212 and adds (overlays) the enlarged or reduced subtitle data to video data received from the video decoder control module 216. The graphics process module 219 enlarges or reduces the size (image frame) of the video data that have been added to the subtitle data so that the frame size of the added (overlaid) video data matches the screen of the video output device connected to the video output terminal 120 shown in FIG. 1. The added (overlaid) video data are output to the video output module 220.

In addition, the graphics process module 219 generates a menu, a messages and so forth corresponding to commands (under the control) of the script control module 211 and the player control module 212 and overlays the menu, message, and so forth with the output video data.

In addition, the graphics process module 219 converts the aspect ratio of video data that are output to the video output module 220 corresponding to the aspect ratio of the video output device connected to the video output terminal 120 shown in FIG. 1 and information that represents the aspect ratio of the video data recorded on the disc 101.

In other words, when the aspect ratio of the video output device is 16:9, if information that represents the aspect ratio of video data is 4:3, the graphics process module 219 performs a squeeze (reduction) process for video data that are output to the video output module 220 in the lateral (horizontal, direction, causes the left and right ends of the video data to be black, and outputs the resultant video data. When the aspect ratio of the video output device is 4:3, if information that represents the aspect ratio of video data is 16:9, the graphics process module 219 performs a squeeze (reduction) process for video data that are output to the video output module 220 in the longitudinal (vertical) direction, causes the upper and lower ends of the video data to be black, and outputs the resultant video data.

When the aspect ratio of the video output device and the aspect ratio that the information represents for the video data are the same, for example 4:3 or 16:9, the graphics process module 219 outputs non-squeezed video data to the video output module 220.

In addition, the graphics process module 219 captures video data that are being processed corresponding to a request received from for example the player control module 212. Moreover, the graphics process module 219 stores the captured video data or supplies the video data to the player control module 212.

[Video Output Module 220]

The video output module 220 exclusively occupies a part of the memory 113 shown in FIG. 1 as a first-in first-out (FIFO) 220A (buffer) and temporarily stores video data received from the graphics process module 219. In addition, the video output module 220 frequently reads video data from the FIFO 220A and outputs the video data to the video output terminal 120 (FIG. 1).

[Audio Output Module 221]

The audio output module 221 exclusively occupies a part of the memory 113 shown in FIG. 1 as a FIFO 221A (buffer) and temporarily stores audio data received from the audio decoder control module 217 (audio decoder 117). In addition, the audio output module 221 frequently reads audio data from the FIFO 221A and outputs the audio data to the audio output terminal 121 (FIG. 1).

In addition, when audio data received from the audio decoder control module 217 are dual (bilingual) mode audio data that have left and right channels of "main audio" data and "sub audio" data, the audio output module 221 outputs the audio data received from the audio decoder control module 217 to the audio output terminal 121 corresponding to a predesignated audio output mode.

In other words, if the "main sound" has been designated as an audio output mode, the audio output module 221 copies the left channel of audio data received from the audio decoder control module 217 as the right channel of audio data and outputs the left and right channel of audio data ("main audio" data) to the audio output terminal 121. If "sub audio" has been designated as an audio output mode, the audio output module 221 copies the right channel of audio data received from the audio decoder control module 217 as the left channel and outputs the left and right channel ("sub audio" data) to the audio output terminal 121. If both "main and sub audios" have been designated as an audio output mode, the audio output module 221 directly outputs audio data received from the audio decoder control module 217 to the audio output terminal 121.

If audio data received from the audio decoder control module 217 are stereo mode audio data, the audio output module 221 directly outputs the audio data received from the audio decoder control module 217 to the audio output terminal 121 regardless of what audio output mode has been designated.

The user can interactively designate an audio output mode on a screen for a menu generated by the video content reproduction program 210 with the remote controller.

[Structure of Buffer Control Module 215]

Figure 3:
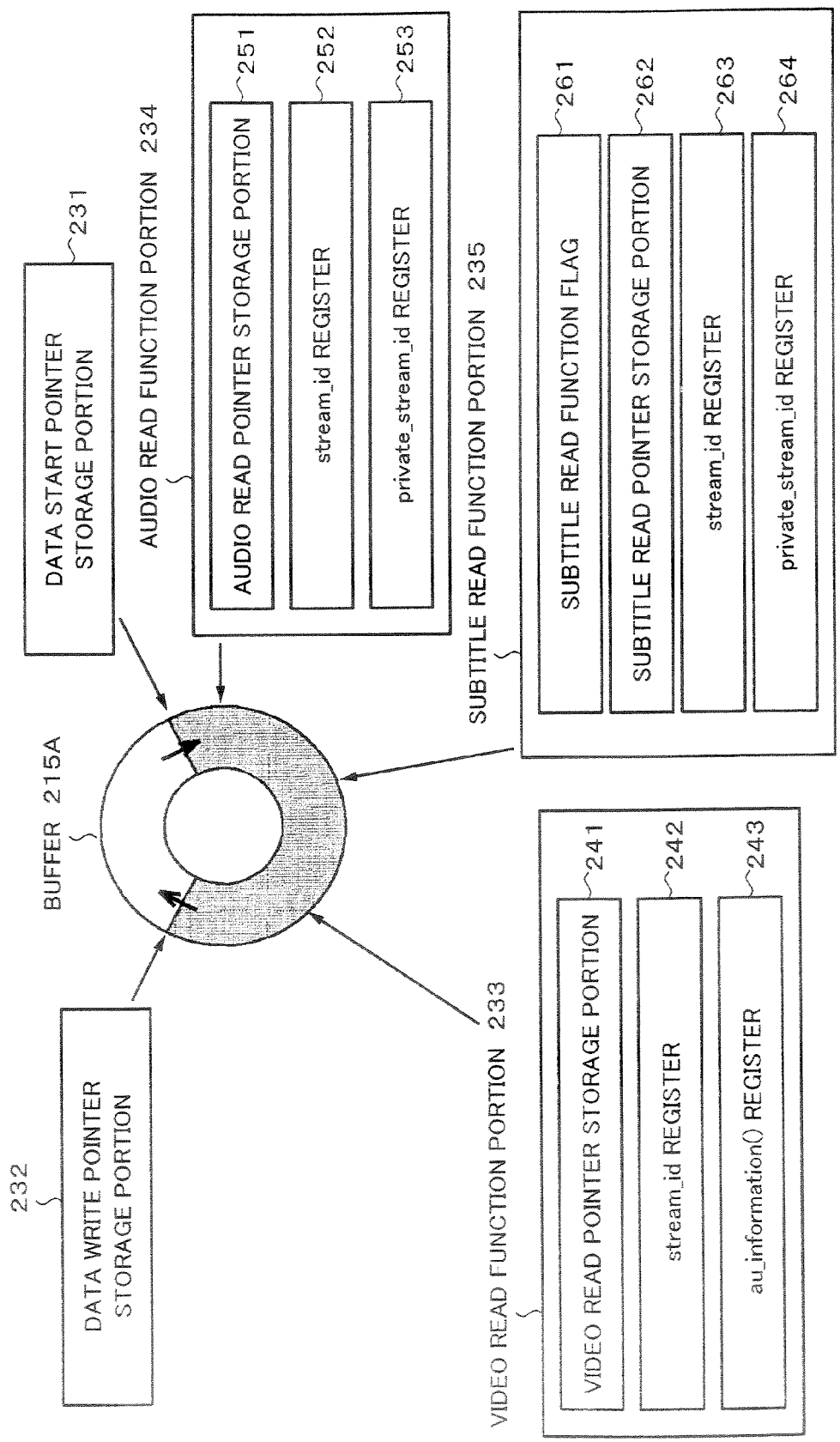
FIG. 3 is a block diagram showing an example of the structure of a buffer control module 21S.

FIG. 3 shows an example of the structure of the buffer control module 215 shown in FIG. 2A and FIG. 2B.

The buffer control module 215 exclusively uses a part of the memory 113 shown in FIG. 1 as the buffer 215A and temporarily stores data that are read from the disc 101 to the buffer 215A. In addition, the buffer control module 215 reads data from the buffer 215A and supplies the data to the video decoder control module 216, the audio decoder control module 217, and the subtitle decoder control module 218 shown in FIG. 2A and FIG. 2B.

Besides the buffer 215A, the buffer control module 215 has a data start pointer storage portion 231 and a data write pointer storage portion 232 that are part of the memory 113. In addition, the buffer control module 215 has a video read function portion 233, an audio read function portion 234, and a subtitle read function portion 235 as internal modules.

The buffer 215A is for example a ring buffer that successively stores data that are read from the disc 101. After the buffer 215A reads data for the storage amount thereof, the buffer 215A stores data in so-called endless loop so that the buffer 215A overwrites the newest data on the oldest data.

The data start pointer storage portion 231 stores a data start pointer that represents the position (address) of the oldest data that are not read from the buffer 215A in the data stored in the buffer 215A.

The data write pointer storage portion 232 stores a pointer that represents the position of the newest data that are read from the disc 101 in the buffer 215A.

Whenever data that are read from the disc 101 are stored to the buffer 215A, the position that the data write pointer represents is updated in the clockwise direction shown in FIG. 3. Whenever data are read from the buffer 215A, the position that the data start pointer represents is updated in the clockwise direction shown in FIG. 3. Thus, valid data stored in the buffer 215A are from the position that the data start pointer represents to the position that the data write pointer represents in the clockwise direction shown in FIG. 3.

The video read function portion 233 reads a video stream (an elementary stream of video data) from the buffer 215A corresponding to a request received from the video decoder control module 216 shown in FIG. 2A and FIG. 2B and supplies the video stream to the video decoder control module 216. The audio read function portion 234 reads an audio stream (an elementary stream of audio data) from the buffer 215A corresponding to a request received from the audio decoder control module 217 and supplies the audio stream to the audio decoder control module 217. Likewise, the subtitle read function portion 235 reads a subtitle stream (an elementary stream of subtitle data) from the buffer 215A corresponding to a request received from the subtitle decoder control module 218 and supplies the subtitle stream to the subtitle decoder control module 218.

In other words, a program stream corresponding to for example the Moving Picture Experts Group (MPEG) 2 standard has been recorded on the disc 101, the program stream being referred to as MPEG2-system program stream. In the program stream, at least one elementary stream of a video stream, an audio stream, and a subtitle stream has been multiplexed on time division basis. The video read function portion 233 has a demultiplexing function for the program stream. The video read function portion 233 demultiplexes a video stream from a program stream stored in the buffer 215A and reads the video stream.

Likewise, the audio read function portion 234 has a demultiplexing function for a program stream. The audio read function portion 234 demultiplexes an audio stream from a program stream stored in the buffer 215A and reads the audio stream. Likewise, the subtitle read function portion 235 has a demultiplexing function for a program stream. The subtitle read function portion 235 demultiplexes a subtitle stream from a program stream stored in the buffer 215A and reads the subtitle stream.

The video read function portion 233 has a video read pointer storage portion 241, a stream_id register 242, and an au_information( ) register 243 that are part of the memory 113 shown in FIG. 1.

The video read pointer storage portion 241 stores a video read pointer that represents the position (address) of a video stream in the buffer 215A. The video read function portion 233 reads data as a video stream from the position of the video read pointer in the buffer 215A. The stream_id register 242 stores stream_id that is used to analyze a program stream stored in the buffer 215A and to identify a video stream that is read from the program stream. The au_information( ) register 243 stores au_information( ) that is data necessary to read (that is used to read a video stream from the buffer 215A.

The audio read function portion 234 has an audio read pointer storage portion 251, a stream_id register 252, and a private_stream_id register 253 that are part of the memory 113 shown in FIG. 1.

The audio read pointer storage portion 251 stores an audio read pointer that represents the position (address) of an audio stream stored in the buffer 215A. The audio read function portion 234 reads data as an audio stream from the position of the audio read pointer in the buffer 215A. The stream_id register 252 and the private_stream_id register 253 store stream_id and private_stream_id (that will be described later), respectively, used to analyze a program stream stored in the buffer 215A and identify an audio stream that is read from the program stream.

The subtitle read function portion 235 has a subtitle read function flag storage portion 261, a subtitle read pointer storage portion 262 a stream_id register 263, and a private_stream_id register 264 that are part of the memory 113 shown in FIG. 1.

The subtitle read function flag storage portion 261 stores a subtitle read function flag. When the subtitle read function flag stored in the subtitle read function flag storage portion 261 is for example "0," the subtitle read function portion 235 does not operate. When the subtitle read function flag stored in the subtitle read function flag storage portion 261 is for example "1," the subtitle read function portion 235 operates.

The subtitle read pointer storage portion 262 stores a subtitle read pointer that represents the position (address) of a subtitle stream stored in the buffer 215A. The subtitle read function portion 235 reads data as a subtitle stream from the position of the subtitle read pointer in the buffer 215A. The stream_id register 263 and the private_stream_id register 264 stores stream_id and private_stream_id (that will be described later), respectively, used to analyze a program stream stored in the buffer 215A and identify a subtitle stream that is read from the program stream.

[Description of Data Format of Data Recorded on Disc 101]

Next, the data format of data recorded on the disc 101 will be described.

Figure 4:
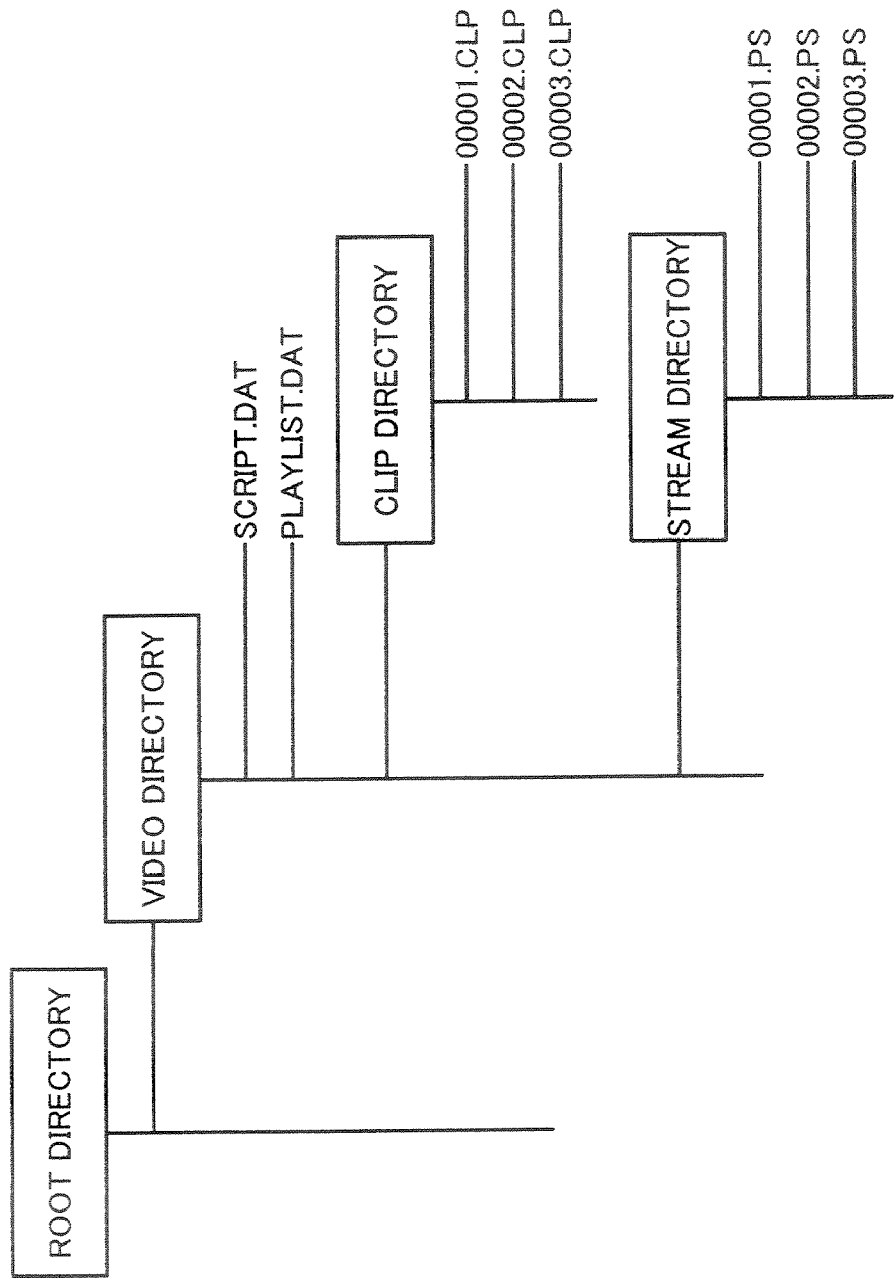
FIG. 4 is a schematic diagram showing an example of the structure of directories of a disc 101.

FIG. 4 schematically shows the structure of directories of the disc 101.

A file system used for the disc 101 is for example one of those defined in the International organization for Standardization (ISO)-9660 and the Universal Disk Format (UDF) (http://www.osta.org/specs/). Files of data recorded on the disc 101 are hierarchically managed in a directory structure. A file system that can be used for the disc 101 is not limited to these file systems.

In FIG. 4, there is a "VIDEO" directory under a root directory that represents the base of the file system. There are two directories that are a "CLIP" directory and a "STREAM" directory under the "VIDEO" directory.

Besides the two directories, which are the "CLIP" directory and the "STREAM" directory, there are two data files that are a "SCRIPT.DAT" file and a "PLAYLIST.DAT" file under the "VIDEO" directory.

The "SCRIPT.DAT" file is a script file that describes a script program. In other words, the "SCRIPT.DAT" file describes a script program that allows data on the disc 101 to be interactively reproduced. The script program stored in the "SCRIPT.DAT" file is interpreted and executed by the script control module 211 shown in FIG. 2A and FIG. 2B.

The "PLAYLIST.DAT" file stores at least one play list (PlayList( ) that will be described later with reference to FIG. 5). A play list describes the reproduction procedure of a content such as video data recorded on the disc 101.

There is at least one clip information file under the "CLIP" directory. There is at least one clip stream file under the "STREAM" directory. In other words, there are three clip information files "00001.CLP," "00002.CLP," and "100003.CLP" under the "CLIP" directory. There are three clip stream files "00001.PS," "00002.PS," and "00003.PS" under the "STREAM" directory.

A clip stream file stores a program stream of which at least one stream of video data, audio data, and subtitle data have been compressed and encoded is multiplexed on time division basis.

A clip information file stores a (file) meta data about a clip stream for example characteristics thereof.

In other words, a clip stream file and a clip information file are correlated in the relationship of 1 to 1. In FIG. 4, a clip stream file is named corresponding to a naming rule of five-digit number+period+"PS," whereas a clip information file is named corresponding to a naming rule of the same five-digit number as the corresponding clip stream+period+"CLP."

Thus, a clip stream file and a clip information file can be identified by the extension of the file name (the right side of period). In addition, it can be determined whether a clip stream file and a clip information file are correlated with their file names other than their extensions (the left side portion of period).

Next, files recorded on the disc 101 will be described in detail.

[PLAYLIST.DAT]

FIG. 5 shows the internal structure (syntax) of the "PLAYLIST.DAT" file under the "VIDEO" directory shown in FIG. 4.

In FIG. 5 the "PLAYLIST.DAT" file has a "Syntax" field that describes the data structure of the "PLAYLIST.DAT" file; a "No. of bits" field that describes the bit length of each data entry in the "Syntax" field; and a "Mnemonic" field in which "bslbf" (bit string left bit first) and "uimsbf" (unsigned integer most significant bit first)" represent that a data entry in the "Syntax" field is shifted from the left bit and that a data entry in the "Syntax" field is an unsigned integer and shifted from the most significant bit. These conditions apply to other lists similar to FIG. 5.

The "PLAYLIST.DAT" file starts with name_length (8 bits) and name_string (255 bytes) that describe information such as the name (file name).

In other words name_length represents the size of name_string immediately preceded thereby in bytes. name_string represents the name (file name) of the "PLAYLIST.DAT" file.

Bytes for name_length from the beginning of name_string are used as a valid name. When the value of name_length is 10, 10 bytes from the beginning of name_string are interpreted as a valid name.

name_string is followed by number_of_PlayLists (16 bits). number_of_PlayLists represents the number of PlayList( )'s preceded by name_string. number_of_PlayLists is followed by PlayList( )'s represented by number_of_PlayLists.

PlayList( ) is a play list that describes the reproduction procedure of a clip stream file recorded or the disc 101. PlayList( ) has the following internal structure.

PlayList( ) starts with PlayList_data_length (32 bits) PlayList_data_length represents the size of PlayList( ).

PlayList_data_length is followed by reserved_for_word_alignment (15 bits) and capture_enable_flag_PlayList (1 bit) in succession. reserved_for_word_alignment of 15 bits is followed by capture_enable_flag_PlayList of 1 bit for a word alignment at the position of capture_enable_flag_PlayList to place it at the position of 16 bits. capture_enable_flag_PlayList is a 1-bit flag that represents whether video data (video data that belong to PlayList( )) of a video stream reproduced corresponding to PlayList) is permitted to be secondarily used in the disc device that reproduces data from the disc 101. When the value of capture_enable_flag_PlayList is for example 1 (0 or 1), it represents that video data that belong to PlayList( ) are permitted to be secondarily used. When the value of capture_enable_flag_PlayList is for example 0 (0 or 1), it represents that video data that belong to PlayList( ) are not permitted to be secondarily used (namely, prohibited from being secondarily used).

In FIG. 5, capture_enable_flag_PlayList is composed of one bit. Alternatively capture_enable_flag_PlayList may be composed of a plurality of bits. In this case, video data that belong to PlayList( ) may be gradually permitted to be secondarily used. In other words, capture_enable_flag_PlayList may be composed of two bits. When the value of capture_enable_flag_PlayList is 00B (where B represents that the preceding number is a binary number) video data are prohibited from being secondarily used. When the value of capture_enable_flag_PlayList is 10B, video data that are reduced to a size of 64×64 pixels or smaller are permitted to be secondarily used. When the value of capture_enable_flag_PlayList is 10B, video data are permitted to be secondarily used without any size reduction.

A secondary use of video data may be restricted with respect to applications rather than sizes. In other words, when the vague of capture_enable_flag_PlayList 01B, only the video content reproduction program 210 (FIG. 2A and FIG. 2B) may be permitted to secondarily use the video data. When the value of capture_enable_flag_PlayList is 10B, any application including the video content reproduction program 210 in the disc device shown in FIG. 1 may be permitted to secondarily use the video data. In this example, an application other than the video content reproduction program 210 in the disc device shown in FIG. 1 that displays a wall paper (background) or a screen saver.

When capture_enable_flag_PlayList is composed of 2 bits, reserved_for_word_alignment followed thereby is composed of 14 bits for a word alignment.

Alternatively, with capture_enable_flag_PlayList, video data may be permitted to be secondarily used outside the disc device. In the case that with capture_enable_flag_PlayList, video data are permitted to be secondarily used outside the disc device, the video data are recorded to for example a recording medium that can be loaded into the disc device or that can be connected to the disc device, or transmitted (distributed) to another device through a network such as the Internet. In this case, information that represents the number of times video data can be recorded to the recording medium or the number of times video data can be transmitted (distributed) can be added to the video data.

capture_enable_flag_PlayList is followed by PlayList_name_length (8 bits) and PlayList_name_string (255 bytes) in succession. PlayList_name_length represents the size of PlayList_name_string in bytes. PlayList_name_string represents the name of PlayList( ).

PlayList_name_string is followed by number_of_PlayItems (16 bits). number_of_PlayItems represents that number of PlayItem( )'s.

number_of_PlayItems is followed by PlayItem( )'s represented by number_of_PlayItems.

One PlayList( ) can describe the reproduction procedure of a content in the unit of PlayItem( ).

Identification (ID) codes that are unique in PlayList( ) are added to PlayItem( )'s represented by number_of_PlayItems.

In other words, the first PlayItem( ) of PlayList( ) is identified by number 0. The other PlayItem( )'s are successively identified by numbers 1, 2, . . . , and so forth.

PlayItem( )'s represented by number_of_PlayItems are followed by one PlayListMark( ). PlayListMark( ) is a set of Mark( )'s as marks on the time axis of the reproduction corresponding to PlayList( ). PlayListMark( ) will be described later in detail with reference to FIG. 7.

[Description of PlayItem( )]

FIG. 6 shows the internal structure of PlayItem( ) contained in PlayList( ) shown in FIG. 5.

PlayItem (starts with length (16 bits) length represents the size of PlayItem( ), including the size of length.

length is followed by Clip_Information_file_name_length (16 bits) and Clip_Information_file_name (variable length) in succession Clip_Information_file_name_length represents the size of Clip_Information_file_name in bytes. Clip_Information_file_name represents the file name of a clip information file (a file having an extension CLP shown in FIG. 4) corresponding to a clip stream file (a file having an extension PS shown in FIG. 4) reproduced by PlayItem( ). Corresponding to the foregoing naming rules for clip stream files and clip information files the file name of a clip information file reproduced by PlayItem( ) is recognized with Clip_Information_file_name and the clip stream file can be identified.

Clip_Information_file_name is followed by IN_time (32 bits) and OUT_time (32 bits) in succession.

IN_time and OUT_time are time information that represent the reproduction start position and the reproduction end position of a clip stream file identified by Clip_Information_file_name.

IN_time can designate a middle position (including the beginning) of a clip stream file as a reproduction start position. OUT_time can designate a middle position (including the end) of a clip stream file as a reproduction end position.

PlayItem( ) reproduces a content from IN_time to OUT_time of a clip stream file identified by Clip_Information_file_name. A content reproduced by PlayItem( ) is sometimes referred to as a clip.

[Description of PlayListMark( )]

FIG. 7 shows the internal structure of PlayListMark( ) contained in PlayList( ) shown in FIG. 5.

As described above, PlayListMark) is a set of Mark( )'s that are marks on the time axis of the reproduction corresponding to PlayList( ) shown in FIG. 5. The number of Mark( )'s is 0 or larger. One Mark( ) has at least time information that represents one time (position) on the time axis of the reproduction performed corresponding to PlayList( ), type information that represents the type of Mark( ) and argument information of an argument of an event when type information represents the type of an event that takes place.

In other words, PlayListMark( ) starts with length (32 bits). length represents the size of PlayListMark( ), including the size of length.

length is followed by number_of_PlayList_marks (16 bits). number_of_PlayList_marks represents the number of Mark( )'s that are preceded by number_of_PlayList_marks. number of_PlayList_marks is followed by Mark( )'s represented by number_of_PlayList_marks.

Marks( ) starts with mark_type (8 bits). mark_type is the foregoing type information and represents the type of Mark( ) to which mark_type belongs.

According to this embodiment, Mark( ) has three types of for example chapter, index, and event.

When the type of Mark( ) is chapter (sometimes referred to as a chapter mark), it is a mark of the start position of a chapter that is a searching unit as a division of PlayList( ). When the type of Mark( ) is index (sometimes referred to as an index mark), it is a mark of the start position of an index that is a subdivide unit of a chapter. When the type of Mark( ) is event (sometimes referred to as an event mark), Mark( ) is a mark of a position at which an event takes place while a content is being reproduced corresponding to PlayList( ). The script control module 211 is informed that an event corresponding to an event mark has taken place.

FIG. 8 shows the relationship between the value of mark_type and the type of Mark( ). In FIG. 8, mark_type of a chapter mark is 1; mark_type of an index mark is 2; and mark_type of an event mark is 3. In FIG. 8 other values represented by 8 bits of mark_type, namely 0 and 4 to 255, are reserved for future extension.

In FIG. 7 mark_type is followed by mark_name_length (8 bits). Mark( ) ends with mark_name_string (24 bytes). mark_name_length and mark_name_string are used to describe the name of Mark( ). mark_name_length represents the valid size of mark_name_string mark_name_string represents the name of Mark( ). Thus, bytes for mark_name_length from the beginning of mark_name_string represent a valid name of Mark( ).

mark_name_length is followed by four elements ref_to_PlayItem_id (16 bits), mark_time_stamp (32 bits), entry_ES_stream_id (8 bits), and entry_ES_private_stream_id (8 bits) that correlate Mark( ) defined in PlayList( ) with a clip stream file.

ref_to_PlayItem_id describes an ID as a sequential number assigned to PlayItem( ) to which Mark( ) belongs. ref_to_PlayItem_id identifies PlayItem( ) (FIG. 6) to which Mark( ) belongs. Thus, as was described in FIG. 6, a clip information file and a clip stream file are identified.

mark_time_stamp represents the position (time) that Mark( ) represents in a clip stream file identified by ref_to_PlayItem_id.

Figure 9:
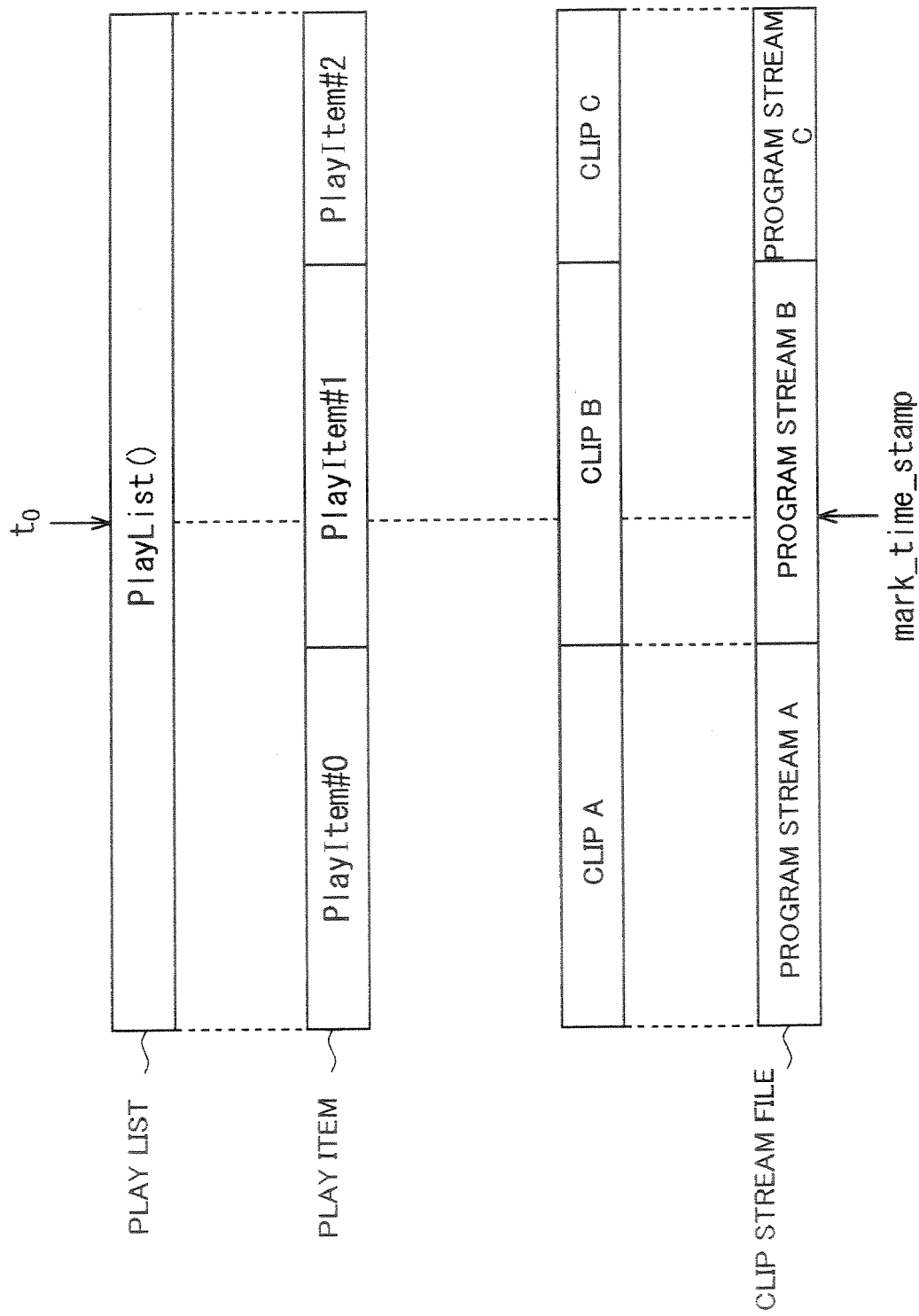
FIG. 9 is a schematic diagram showing the relationship of PlayList( ), PlayItem( ), clips and program streams stored in a clip stream file.

FIG. 9 shows the relationship of PlayList( ), PlayItem( ), clips, and program streams stored in a clip stream file.

In FIG. 9, PlayList( ) is composed of three PlayItem( )'s that are sequentially numbered as ID#0, ID#1, and ID#2. In the following description, PlayItem( ) numbered as ID#i is denoted by PlayItem#i.

In FIG. 9, clips as contents reproduced by PlayItem#0, PlayItem#1, and PlayItem#2 are denoted by clip A, clip B, and clip C, respectively.

An entity of a clip is from IN_time to OUT_time of a program stream stored in a clip stream file identified by Clip_Information_file_name of PlayItem( ) shown in FIG. 6 (also identified by a clip information file). In FIG. 9, program streams as entities of clip A, clip B, and clip C are represented as program stream A, program stream B, and program stream C, respectively.

In FIG. 9, in Mark( ) as a mark of position (time) t0 on the time axis of the reproduction corresponding to PlayList( ), ref_to_PlayItem_id and mark_time stamp are described as follows.

In FIG. 9, since time t0 is a time at which PlayItem#1 is reproduced ref_to_PlayItem_id describes 1 as the ID of PlayItem#1. Since at time t0 program stream B as the entity of clip B is reproduced, mark_time_stamp describes a time of a clip stream file that stores program stream B corresponding to time t0.

In FIG. 7, when Mark( ) is correlated with a particular elementary stream, entry_ES_stream_id and entry_ES_private_stream_id are used to identify the elementary stream. In other words entry_ES_stream_id describes stream_id of the elementary stream that is correlated with Mark( ) (PES_packet( ) that contains the elementary stream, PES_packet( ) will be described later with referenced to FIG. 16A and FIG. 16B to FIG. 18A and FIG. 1B). On the other hand, entry_ES_private_stream_id describes private stream_id of the elementary stream correlated with Mark( ) (private_header( ) of private_stream1_PES_payload( ) that contains the elementary stream, private_header( ) will be described later with reference to FIG. 21).

When video stream#1 of a clip of which video stream#1 and video stream#2 have been multiplexed is reproduced and when a chapter time needs to be changed while video stream#2 is being reproduced, stream_id and private_stream_id of video stream#1 are described in entry_ES_stream_id and entry_ES_private_stream_id of Mark( ) at a chapter mark time while video stream#2 is being reproduced.

entry_ES_stream_id and entry_ES_private_stream_id of Mark( ) that is not correlated with a particular elementary stream are for example 0.

entry_ES_private_stream_id is followed by mark_data (32 bits). When Mark( ) is an event mark, mark_data is argument information as an argument of an event that takes place with the event mark. When Mark( ) is a chapter mark or an index mark, mark_data can be used as a chapter number or an index number that the chapter mark or the index mark represents.

[Description of Clip( )]

Next, the internal structure of a clip information file having an extension of CLP and that is stored in the "CLIP" directory shown in FIG. 4 will be described.

In FIG. 4, there are three clip information files "00001.CLP," "00002.CLP," and "00003.CLP" under the "CLIP" directory. These clip information files contain meta data that represent characteristics of clip stream files "00001.PS," "00002.PS," and "00003.PS" stored in the "STREAM" directory.

FIG. 10 shows the internal structure of the clip information file Clip( ).

The clip information file Clip( ) starts with presentation_start_time and presentation_end_time (32 bits each). presentation_start_time and presentation_end_time represent the start time and end time of (a program stream stored in) a clip stream file corresponding to the clip information file Clip( ). The time of the clip stream file is described as a multiple of 90 kHz used as the time of the MPEG2-System.

presentation_end_time is followed by reserved_for_word_alignment (7 bits) and capture_enable_flag_Clip (1 bit). reserved_for_word_alignment of 7 bits is used for a word alignment. capture_enable_flag_Clip is a flag that represents whether video data are permitted to be secondarily used like capture_enable_flag_PlayList shown in FIG. 5.

However capture_enable_flag_PlayList shown in FIG. 5 represents whether video data (that belong to PlayList( )) corresponding to a video stream reproduced corresponding to PlayList( ) is permitted to be secondarily used. In contrast, capture_enable_flag_Clip shown in FIG. 10 represents whether video data corresponding to a video stream (an elementary stream of video data) stored in a clip stream file corresponding to the clip information file Clip( ) is permitted to be secondarily used. Thus, capture_enable_flag_PlayList shown in FIG. 5 is different from capture_enable_flag_Clip shown in FIG. 10 in the unit (range) of video data that are permitted to be secondarily used.

Like capture_enable_flag_PlayList described in FIG. 5, capture_enable_flag_Clip described in FIG. 10 can be composed of a plurality of bits not one bit.

capture_enable_flag_Clip is followed by number_of_streams (8 bits). number_of_streams describes the number of StreamInfo( )'s. Thus, number_of_streams is followed by StreamInfo( )'s represented by number_of_streams.

StreamInfo( ) starts with length (16 bits) length represents the size of StreamInfo( ), including the size of length. length is followed by stream_id (8 bits) and private_stream_id (8 bits) stream_id and private_stream_id identify an elementary stream that is correlated with StreamInfo( ).

FIG. 11 shows the relationship of stream_id, private_stream_id, and elementary streams identified thereby.

stream_id is the same as that defined in the MPEG2-System standard. The MPEG2-System standard defines the value of stream_id for each attribute (type) of an elementary stream (data). Thus, an attribute of an elementary stream defined in the MPEG2-System standard can be identified by only stream_id.

This embodiment can deal with attributes of elementary streams that are not defined in the MPEG2-System standard private_stream_id is information that identifies an attribute of an elementary stream that is not defined in the MPEG2-System standard.

FIG. 11 shows the relationship of stream_id's and private_stream_id's of elementary streams having four attributes that are a video elementary stream encoded corresponding to the encoding (decoding) system defined in the MPEG, an audio elementary stream encoded corresponding to the adaptive transform acoustic coding (ATARC) system (hereinafter sometimes referred to as an ATRAC audio stream), an audio elementary stream encoded corresponding to the linear pulse code modulation (LPCM) system (hereinafter sometimes referred to as an LPCM audio stream), and a subtitle elementary stream (hereinafter sometimes referred to as a subtitle stream).

The MPEG2-System standard defines that a video elementary stream encoded corresponding to the encoding system defined in the MPEG is multiplexed with a value in the range from 0xE0 to 0xEF (where 0x represents that the character string preceded thereby is represented in hexadecimal notation). Thus, 16 video elementary streams encoded corresponding to the encoding system defined in the MPEG and identified by stream_id in the range from 0xE0 to 0xEF can be multiplexed with a program stream.

Since video elementary streams encoded corresponding to the encoding system defined in the MPEG can be identified by stream_id in the range from 0xE0 to 0xEF, private_stream_id is not required (can be ignored).

On the other hand, in the MPEG2-System, stream_id is not defined for an ATRAC audio stream, an LPCM audio stream, and a subtitle stream.

Thus, according to this embodiment for elementary streams whose stream_id is not defined in the MPEG2-System, 0xBD that is a value representing an attribute private_stream_1 in the MPEG2-System is used. In addition, as shown in FIG. 11, these elementary streams are identified by private_stream_id.

In other words, an ATRAC audio stream is identified by private_stream_id in the range from 0x00 to 0x0F. Thus, 16 ATRAC audio streams can be multiplexed with a program stream. An LPCM audio stream is identified by private_stream_id in the range from 0x10 to 0x1F. Thus, 16 LPCM audio streams can be multiplexed with a program stream. A subtitle stream is identified by private_stream_id in the range from 0x80 to 0x9F. Thus, 32 subtitle streams can be multiplexed with a program stream.

stream_id and private_stream_id will be described later in detail.

In FIG. 10, private_stream_id is followed by StaticInfo( ) and reserved_for_word_alignment (8 bits) in succession. StaticInfo( ) describes in formation that does vary while an elementary stream_identified by stream_id and private_ stream_id (described in StreamInfo( ) including StaticInfo( ) is being reproduced. StaticInfo( ) will be described later with reference to FIG. 12.

reserved_for_word_alignment is used for a word alignment.

reserved_for_word_alignment is followed by number_of_DynamicInfo (8 bits). number_of_DynamicInfo represents the number of sets of pts_change_point's (32 bits each) and DynamicInfo( )'s, which are preceded by number_of_DynamicInfo.

Thus, number of DynamicInfo is followed by sets of pts_change_point's and DynamicInfo( )'s represented by number_of_DynamicInfo.

pts_change_point represents a time at which information of DynamicInfo( ) paired with pts_change_point becomes valid. pts_change_point that represents the start time of an elementary stream is equal to presentation_start_time described at the beginning of the clip information file Clip( ) corresponding to a clip stream file that stores the elementary stream.

DynamicInfo( ) describes so-called dynamic information that changes while an elementary stream identified by stream_id and private_stream_id is being reproduced. Information described in DynamicInfo( ) becomes valid at a reproduction time represented by pts_change_point paired with DynamicInfo( ). DynamicInfo( ) will be described later with reference to FIG. 13.

Sets of pts_change_point's and DynamicInfo( )'s represented by number of DynamicInfo are followed by EP_map( ), EP_map( ) will be described later with reference to FIG. 14.

[Description of StaticInfo( )]

Next, with reference to FIG. 12, StaticInfo( ) shown in FIG. 10 will be described in detail.

FIG. 12 shows the syntax of StaticInfo( ).

The content of StaticInfo( ) varies depending on the attribute (type) of the corresponding elementary stream. The attribute of an elementary stream corresponding to StaticInfo( ) is determined by stream_id and private_stream_id contained in StreamInfo( ), shown in FIG. 10, including StaticInfo( ).

When an elementary stream corresponding to StaticInfo( ) is a video stream (stream==VIDEO), StaticInfo( ) is composed of picture_size (4 bits), frame_rate (4 bits), cc_flag (1 bit), and reserved_for_word_alignment for a word alignment.

picture_size represents the size of (an image displayed with) video data corresponding to a video stream frame_rate represents the frame frequency of video data corresponding to a video stream. cc_flag represents whether a video stream contains closed caption data. When a video stream contains closed caption data, cc_flag is 1. When a video stream does not contain closed caption data, cc_flag is 0.

When an elementary stream corresponding to StaticInfo( ) is an audio stream (stream==AUDIO). StaticInfo( ) is composed of audio_language_code (16 bits), channel_configuration (8 bits), lfe_existence (1 bit), sampling_frequency (4 bits), and reserved_for word_alignment for a word alignment.

audio_language_code describes a code that represents the language of audio data contained in an audio stream. channel_configuration represents an attribute such as monaural (mono), stereo, multi-channels, and so forth of audio data contained in an audio stream. lfe_existence represents whether an audio stream contains a low frequency effect channel. When an audio stream contains a low frequency effect channel, lfe_existence is 1. When an audio stream does not contain a low frequency effect channel, lfe_existence is 0. sampling_frequency is information that represents a sampling frequency of audio data contained in an audio stream.

When an elementary stream corresponding to StaticInfo( ) is a subtitle stream (stream=SUBTITLE), StaticInfo( ) is composed of subtitle_language_code (16 bits), configurable_flag (1 bit), and reserved_for_word_alignment for a word alignment.

subtitle_language_code describes a code that represents the language of subtitle data contained in a subtitle stream configurable_flag is information that represents whether a subtitle data display mode is permitted to be changed from a default display mode. When a display ode is permitted to be changed configurable_flag is 1. When a display mode is not permitted to be changed, configurable_flag is 0. The display mode of subtitle data includes display size of subtitle data, display position, display color, display pattern (for example, blinking), display direction (vertical or horizontal) and so forth.

[Description of DynamicInfo( )]

Next, with reference to FIG. 13, DynamicInfo( ) shown in FIG. 10 will be described in detail.

FIG. 13 shows the syntax of DynamicInfo( ).

DynamicInfo( ) starts with reserved_for_word_alignment (8 bits) for a word alignment. Elements preceded by reserved_for_word_alignment depend on an attribute of an elementary stream corresponding to DynamicInfo( ). An attribute of an elementary stream corresponding to DynamicInfo( ) is determined by stream ID and private_stream_id contained in StreamInfo( ), shown in FIG. 12, that includes DynamicInfo( ).

As described in FIG. 10, DynamicInfo( ) describes dynamic information that varies while an elementary stream is being reproduced. The dynamic information is not specific. However, in the embodiment shown in FIG. 13, data of an elementary stream corresponding to DynamicInfo( ), namely an output attribute of data that is an output of a process for an elementary stream (an output attribute of data obtained from an elementary stream) is described in DynamicInfo( ).

Specifically, when an elementary stream corresponding to DynamicInfo( ) is a video stream (stream==VIDEO), DynamicInfo( ) is composed of display_aspect ratio (4 bits) and reserved_for_word_alignment for a word alignment. display_aspect ratio describes an output attribute (display mode) of video data of a video stream, for example an aspect ratio of video data. In other words, display_aspect_ratio describes information that represents either 16:9 or 4:3 as an aspect ratio. DynamicInfo( ) of a video stream can describe such as the size of an image of video data (X pixels×Y pixels) as well as an aspect ratio.

When an elementary stream corresponding to DynamicInfo( ) is an audio stream (stream==AUDIO), DynamicInfo( ) is composed of channel_assignment (4 bits) and reserved_for_word_alignment for a word alignment. When an audio stream contains two channels of audio data, channel_assignment describes output attributes of two channels (output mode). In other words, channel_assignment describes information that represents a channel assignment of stereo or dual (bilingual).

When an elementary stream corresponding to DynamicInfo( ) is a subtitle stream (stream==SUBTITLE), DynamicInfo( ) is composed of reserved_for_word_alignment for a word alignment. In other words, according to the embodiment shown in FIG. 13, an output attribute as dynamic information is not defined for a subtitle stream.

[Description of EP_map( )]

Next, with reference to FIG. 14, EP_map( ) shown in FIG. 10 will be described in detail.

FIG. 14 shows the syntax of EP_map( ).

EP_map( ) describes information of a decode startable point (entry point) from which each of elementary streams multiplexed with a program stream stored in a clip stream file corresponding to the clip information file Clip( ) that includes EP_map( ) can be decoded.

A decode startable point of a stream having a fixed rate can be obtained by a calculation. However, for a stream whose size varies in each video access unit such as a video stream encoded corresponding to the MPEG standard, the decode startable point cannot be obtained by a calculation. The decode startable point cannot be obtained unless the stream is analyzed. To randomly access data, it is necessary to quickly recognize the decode startable point. With EP_map( ), a decode startable point can be quickly recognized.

In the MPEG2-Video, the beginning of an intra picture including Sequence_header( ) and so forth is a decode startable point.

EP_map( ) starts with reserved_for_word_alignment (8 bits) for a word alignment. reserved_for_word_alignment is followed by number_of_stream_id_entries (8 bits). number_of_stream_id entries represents the number of elementary streams that describe information of decode startable points in EP_map( ).

number_of_stream_id_entries is followed by sets of information that identifies an elementary stream and information of a decode startable point of the elementary stream represented by number_of_stream_id_entries.

In other words number_of_stream_id_entries is followed by stream_id (8 bits) and private_stream_id (8 bits) as information that identifies an elementary stream. private_stream_id is followed by number_of_EP_entries (32 bits) number_of_EP_entries represents the number of decode startable points identified by stream_id and private_stream_id followed by number_of_EP_entries.

number_of_EP_entries is followed by sets of PTS_EP_start's (32 bits each) and RPN_EP_start's (32 bits each, represented by number_of_EP_entries as information of decode startable points of an elementary stream_identified by stream_id and private_stream_id.

PTS_EP_start as one element of information of decode startable points represents a time (reproduction time) of a decode startable point in a clip stream file that stores a program stream multiplexed with an elementary stream_identified by stream_id and private_stream_id.

RPN_EP_start that is another element of information of decode startable points describes the position of a decode startable point in a clip stream file that stores a program stream multiplexed with an elementary stream_identified by stream_id and private_stream_id as a value as the number of pack( ) is of a program stream. According to this embodiment, the size of pack( ) is 2048 bytes fixed. In addition, according to this embodiment, one sector of the disc 101 (FIG. 1) is 2048 bytes.

A decode startable point (entry point) of a video stream is immediately preceded by a private_stream_2 packet (PES_packet( ) as an attribute of private_stream_2. A private_stream_2 packet stores information used to decode video stream stored between two adjacent private_stream_2 packets. Thus, for a video stream, RPN_EP_start as information of a decode startable point describes the start position of a private_stream_2 packet immediately followed by a real decode startable point.

Sets of PTS_EP_start's and RPN_EP_start's as information of decode startable points are pre-sorted in the ascending order for each elementary stream identified by stream_id and private_stream_id in EP_map( ). Thus, sets of PTS_EP_start's and RPN_EP start's as information of decode startable points can be binary-searched.

A random access method for variable rate streams and streams whose sizes differ in video access units is described in for example Japanese Patent Laid-Open Publication No. 2000-341640 (Japanese Patent Application No. HEI 11-317738).

[Description of Clip Stream File]

Next, the internal structure of clip stream files having an extension of PS and stored in the "STREAM" directory shown in FIG. 4 ("00001.PS," "00002.PS," and "00003.PS" in FIG. 4) will be described.

A clip stream file is composed on the basis of MPEG2_Program_Stream( ) defined in the MPEG-2 System (ISO/IEC 13818-1).

FIG. 15A and FIG. 15B show Table 2-31, Table 2-32, and Table 2-33 described in the MPEG-2 System (ISO/IEC 13818-1: 20000) standard.

A program stream stored in a clip stream file is MPEG2_Program_Stream( ) defined in Table 2-31 of the MPEG2-System standard. The program stream is composed of at least one pack) and one MPEG_program_end_code. MPEG2_Program_Stream( ) is described in Japanese Patent No. 2785220.

One pack( ) is composed of one Pack_header( ) and any number of PES_packet( )'s as defined in Table 2-32 of the MPEG-2 System standard. Pack_header( ) is described in Table 2-33 of the MPEG2-System standard in detail.

In the MPEG2-System standard, pack( ) has a size of variable length. However, as described in FIG. 14, it is assumed that the size of pack( ) is 2048 bytes, fixed. In this examples the number of PES_packet( )'s of one pack( ) is 1, 2, or 3. When Pack( ) starts with a private_stream_2 packet, it is always followed by PES_packet( ) of the corresponding video stream (in the same Pack( ). In addition, as the third PES_packet( ), there may be padding_packet. A private_stream_2 packet is always present at the beginning of Pack( ).

When Packet( ) does not start with a private_stream_2 packet, Pack( ) starts with PES_packet( ) that contains content data of video data, audio data, subtitle data, or the like. The second PES_packet( ) may be padding_packet.

FIG. 16A and FIG. 16B to FIG. 18A and FIG. 18B show PES_packet( ) defined in Table 2-17 of the MPEG2-System standard.

PES_packet( ) is mainly composed of packet_start_code_prefix, stream_id, PES_packet_length (they are shown in FIG. 16A and FIG. 16B), header portions (including stuffing_byte) that vary corresponding to stream_id or the like (these portions are shown in FIG. 16A and FIG. 16B to FIG. 18A and FIG. 18B), and PES_packet data_byte (shown in FIG. 18A and FIG. 18B). When PBS_packet( ) is padding_packet (stream_id==padding_stream), a required number of padding_byte's (0xFF) (FIG. 18A and FIG. 18B) are repeated instead of PES_packet_data_byte.

As shown in FIG. 16A, FIG. 16B, FIG. 17A, FIG. 17B and FIG. 17C, the header portions of PES_packet( ) can describe information that represents a display timing called a presentation time stamp (PTS) and information that represents a decode timing called a decoding time stamp. According to this embodiment, a PTS is added to each of all access units (decode units that compose an elementary stream defined in the MPEG2-System). When specified in the MPEG2-System, a DTS is added.

An elementary stream multiplexed with a program stream is stored in PES_packet_data_byte (FIG. 18A and FIG. 1B) of PES_packet( ). stream_id of PES_packet( ) describes a value corresponding to an attribute of an elementary stream to identify the elementary stream stored in PES_packet_data_byte.

The relationship of values described in stream_id of PES_packet( ) and attributes (types) of elementary streams is defined in Table 2-18 of the MPEG2-System standard. FIG. 19A and FIG. 19B show Table 2-18 of the MPEG-2 System standard.

According to the embodiment of the present invention values shown in FIG. 20 are used as stream_id defined in the MPEG2-System standard shown in FIG. 19A and FIG. 19B.

In other words, according to this embodiments five patterns 10111101B, 10111110B, 10111111B, 110xxxxxB, and 1110xxxxB are used as values of stream_id where "x" represents any one of 0 and 1.

Corresponding to the table shown in FIG. 20, stream_id of PES_packets of an elementary stream having an attribute of private_stream_1 is 10111101B. Corresponding to the table shown in FIG. 20, stream_id of PES_packet( ) of padding_packet is 10111110B. According to the table shown in FIG. 20, stream_id of PES_packet( ) or an elementary stream having an attribute of private_stream_2 is 10111111B.

stream_id of PES_packet( ) of an audio stream (audio elementary stream) defined in the MPEG is 110xxxxxB. The low order five bits xxxxx of 110xxxxxB is an audio stream byte that identifies an audio stream. 32 ($=2^5$) audio streams (audio streams defined in the MPEG) that can be identified by the audio stream number can be multiplexed with a program stream.

stream_id of PES_packet( ) of a video stream (video elementary stream) defined in the MPEG is 1110xxxxB. The low order four bits xxxx of 110xxxxB is a video stream number that identifies a video stream. 16 ($=2^4$) video streams (video streams defined in the MPEG) can be multiplexed with a program stream.

PES_packet( ) whose stream_id is 110xxxxB is used to store a video stream defined in the MPEG. PES_packet( ) whose stream_id is 110xxxxxB is used to store an audio stream defined in the MPEG. On the other hand, stream_id of PES_packet( ) for an elementary stream corresponding to an encoding system (for example, the ATRAC system) is not defined in the MPEG. Thus, like a video stream and an audio stream defined in the MPEG, an elementary stream corresponding to an encoding system that is not defined in the MPEG cannot be stored in PES_packet( ) with stream_id.

Thus, according to this embodiment, PES_packet_data_byte of PES_packet( ) of private_stream_1 is extended to store an elementary stream corresponding to an encoding system that is not defined in the MPEG.

Extended PES_packet_data_byte of PES_packet( ) of private_stream 1 is described as private_stream1_PES_payload( ).

[Description of private_stream1_PES_payload( )]

FIG. 21 shows the syntax of private_stream1_PES_payload( ).

private_stream1_PES_payload( ) is composed of private_header( ) and private_payload( ). private_payload( ) stores an elementary stream such as an ATRAC audio stream, an LPCM audio stream, a subtitle stream, or the like encoded corresponding to an encoding system not defined in the MPEG system.

private_header( ) starts with private_stream_id (8 bits). private_stream_id is identification information that identifies an elementary stream stored in private_payload( ). private_stream_id has the following value corresponding to the attribute (type) of an elementary stream.

FIG. 22 shows the relationship of the value of private_stream_id and the attribute of an elementary stream stored in private_payload( ).

FIG. 22 shows three patterns 0000xxxxB, 0001xxxxB, and 100xxxxxB as the value of private stream_id where "x" is any value of 0 and 1 like the case shown in FIG. 20.

According to the table shown in FIG. 22, private_stream_id of private_stream1_PES_payload( ) of private_payload( ) of an ATRAC audio stream is 0000xxxxB. The low order four bits xxxx of 0000xxxxB is an audio stream number that identifies an ATRAC audio stream. 16 ($=2^4$) ATRAC audio streams that can be identified by the audio stream number can be multiplexed with a program stream (MPEG2_Program Stream( )).

According to the table shown in FIG. 22, private_stream_id of private_stream1_PES_payload( ) of private_payload( ) of an LPCM audio stream is 0001xxxxB. The low order four bits xxxx of 001xxxxB is an audio stream number that identifies an LPCM audio stream. 16 ($=2^4$) that can be identified by the audio stream number can be multiplexed with a program stream.

According to the table shown in FIG. 22, private_stream_id of private_stream1_PES_payload( ) of private_payload( ) of a subtitle stream is 10xxxxB. The low order five bits xxxxx of 100xxxxxB is a subtitle stream number that identifies a subtitle stream. 32 ($=2^5$) subtitle streams can be multiplexed with a program stream.

FIG. 11 shows the relationship of FIG. 20 and FIG. 22.

In FIG. 21, elements preceded by private_stream_id of private_stream1_PES_payload( ) vary depending on the attribute of an elementary stream stored in private_payload( ). The attribute of an elementary stream stored in private_payload( ) is determined by private_stream_id at the beginning of private_header( ).

When an elementary stream stored in private_payload( ) is an ATRAC audio stream (private_stream_id==ATRAC), reserved_for_future_use (8 bits) is described for a future extension. reserved_for_future_use is followed by AU_locator (16 bits). AU_locator represents the start position of an audio access unit (ATRAC audio access unit) (audio frame) of an ATRAC audio stream stored in private_payload( ) on the basis of the position immediately preceded by AU_locator. When private_payload( ) does not store an audio access unit, for example 0xFFFF is described in AU_locator.

When an elementary stream stored in private_payload( ) is an LPCM audio stream (private_stream_id==LPCM), fs_flag (1 bit), reserved_for_future_use (3 bits), ch_flag (4 bits), and AU_locator (16 bits) are described in succession.

fs_flag represents a sampling frequency of an LPCM audio stream stored in private_payload( ). When the sampling frequency of an LPCM audio stream is 48 kHz, fs_flag is 0. When the sampling frequency of an LPCM audio stream is 44.1 kHz, fs_flag is 1.

ch_flag represents the number of channels of an LPCM audio stream stored in private payloads. When an LPCM audio stream is monaural, ch_flag is 1. When an LPCM audio stream is stereo, ch_flag is 2

AU_locator represents the start position of an audio access unit (LPCM audio access unit) (audio frame) of an LPCM audio stream stored in private_payload( ) on the basis of the position immediately preceded by AU_locator. When private_payload( ) does not store an audio access unit, for example 0xFFFF is described in AU_locator.

When an elementary stream stored in private payloads is a subtitle stream (private_stream_id==SUBTITLE), reserved_for_future_use (8 bits) is described for a future extension. reserved_for_future_use is immediately followed by AU_locator (16 bits). AU_locator represents the start position of a subtitle access unit of a subtitle stream stored in private_payload( ) on the basis of the position immediately after AU_locator. When private_payload( ) does not store a subtitle access unit, for example 0xFFFF is described in AU_locator

[Description of private_stream2_PES_payload( )]

FIG. 23 shows the syntax of private_stream2_PES_payload( ).

private_stream2_PES_payload( ) is an extension of PES_packet_data_byte (FIG. 18A and FIG. 18B) of private_payloads of private_stream_2, namely an extension of PES_packet_data_byte of PES_packet( ) of private_stream_2. private_stream2_PES_payload( ) describes information used to decode a video stream.

According to this embodiment, PES_packet( ) of private_stream_2 is immediately preceded by a decode startable point of a video stream. Thus, according to this embodiment, when PES_packet( ) of private_stream_2 is detected from a program stream, video streams immediately preceded by PES_packet( ) can be decoded.

RPN_EP_start of EP_map( ) shown in FIG. 14 represents the start position of PES_packet( ) of private_stream_2 for a video stream.

private_stream2_PES_payload( ) starts with reserved_for_future_use (8 bits) for a future extension. reserved_for_future_use is followed by video_stream_id (8 bits), 1stRef_picture (16 bits), 2ndRef_picture (16 bits), 3rdRef_picture (16 bits), 4thRef_picture (16 bits), au_information( ), and VBI( ) in succession.

video_stream_id describes stream_id (the same value as stream_id) of PES_packet( ) of a video stream immediately preceded by PES_packet( ) of private_stream_2. video_stream_id identifies a video stream (PES_packet( ) that stores a video stream) that is decoded with information stored in PES_packet) (private_stream2_PES_payload( ) of PES_packet( ) of private_stream_2.

1stRef_picture, 2ndRef_picture, 3rdRef_picture, and 4thRef_picture represent relative values of positions of the last pack( )'s including first, second, third, and fourth reference images from PES_packet( ) of private_stream_2 to PES_packet( ) of the next private_stream_2 of a video stream_identified by video_stream_id, respectively. The details of 1stRef_picture, 2ndRef_picture, 3rdRef_picture, and 4thRef_picture are disclosed as bytes_to_first_P_pic and bytes_to_second_P_pic in Japanese Patent Laid-Open Publication No. HEI 09-46712 (Japanese Patent Application No. HEI 07-211420).

au_information( ) describes information about a video access unit of a video stream from PES_packet( ) of private_stream_2 to PES_packet( ) of the private_stream_2_au_information( ) will be described in detail with reference to FIG. 24.

VBI( ) is used to describe information about a closed caption.

PES_packet( ) of private_stream_2 that has private_stream2_PES_payload( ) is described for the decode startable point of each video stream.

FIG. 24 shows the syntax of au_information( ) shown in FIG. 23 au_information( ) starts with length (16 bits) length represents the size of au_information( ) including the size of length. length is followed by reserved_for_word_alignment (8 bits) and number_of_access unit (8 bits) in succession reserved_for_word_alignment is used for a word alignment.

number_of_access_unit represents the number of access units (pictures) stored from PES_packet( ) of private_stream2 to PES_packet( ) of the next private_stream2.

In other words, number_of_access_unit represents the number of access units (pictures) contained in a video stream represented by video_stream_id from au_information( )(to the next au_information (or the end of the clip stream file when au_information( ) is the last au_information( ) thereof) in PES_packet( )'s of private_stream_2's whose video_stream_id in private_stream2_PES_payload( ) is the same.

number_of_access_unit is followed by the contents of a for loop corresponding to number of access unit. In other words, information about at least one video access unit from PES_packet( ) of private_stream_2 including number_of_access_unit to PES_packet( ) of the next private_stream_2 is described.

Information described in the for loop (information about video access units) is as follows.

The for loop contains pic_struct_copy (4 bits), au_ref_flag (1 bit), AU_length (21 bits), and reserved.

pic_struct_copy describes a copy of pic_struct) defined in ISO/IEC 14496-10, D.2.2 for a video access unit corresponding to the MPEG4-AVC (ISO/IEC 14495-10). pic_struct( ) is information that represents that for example a picture frame is displayed or after a top field of a picture is displayed, a bottom field is displayed.

au_ref_flag represents whether a corresponding access unit is a reference picture that is referenced when (a picture of) another access unit is decoded. When the corresponding access unit is a reference picture, au_ref_flag is. When the corresponding access unit is not a reference picture, au_ref_flag is 0

AU_length represents the size of a corresponding access unit in bytes.

[Specific Example of Data Recorded on Disc 101]

FIG. 25 to FIG. 28 show specific examples of data that have the foregoing format and that have been recorded on the disc 101 shown in FIG. 1.

In FIG. 25 to FIG. 28, a video stream corresponding to the MPEG2-Video and an audio stream corresponding to the ATRAC are used. However, a video stream and an audio stream used in the present invention are not limited to these streams. In other words, a video stream corresponding to the MPEG4-Visual, a video stream corresponding to the MPEG4-AVC, or the like may be used. On the other hand, an audio stream corresponding to the MPEG-1/2/4 audio, an audio stream corresponding to the LPCM audio; or the like may be used.

Unlike a video stream and an audio stream, a subtitle stream may not be successively decoded and displayed (output) at the same intervals. In other words, a subtitle stream is sometimes supplied from the buffer control module 215 shown in FIG. 2A and FIG. 2B to the subtitle decoder control module 218. The subtitle decoder control module 218 decodes the subtitle stream.

FIG. 25 to FIG. 28 show specific examples of "PLAYLIST.DAT" file, three clip information files "00001.CLP," "00002.CLP," and "00003.CLP," and so forth in the case that the three clip information files "00001.CLP," "00002.CLP" and "00003.CLP" are stored in the "CLIP" directory and three clip stream files "00001.PS," "00002.PS," and "00003.PS" corresponding to the three clip information files "00001.CLP," "00002.CLP," and "00003.CLP" are stored in the "STREAM" directory. However, in FIG. 25 to FIG. 28, a part of data such as the "PLAYLIST.DAT" file and so forth are omitted.

FIG. 25 shows a specific example of the "PLAYLIST.DAT" file shown in FIG. 5.

In FIG. 25 number_of_PlayLists is 2. Thus, the number of PlayList( )'s stored in the "PLAYLIST.DAT" file is 2. In FIG. 25, the two PlayList( )'s are PlayList#0 and PlayList#1.

capture_enable_flag_PlayList of the first PlayList( ), namely PlayList#0, is 1. Thus, video data reproduced according to PlayList#0 are permitted to be secondarily used. On the other hand, number_of_PlayItems of PlayList#0 is 2. Thus, the number of PlayItem( )'s contained in PlayList#0 is 2. Specific examples of PlayItem#0 and PlayItem#1 as two PlayItem( )'s are described below a "PlayList#0" field shown in FIG. 25.

In PlayItem#0 as the first PlayItem( ) contained in PlayList#0, Clip_Information_file_name described in FIG. 6 is "00001.CLP", IN_time being 180,090, OUT_time being 27,180,090. Thus, a clip reproduced by PlayItem#0 of PlayList#0 is from time 180,090 to time 27,180,090 of the clip stream file "00001.CLP" corresponding to the clip information file "00001.CLP."

In PlayItem#1 as the second PlayItem( ) contained in PlayList#0, Clip_Information_file_name described in FIG. 6 is "00002.CLP," in-time being 90,000, OUT_time being 27,090,000. Thus, a clip reproduced by PlayItem#1 of PlayList#0 is from time 90,000 to time 27,090,000 of the clip stream file "00002.PS" corresponding to the clip information file "00002.CLP."

In FIG. 25, in PlayList#1 as the second PlayList( ); capture_enable_flag_PlayList is 0. Thus, video data reproduced according to PlayList#1 are not permitted to be secondarily used (prohibited from being secondarily used). In PlayList#1, number_of_PlayItems is 1. Thus, the number of PlayItem( )'s contained in PlayList#1 is 1. In FIG. 25 a specific example of PlayItem#0 as one PlayItem( ) is described below a "PlayList#1" field.

In PlayItem#0 as one PlayItem( ) contained in PlayList#1, Clip_information_file_name described in FIG. 6 is "00003.CLP," IN_time being 90,000, OUT_time being 81,090,000. Thus, a clip reproduced by PlayItem#0 of PlayList#1 is from time 90,000 to time 81,090,000 of the clip stream file "00003.PS" corresponding to the clip information file "00003.CLP."

FIG. 26A and FIG. 26B show a specific example of the clip information file Clip( ) described in FIG. 10. Thus, FIG. 26A and FIG. 26B show specific examples of the clip information files "00001.CLP," "00002.CLP," and "00003.CLP."

In the clip information file "00001.CLP," presentation_start_time is 90,000 and presentation_end_time is 27,990,000. Thus, a program stream stored in the clip stream file "00001.CLP" corresponding to the clip information file "00001.CLP" can use a content for 310 seconds (27,990,000−90,000/90 kHz).

In the clip information file "00001.CLP," capture_enable_flag_Clip is 1. Thus, a video stream (video data corresponding thereto) multiplexed with a program stream stored in the clip stream file "00001.CLP" corresponding to the clip information file "00001.CLP" is permitted to be secondarily used.

In FIG. 26A and FIG. 26B, in the clip information file "00001.CLP," number_of_streams is 4. Thus, four elementary streams are multiplexed with a program stream stored in the clip stream file "00001.PS."

Assuming that the four elementary streams are denoted by stream#0, stream#1, stream#2, and stream#3, specific examples of StreamInfo( )'s (FIG. 10) of the four elementary streams, which are stream#0, stream#1, stream#2, and stream#3 are described below a "00001.CLP" field shown in FIG. 26A and FIG. 26B.

In the first elementary stream stream#0 of the clip stream file "00001.PS," stream_id is 0xE0. Thus, as described in FIG. 20 and FIG. 22 (or FIG. 11), the elementary stream stream#0 is a video stream. According to this embodiment, private_stream_id is not correlated with a video stream. In FIG. 26A and FIG. 26B, private_stream_id is 0x00.

In the video stream stream#0 as the first elementary stream of the clip stream file "00001.PS," picture_size of StaticInfo( ) (FIG. 12) contained in StreamInfo( ) is "720× 480", frame_rate being "29.7 Hz," cc_flag being "Yes." Thus, the video stream stream#0 is video data having 720×480 pixels and a frame period of 29.97 Hz. In addition, the video stream stream#0 contains closed caption data.

In the video stream stream#0 as the first elementary stream of the clip stream file "00001.PS," number_of_DynamicInfo of StreamInfo( ) (FIG. 10) is 0. There is no pair of pts_change_point and DynamicInfo( ).

In the second elementary stream stream#1 of the clip stream file "00001.PS," stream_id is 0xBD, private_stream_id being 0x00. Thus, as described in FIG. 20 and FIG. 22, the elementary stream stream#1 is an ATRAC audio stream.

In the ATRAC audio stream stream#1 as the second elementary stream of the clip stream file is "00001.PS," audio_language_code of StaticInfo( ) (FIG. 12) contained in StreamInfo( ) is "Japanese," channel_configuration being "STEREO," lfe_existence being "NO," sampling_frequency being "48 kHz." Thus, the ATRAC audio stream stream#1 is Japanese and stereo audio data. In addition, the ATRAC audio stream stream#1 does not contain a low frequency effect channel and the sampling frequency is 48 kHz.

In addition, in the ATRAC audio stream stream#1 as the second elementary stream of the clip stream file "00001.PS," number_of_DynamicInfo of StreamInfo( ) (FIG. 10) is 0. There is no pair of pts_change_point and DynamicInfo( ).

In the third elementary stream stream#2 of the clip stream file "00001.PS," stream_id is 0xBD, private_stream_id being 0x80. Thus, as described in FIG. 20 and FIG. 22, the elementary stream stream#2 is a subtitle stream.

In the subtitle stream stream#2 as the third elementary stream of the clip stream file "00001.PS," subtitle_language_code of StaticInfo( ) (FIG. 12) contained in StreamInfo( ) is "Japanese," configurable_flag being 0. Thus, the subtitle stream stream#2 is Japanese subtitle data. In addition, this display mode is not permitted to be changed (prohibited from being changed).

In the subtitle stream stream#2 as the third elementary stream of the clip stream file "00001.PS," number_of_DynamicInfo of StreamInfo( ) (FIG. 10) is 0. There is no pair of pts_change_point and DynamicInfo( ).

In the fourth elementary stream stream#3 of the clip stream file "00001.PS," stream-Id is 0xBD, private_stream_id being 0x81. Thus, as described in FIGS. 20 and 22, the elementary stream stream#3 is a subtitle stream.

To distinguish the subtitle stream stream#2 as the third elementary stream of the clip stream file "00001.PS" from the subtitle stream stream#3 as the fourth elementary stream, their private_stream_id's are 0x81 and 0x81, respectively.

In the subtitle stream stream#2 as the fourth elementary stream of the clip stream file "00001.PS," subtitle_language_code of StaticInfo( ) (FIG. 12) contained in StreamInfo( ) is "Japanese," configurable_flag being 1. Thus, the subtitle stream stream#3 is Japanese subtitle data. The display mode of the subtitle stream stream#3 is permitted to be changed.

In the subtitle stream stream#3 as the fourth elementary stream of the clip stream file "00001.PS," number_of_DynamicInfo of StreamInfo( ) (FIG. 10) is 0. There is no pair of pts_change_point and DynamicInfo( ).

In FIG. 26A and FIG. 26B, in the clip information file "00002.CLP," presentation_start_time is 90,000, presentation_end_time being 27,090,000° Thus, a program stream stored in the clip stream file "00002.PS" corresponding to the clip information file "00002.CLP" can use a content for 300 seconds ((27,090,000−90,000/90 kHz).

In the clip information file "00002.CLP," capture_enable_flag_Clip is 0. Thus, a video stream (video data corresponding thereto) multiplexed with a program stream stored in the clip stream file "00002.PS" corresponding to the clip information file "00002.CLP" is not permitted to be secondarily used (prohibited from being secondarily used).

In FIG. 26A and FIG. 26B, in the clip information file "00002.CLP," number_of_streams is 4. Thus, like the foregoing clip stream file "00001.CLP," four elementary streams are multiplexed with a program stream stored in the corresponding clip stream file "00002.PS."

Assuming that the four elementary streams are denoted by stream#0 stream#1, stream#2, and stream#3, specific examples of StreamInfo( )'s (FIG. 10) of the four elementary streams, which are stream#0, stream#1, stream#2, and stream#3, are described below a "00002.CLP" field shown in FIG. 26A and FIG. 26B.

In FIG. 26A and FIG. 26B, the contents of StreamInfo( )'s of the first to fourth elementary streams of the clip stream file "00002.PS" are the same as those of the first to fourth elementary streams of the clip stream file "0000.PS". Thus, their description will be omitted.

As described above, the contents of StreamInfo( )'s of the first to fourth elementary streams, stream#0 to stream#3, of the clip stream file "00002.PS" are the same as those of the first to fourth elementary streams, stream#0 to stream#3, of the clip stream file "00001.CLP." Thus, the first elementary stream stream#0 of the clip stream file "00002.PS" is a video stream. The second elementary stream stream#1 is an ATRAC audio stream. The third and fourth elementary streams, stream#2 and stream#3, are subtitle streams.

In FIG. 26A and FIG. 26B, in the clip information file "00003.CLP," presentation_start_time is 90,000, presentation_end_time being 81,090,000. Thus, a program stream stored in the clip stream file "00003.PS" corresponding to the clip information file "00003.CLP" can use a content for 900 seconds ((81,090,000−90,000)/90 kHz).

In the clip information file "00003.CLP," capture_enable_flag_Clip is 1. Thus, a video stream multiplexed with a program stream stored in the clip stream file "00003.PS" corresponding to the clip information file "00003.CLP" is permitted to be secondarily used.

In FIG. 26A and FIG. 26B, in the clip information file "00003.CLP," number_of_streams is 3. Thus, three elementary streams are multiplexed with a program stream stored in the clip stream file "00003.PS."

Assuming that the three elementary streams are denoted by stream#0, stream#1 and stream#2, specific examples of StreamInfo( ) is (FIG. 10) of the three streams, which are stream#0, stream#1, and stream#2, are described below a "00003.CLP" field shown in FIG. 26A and FIG. 26B.

In the first elementary stream stream#0 of the clip stream file "00003.PS," stream_id is 0xE0. Thus, as described in FIG. 20 and FIG. 22 (or FIG. 11), the elementary stream stream#0 is a video stream. Like the first elementary stream stream#0 of the clip stream file "00001.CLP," private_stream_id is 0x00.

In the video stream stream#0 as the first elementary stream of the clip stream file "00003.PS," picture_size of StaticInfo( ) (FIG. 12) contained in StreamInfo( ) is "720×480", frame_rate being "29.97 Hz," cc_flag being "No." Thus, the video stream stream#0 is video data having 720× 480 pixels and a frame period of 29.97 Hz. The video stream stream#0 does not contain closed caption data.

In the video stream stream#0 as the first elementary stream of the clip stream file "00003.PS," number_of_DynamicInfo of StreamInfo( ) (FIG. 10) is 2. Thus, two sets of pts_change_point's and DynamicInfo( )'s are described in StreamInfo( ).

In the second elementary stream stream#1 of the clip stream file "00003.PS," stream_id is 0xE1. Thus, as described in FIG. 20 and FIG. 21 (or FIG. 11 the elementary stream stream#1 is a video stream. To distinguish the video stream stream#0 as the first elementary stream of the clip stream file "00003.PS" from the video stream stream#1 as the second elementary stream, their stream_id's are 0xE0 and 0xE1, respectively. Like the first elementary stream stream#0 of the clip stream file "00001.CLP," private_stream_id is 0x00.

In the video stream stream#1 as the second elementary stream of the clip stream file "00003.PS," picture_size, frame_rate, and cc_flag of StaticInfo( ) (FIG. 12) contained in StreamInfo( ) are the same as those of the video stream stream#0 as the first elementary stream. Thus, the video stream stream#1 as the second elementary stream of the clip stream file "00003.PS" is video data having 720×480 pixels and a frame period of 29.97 Hz. The video stream stream#1 does not contain closed caption data.

In the video stream stream#1 as the second elementary stream of the clip stream file "00003.PS," number_of_DynamicInfo of StreamInfo( ) (FIG. 10) is 0. Thus, there is no pair of pts_change_point and DynamicInfo( ).

In the third elementary stream stream#2 of the clip stream file "00003.PS," stream_id is 0xBD, private_stream_id being 0x00. Thus, as described in FIG. 20 and FIG. 22, the elementary stream stream#2 is an ATRAC audio stream.

In the ATRAC audio stream stream#2 as the third elementary stream of the clip stream file "00003.PS," audio_language-code, channel_configuration, lfe_existence, and sampling_frequency of StaticInfo( ) (FIG. 12) contained in StreamInfo( ) are the same as those of the ATRAC audio stream stream#1 as the second elementary stream of the clip stream file "00001.CLP." Thus, the ATRAC audio stream stream#2 as the third elementary stream of the clip stream file "00003.PS" is Japanese and stereo audio data. In addition, the ATRAC audio stream stream#2 does not contain a low frequency effect channel. The ATRAC audio stream stream#2 has a sampling frequency of 48 kHz.

In the ATRAC audio stream stream#2 as the third elementary stream of the clip stream file "00003.PS," number_of_DynamicInfo of StreamInfo( ) (FIG. 10) is 3. Thus, StreamInfo( ) describes three sets of pts_change_point's and DynamicInfo( )'s.

FIG. 27 shows a specific example of EP_map( ) of the clip information file Clip( ) described in FIG. 10. FIG. 27 shows a specific example of EP_map( ) shown in FIG. 14, of the clip information file "00001.CLP" shown in FIG. 4.

In FIG. 27, in EP_map( ), number_of_stream_id entries is 1. Thus, EP_map( ) describes information of a decode startable point of one elementary stream.

In EP_map( ) shown in FIG. 27, stream_id is 0xE0. Thus, as described in FIG. 20 and FIG. 22, EP_map( ) describes information (PTS_EP_start and RPN_EP_start (FIG. 14)) of a decode startable point of a video stream_identified by stream_id that is 0xE0. In FIG. 27, EP_map( ) is the clip information file "00001.CLP." As described in FIG. 26A and FIG. 26B, in the clip stream file "00001.PS" corresponding to the clip information file "00001.CLP," an elementary stream whose stream_id is 0xE0 is the first video stream of the clip stream file "00001.PS." Thus, information described in EP_map( ) shown in FIG. 27 is PTS_EP_start and RPN_EP_start of a decode startable point of the video stream stream#0.

In FIG. 27, the first five PTS_EP_start's and RPN_EP_start's of decode startable points of the first video stream stream#0 of the clip stream file "00001.PS" are described but sixth and later PTS_EP_start's and RPN_EP_start's are omitted.

In EP_map( ) shown in FIG. 27 private_stream_id is 0x00. When stream_id represents a video stream private_stream_id is ignored.

FIG. 28 shows specific examples of PlayListMark( )'s of PlayList#0 and PlayList#1 described in FIG. 25 (PlayList( ) shown in FIG. 5).

An upper table shown in FIG. 28 represents PlayList Mark( ) (FIG. 7) of PlayList#0.

In the upper table shown in FIG. 28, number_of_PlayList_marks of PlayListMark( ) of PlayList#0 is 7. Thus, the number of Mark( )'s contained in PlayList#0 (PlayListMark( ) thereof) is 7.

In the upper table shown in FIG. 28 mark_type (FIG. 7) of Mark#0 as the first Mark( ) of seven Mark( )'s contained in PlayList#0 is "Chapter."Thus, Mark#0 is a chapter mark. In addition, since ref_to_PlayItem_id (FIG. 7) is 0, Mark#0 belongs to PlayItem#0 of two PlayItem#0 and #1 shown in FIG. 25. In addition, mark_time_stamp of Mark#0 is 180,090. Thus, Mark#0 is a mark of time (reproduction time) 180,090 of a clip stream file reproduced by PlayItem#0 contained in PlayList#0. Both entry_ES_stream_id and entry_ES_private_stream_id of Mark#0 are 0. Thus, Mark#0 is not correlated with any elementary stream. In addition, mark_data of Mark#0 is 1. Thus, Mark#0 represents a chapter whose number is 1.

A clip stream file reproduced by PlayItem#0 contained in PlayList#0 is the clip stream file "00001.PS" identified by "00001.CLP" described in Clip_Information_file_name of PlayItem#0 (FIG. 25). Thus, time 180,090 represented by mark_time_stamp of Mark#0 is the time of the clip stream, file "00001.PS."

In the upper table shown in FIG. 28, Mark#4 as the fifth Mark( ) of seven Mark( )'s contained in PlayList#0 is a chapter mark that is the same as the first Mark#0.

In other words, mark_type (FIG. 7) of Mark#4 as the fifth Mark( ) is "Chapter." Thus, Mark#4 is a chapter mark. In addition, ref_to_PlayItem_id (FIG. 7) of Mark#4 is 1. Thus, Mark#4 belongs to PlayItem#1 of two PlayItem#0 and #1, shown in FIG. 25, contained in PlayList#0. mark_time_stamp of Mark#4 is 90,000. Thus, Mark#4 is a mark of time 90,000 of a clip stream file reproduced by PlayItem#1 contained in PlayList#0. In addition, both entry_ES_stream_id and entry_ES_private_stream_id of Mark#4 are 0. Thus, Mark#4 is not correlated with any elementary stream. In addition, mark_data of Mark#4 is 2. Thus, Mark#4 represents a chapter whose number is 2.

In this example, a clip stream file reproduced by PlayItem#1 contained in PlayList#0 is the clip stream file "00002.PS" identified by "00002.CLP" described in Clip_Information_file_name of PlayItem#1 (FIG. 25). Thus, time 90,000 represented by mark_time_stamp of Mark#4 is time of the clip stream file "00002.PS."

In the upper table shown in FIG. 28, mark_type (FIG. 7, of Mark#1 as the second Mark( ) of seven Mark( )'s contained in PlayList#0 is "Index." Thus, Mark#1 is an index mark. In addition, ref_to_PlayItem_id (FIG. 7) of Mark#1 is 0. Thus, Mark#1 belongs to PlayItem#0 of two PlayItem#0 and #10 shown in FIG. 25, contained in PlayList#0. In addition, mark_time_stamp of Mark#1 is 5,580,090. Thus, Mark#1 is a mark of time 5,580,090 of a clip stream file reproduced by PlayItem#0 contained in PlayList#0. In addition, both entry_ES_stream_id and entry_ES_private_stream_id of Mark#1 are 0. Thus, Mark#1 is not correlated with any elementary stream. In addition, mark_data of Mark#1 is 1. Thus, Mark#1 represents an index whose number is 1.

In this example, a script stream file reproduced by PlayItem#0 contained in PlayList#0 is the clip stream file "00001.PS" as described above. Thus, time 5,580,090 represented by mark_time_stamp of Mark#1 is the time of the clip stream file "00001.PS."

In the upper table shown in FIG. 28, Mark#2, Mark#5, and Mark#6 as the third, sixth, and seventh Mark( )'s of the seven Mark( )'s contained in PlayList#0 are index marks like the second Mark#1.

In the upper table shown in FIG. 28, mark_type (FIG. 7) of Mark#3 as the fourth Mark( ) of the seven Mark( )'s contained in PlayList#0 is "Event." Thus, Mark#3 is an event mark. In addition, ref_to_PlayItem_id (FIG. 7) of Mark#3 is 0. Thus, Mark#3 belongs to PlayItem#0 of two PlayItem#0 and #1, shown in FIG. 25, contained in PlayList#0. In addition, mark_time_stamp of Mark#3 is 16,380,090. Thus, Mark#3 is a mark of time 16,380,090 of a clip stream file reproduced by PlayItem#0 contained in PlayList#0. entry_ES_stream_id and entry_ES_private_stream_id of Mark#3 are 0. Thus, Mark#3 is not correlated with any elementary stream. In addition, mark_data of Mark#3 is 0. Thus, Mark#3 causes an event with an argument of 0 to take place.

As described above, a clip stream file reproduced by PlayItem#0 contained in PlayList#0 is the clip stream file "00001.PS." Time 16,380,090 represented by mark_time_stamp of Mark#3 is the time of the clip stream file "00001.PS."

In the upper table shown in FIG. 28, cumulative times of PlayItem( )' to which Mark( )'s belong are described in a left field on the right side of the table of PlayListMark( ) of PlayList#0. Cumulative times of PlayList#0 are described in a right field on the right side of the table.

A lower table shown in FIG. 28 represents PlayList Mark( ) of PlayList#1 (FIG. 7).

In the lower table shown in FIG. 28, number_of_PlayList_marks of PlayListMark( ) of PlayList#1 is 3. Thus, the number of Mark( )'s contained in PlayList#1 (PlayListMark( ) thereof) is 3.

In the lower table shown in FIG. 28, mark_type (FIG. 7) of Mark#0 as the first Mark( ) of three Mark( )'s contained in PlayList#1 is "Chapter." Thus, Mark#0 is a chapter mark. In addition, ref_to_PlayItem_id (FIG. 7) of Mark#0 is 0. Thus, Mark#0 belongs to one PlayItem#0, shown in FIG. 25, contained in PlayList#1 mark_time_stamp of Mark#0 is 90,000. Thus, Mark#0 is a mark of time 90,000 of a clip stream file reproduced by PlayItem#0 contained in PlayList#1. Both entry_ES_stream_id and entry_ES_private_stream_id of Mark#0 are 0. Thus, Mark#0 is not correlated with any elementary stream. In addition, mark_data of Mark#0 is 0. Thus, Mark#0 represents a chapter whose number is 0

A clip stream file reproduced by PlayItem#0 contained in PlayList#1 is the clip stream file "00003.PS" identified by "00003.CLP" described in Clip_information_file_name of PlayItem#0 (FIG. 25). Thus, time 90,000 represented by mark_time_stamp of Mark#0 is the time of the clip stream file "00003.PS."

In the lower table shown in FIG. 28, mark_type (FIG. 7) of Mark#1 as the second Mark( ) of three Mark( )'s contained in PlayList#1 is "Event." Thus, Mark#1 is an event mark. In addition, ref_to_PlayItem_id (FIG. 7) of Mark#1 is 0. Thus, Mark#1 belongs to PlayItem#0, shown in FIG. 25, which contained in PlayList#1. In addition, mark_time_stamp of Mark#1 is 27,090,000. Thus, Mark#1 is a mark of time 27,090,000 of a clip stream file reproduced by PlayItem#0 contained in PlayList#1. In addition, in Mark#1, entry_ES_stream_id is 0xE0 and entry_ES_private_stream_id is 0. Thus, Mark#1 is correlated with an elementary stream whose stream_id is 0xE0, namely Mark#1 is correlated with a video stream as described in FIG. 20 and FIG. 22. In addition, mark_data of Mark#1 is 1 Mark#1 causes an event with an attribute of 1 to take place.

As described above a clip stream file reproduced by PlayItem#0 contained in PlayList#1 is "00003.PS." Thus, time 27,090,000 represented by mark_time_stamp of Mark#1 is the time of the clip stream file "00003.PS."

A video stream whose stream_id is 0xE0, correlated with Mark#1 is the first elementary stream (video stream) stream#0 of three elementary streams stream#0 to #2 multiplexed with the clip stream file "00003.PS" identified by the clip information file "00003.CLP" shown in FIG. 26A and FIG. 26B.

In the lower table shown in FIG. 28, mark_type of Mark#2 as the third Mark( ) of three Mark( )'s contained in PlayList#1 is "Event." Thus, Mark#2 is an event mark. In addition, ref_to_PlayItem_id (FIG. 7) of Mark#2 is 0. Thus, Mark#2 belongs to PlayItem#0, which is one of PlayItem's, shown in FIG. 2S, contained in PlayList#1. In addition, mark_time stamp of Mark#2 is 27,540,000. Thus, Mark#1 is a mark of time 27,540,000 of a clip stream file reproduced by PlayItem#0 contained in PlayList#1. In addition, in Mark#2, entry_ES_stream_id is 0xE1 and entry_ES_private_stream_id is 0. Thus, Mark#—is an element stream whose stream_id is 0xE1, namely correlated with a video stream as described in FIG. 20 and FIG. 22. In addition, mark_data of Mark#2 is 2. Thus, Mark#2 causes an event with an argument of 2 to take place.

In this example, as described above, a clip stream file reproduced by PlayItem#0 contained in PlayList#1 is the clip stream file "00003.PS." Thus, time 27,540,000 represented by Mark#2 is a time of the clip stream file "00003.PS."

A video stream, whose stream_id is 0xE1, correlated with Mark#2, is a video stream described in "00003.CLP" described in Clip_Information_file_name of PlayItem#0 contained in PlayList#1 shown in FIG. 25, namely the second elementary stream (video stream stream#1 of three elementary streams stream#0 to #2 multiplexed with the clip stream file "00003.PS" recognized from the clip information file "00003.CLP" shown in FIG. 26A and FIG. 26B.

In the lower table shown in FIG. 28, cumulative times of PlayItem( )'s to which Mark( )'s belong are described on the right side of the table of PlayListMark( ), of PlayList#1.

In FIG. 28, although mark_data describes chapter and index numbers that chapter and index marks represent, they may not been described in mark_data. Instead, by counting chapter and index marks of PlayListMark( ), chapter and index numbers can be recognized

[Description of Operation of Disc Device]

Next, the operation of the disc device shown in FIG. 1 will be described assuming that data (files) described in FIG. 25 to FIG. 28 have been recorded on the disc 101 shown in FIG. 1.

When the disc 101 is loaded into the disc drive 102, a corresponding message is sent through the drive interface 114 and the operating system 201 shown in FIG. 2A and FIG. 2B to the video content reproduction program 210. When the video content reproduction program 210 has received from the operating system 201 the message that represents that the disc 101 had been loaded into the disc drive 102, the video content reproduction program 210 starts a pre-reproduction process shown in FIG. 29.

[Pre-Reproduction Process]

Figure 29:
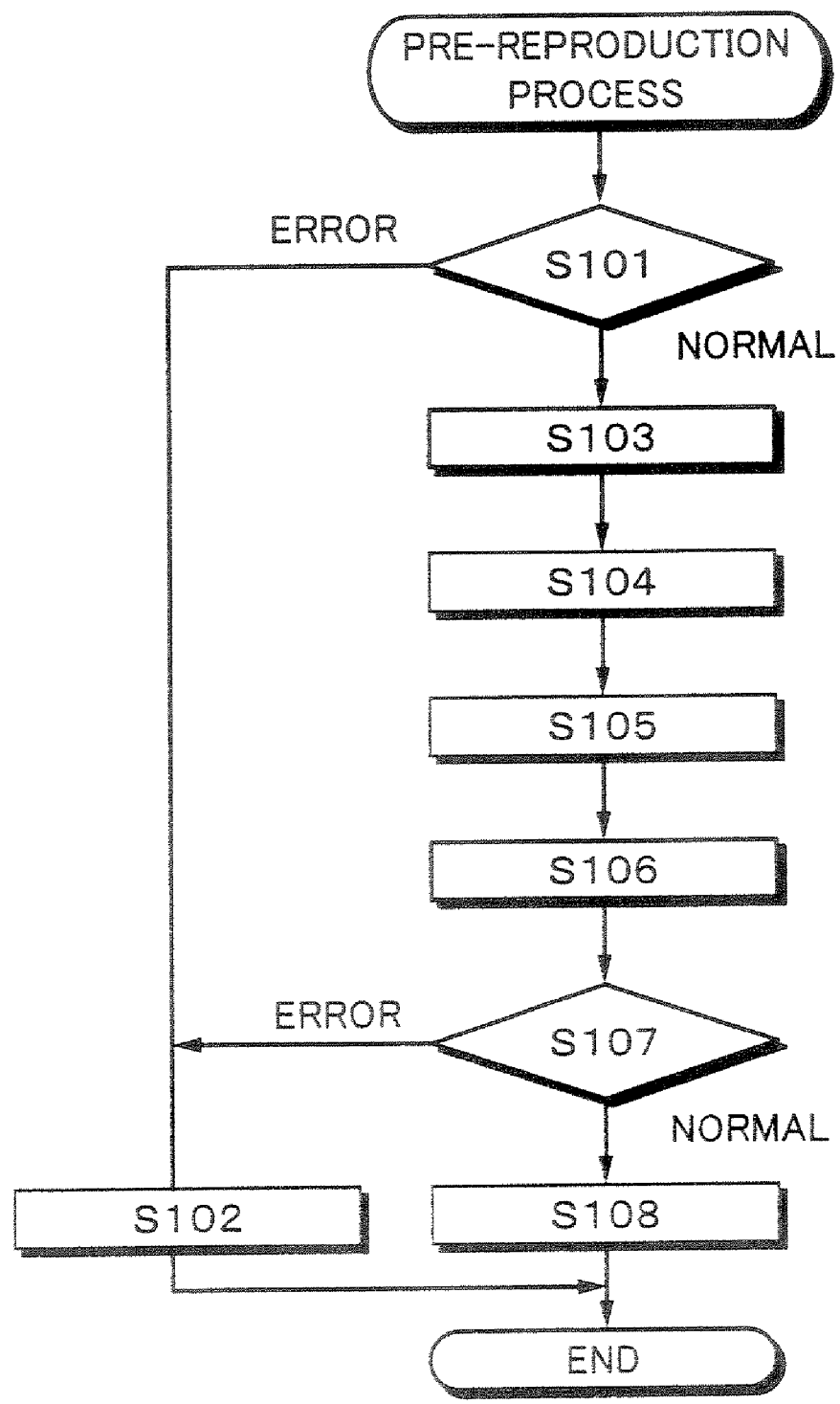
FIG. 29 is a flow chart describing a pre-reproduction process.

FIG. 29 is a flow chart describing the pre-reproduction process that the video content reproduction program 210 executes.

It should be noted that the disc device does not need to perform operations or processes in the time sequence of the flow chart. Alternatively, the disc device may perform the operations or processes in parallel or discretely. However, in the specification, for convenience, the operations or processes of the disc device will be described corresponding to the flow chart.

In the pre-reproduction process, at step S101, the video content reproduction program 210 checks the disc 101 with a file system function of the operating system 201 and determines whether the disc 101 is a normal disc for the video content reproduction program 210

As described above, although the disc 101 is accessed (files are read therefrom) with the file system function of the operating system 201, the description thereof will be omitted.

When the determined result at step S101 represents that the disc 101 is not a normal disc, namely the file system used in the disc 101 does not comply with the operating system 201 or the root directory of the disc 101 does not contain the "VIDEO" directory, the video content reproduction program 210 determines that the video content reproduction program 210 do not comply with the disc 101, the flow advances to step S102. At step S102, the graphics process module 219 performs an error process and completes the pre-reproduction process.

In other words the graphics process module 219 generates an error message (video data thereof) that represents that the disc 101 is not normal as an error process and causes the video output module 220 to output the error message so that the error message is displayed. The error process may be performed or example by outputting an alarm sound from the audio output module 221 or unloading the disc 101 from the disc drive 102.

When the determined result at step S101 represents that the disc 101 is a normal disc, the flow advances to step S103. At step S103, the video content reproduction program 210 causes the content data supply module 213 to request the operating system 201 to read the two data files, "SCRIPT.DAT" and "PLAYLIST.DAT," stored in the "VIDEO" directory of the disc 101 (FIG. 4). Thereafter, the flow advances to step S104. At step S104, the "SCRIPT.DAT" file is supplied to the script control module 211. In addition, the "PLAYLIST.DAT" file is supplied to the player control module 212.

Thereafter, the flow advances from step S104 to steps S105 through 3107. At steps S105 through S107, the player control module 212 performs an initialization process. The script control module 211 waits until the player control module 212 has completed the initialization process

[Initialization Process of Player Control Module 212]

In the initialization process, at step S105, the player control module 212 analyzes the "PLAYLIST.DAT" file and checks the number of clip information files described in the "PLAYLIST.DAT" file and their file names.

In other words, since the "PLAYLIST.DAT" file is as shown in FIG. 25 and number_of_PlayLists of the "PLAYLIST.DAT" file shown in FIG. 25 is 2, the player control module 212 recognizes that there are two PlayList( ). As that are PlayList#0 and PlayList#1. In addition, since number_of_PlayItems of the first. PlayList#0 of the "PLAYLIST.DAT" file shown in FIG. 25 is 2, the player control module 212 recognizes that PlayList#0 contains two PlayItem( )'s that are PlayItem#0 and PlayItem#1. Thereafter, the player control module 212 references Clip_Information_file_name's of the first PlayItem#0 and the second PlayItem#1 contained in PlayList#0 of the "PLAYLIST.DAT" file shown in FIG. 25 and recognizes that the clip information file (the file name thereof) of the first PlayItem#0 contained in PlayList#0 is "00001.CLP" and the clip information file of the second PlayItem#1 is "00002.CLP."

Likewise, the player control module 212 recognizes that the second PlayList#1 contains one PlayItem( ) (PlayItem#0) because number_of_PlayItems is 1 and that the clip information file of PlayItem#0 is "00003.CLP" because of Clip_Information_file_name of PlayItem#0.

Thereafter, the flow advances from step S105 to step S106. At step S106, the player control module 212 reads clip information files recognized at step S105, namely three clip information files "00001.CLP," "00002.CLP," and "00003.PS" from the "CLIP" directory under the "VIDEO" directory of the disc 101.

A clip information file of PlayItem of PlayList( ) that is needed to be read at step S106 is only a clip information of PlayItem of PlayList( ) that is first reproduced. According to this embodiment, however, as described above, all clip information files of PlayItem( ) of PlayList( ) are pre-read.

After step S106, the flow advances to step S107. At step S107, the player control module 212 determines whether clip information files recognized at step S105 have been successfully read. In addition, the player control module 212 determines (checks) whether clip stream files corresponding to the clip information files are present on the disc 101. In other words, at step S107, the player control module 212 determines whether the clip information files "00001.CLP," "00002.CLP," and "00003.CLP" have been successfully read and the clip stream files "00001.PS," "00002.PS," and "00003.PS" corresponding to the clip information files "00001.CLP," "00002.CLP," and "00003.CLP" are present in the "STREAM" directory under the "VIDEO" directory of the disc 101.

When the determined result at step S107 represents that the clip information files recognized at step S105 have not been successfully read or that the clip stream files corresponding to the clip information files are not present on the disc 101, namely clip information files and clip stream files corresponding to the "PLAYLIST.DAT" file have not been recorded on the disc 101, the video content reproduction program 210 determines that the disc 101 is not correct. Thereafter, the flow returns to step S102. At step S102, the video content reproduction program 210 performs the foregoing error process and completes the pre-reproduction process.

On the other hand, when the determined result at step S107 represents that clip information files recognized at step S105 have been successfully read and that the clip stream files corresponding to the clip information files are present on the disc 101, the player control module 212 completes the initialization process. Thereafter, the flow advances to step S108.

At step S108, the script control module 211 interprets and execute the "SCRIPT.DAT" file.

Figure 30:
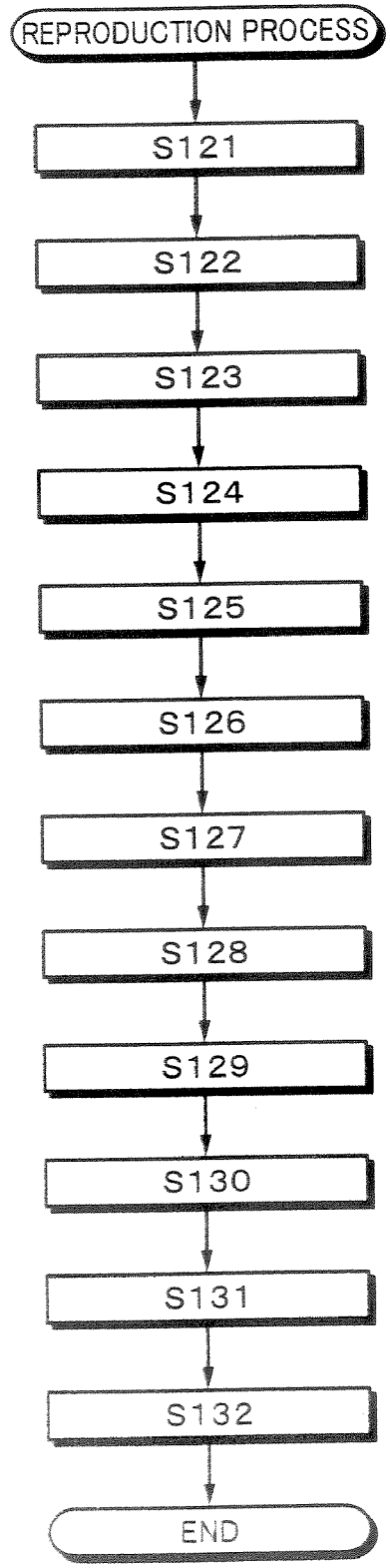
FIG. 30 is a flow chart describing a reproduction process.

When the script control module 211 executes the "SCRIPT.DAT" file, assuming that the player control module 212 has caused the first PlayList( ) (PlayList#0) to be reproduced, a reproduction process shown in FIG. 30 is performed.

[Reproduction Process]

FIG. 30 is a flow chart of the reproduction process that the video content reproduction program 210 performs.

[Reproduction Preparation Process]

At steps S121 and S122, the player control module 212 performs a reproduction preparation process for PlayList( ) that the script control module 211 has caused to be reproduced, namely the first PlayList( ) (PlayList#0).

In other words, at step S121, the player control module 212 checks IN_time (FIG. 6) of the first PlayItem#0 contained in the first PlayList#0. Thereafter, the flow advances to step S122. At step S122, the player control module 212 checks the reproduction start position corresponding to IN_time of PlayItem#0 of the clip stream file "00001.CLP" reproduced by the first PlayItem#0 contained in the first PlayList#0.

When IN_time (FIG. 6) of PlayItem( ) represents the beginning of a clip stream file, a program stream is read from the beginning of the clip stream file. However, when IN_time represents other than the beginning of a clip stream file, the player control module 211 needs to search (check) for the position corresponding to IN_time and read the clip stream file from the position.

Specifically, in FIG. 25, IN_time of the first PlayItem#0 contained in the first PlayList#0 is 180,090. The player control module 212 searches EP_map( ), shown in FIG. 27, of the clip stream file "00001.CLP" reproduced by the first PlayItem#0 contained in the first PlayList#0, for the reproduction start position where IN_time of PlayItem#0 is 180,090.

In other words, the player control module 212 searches for the maximum PTS_EP_start that satisfies PTS_EP_start≦IN_time where PTS_EP_start represents a decode startable point described in EP_map( ) by the binary search method or the like. This is because the position represented by IN_time is not always a decode startable point.

In this case, as described above, IN_time is 180,090. In addition, in EP_map( ) shown in FIG. 27 of the clip stream file "00001.CLP" reproduced by the first PlayItem#0 contained in the first PlayList#0, the maximum value of PTS_EP_start that satisfies PTS_EP_start≦IN_time is 180,090. Thus, the player control module 212 searches EP_map( ) shown in FIG. 27 for PTS_EP_start that is 180,090.

In addition, the player control module 212 reads 305 (sectors) searched for RPN_EP_start and decides a position represented by RPN_EP_start in the clip stream file "00001.CLP" as the reproducing start position.

After the player control module 212 has decided the reproduction start position, the flow advances from S122 to step S123. At step S123, the player control module 212 controls the graphics process module 219 to display a time code. The graphics process module 219 generates a time code (video data thereof) under the control of the player control module 212 and outputs the time code to the video output module 220. Thus, the time code is displayed.

The time code displayed at step S123 is for example a value of which the beginning of PlayList( ) is converted into 00:00:00 (hour: minute: second). In addition to or instead of the time code, a chapter number and an index number may be displayed.

[Analysis Process of PlayListMark( )]

After the time code has been displayed at step S123, the flow advances to step S124. At step S124, the player control module 212 performs an analysis process that analyzes PlayList( ) that the script control module 211 has caused to be reproduced namely PlayListMark( ) (FIG. 7) described in the first PlayList( ) (PlayList#0).

Specifically, in the upper table shown in FIG. 28, number_of_PlayList_marks of PlayListMark( ) of the first PlayList#0 of the "PLAYLIST.DAT" file that has been pre-read is 7. Thus, the player control module 212 recognizes that the number of Mark( )'s contained in PlayList#0 is 7.

In addition, the player control module 212 analyzes seven Mark( )'s of the upper table shown in FIG. 28 and recognizes that four Markers of the first to fourth Mark( )'s of seven Mark( )'s belong to the first PlayItem( ) (PlayItem#0) of PlayList#0.

Thereafter, the player control module 212 obtains mark_time_stamp's in four Mark( )'s that belong to the first PlayItem#0 of PlayList#0 and supplies them as a four-element matrix to the decode control module 214. Thus, four times {180,090}, {5,580,090}, {10,980,090}, and {16,380,090} as mark_time_stamp's of four Mark( )'s of the first to fourth Mark( )'s of the seven Mark( )'s in the upper table shown in FIG. 28 are sent from the player control module 212 to the decode control module 214. At this point, an attribute of "mark process" of these times is sent from the player control module 212 to the decode control module 214. When the time counted by the time count portion 214A matches a time having an attribute of "mark process," the decode control module 214 sends a corresponding message, the time matched with the time having an attribute of "mark process," and an attribute of "mark process" to the player control module 212.

[Decision Process of Elementary Stream to be Reproduced]

Thereafter, the flow advances from step S124 to step S125. At step S125, the player control module 212 decides an elementary stream to be reproduced.

In other words, in the clip information file "00001.CLP," shown in FIG. 26A and FIG. 26B, described in Clip_Information_file_name of the first PlayItem#0 (FIG. 25 of the first PlayList#0 as PlayList( ) that the script control module 211 has caused to be reproduced, number_of_streams is 4. Thus, the player control module 212 recognizes that four elementary streams have been multiplexed with the corresponding clip stream file "00001.PS." In addition, the player control module 212 checks stream_id and private_stream_id of StaticInfo( ) of the clip information file "00001.CLP", shown in FIG. 26A and FIG. 26B, of the four elementary streams and recognizes that the four elementary streams are one video stream, one ATRAC audio stream, and two subtitle streams. In other words, the player control module 212 recognizes the number of elementary streams having individual attributes multiplexed with the clip stream file "00001.PS."

Information about the number of elementary streams having individual attributes multiplexed with a clip stream file is used to change one elementary stream to another elementary stream to be reproduced (from one audio mode to another audio mode or from one subtitle mode to another subtitle mode). When a clip stream file does not contain a subtitle stream file, namely, a content does not include subtitle data, it is determined whether there is a subtitle stream with the information about the number of elementary streams having an attribute of "subtitle stream."

The player control module 212 selects and decides an elementary stream to be reproduced corresponding to the check result of StaticInfo( ). In this case, four elementary streams multiplexed with the clip stream file "00001.PS" contain one elementary stream having an attribute of "video stream" and one elementary stream having an attribute of "audio stream." Thus, the elementary stream having an attribute of "video stream" and the elementary stream having an attribute of "audio stream" (ATRAC audio stream) are individually decided as elementary streams to be reproduced.

On the other hand, four elementary streams multiplexed with the clip stream file "00001.PS" contain two elementary streams having an attribute of "subtitle stream." Thus, one of these two subtitle streams is selected and decided. In this example, a subtitle stream that first appears in the two subtitle streams in the clip information file "00001.CLP" is selected.

When the attributes and the number of elementary streams multiplexed with the clip stream file "00001.PS" are recognized, four elementary streams need to be identified. The player control module 212 identifies the four elementary streams multiplexed with the clip stream file "00001.PS" with stream_id and private_stream_id.

In other words, the player control module 212 identifies an elementary stream having an attribute of "video stream" from the four elementary streams multiplexed with the clip stream file "00001.PS" with stream_id that is 0xE0 as described in the clip information file "00001.CLP" shown in FIG. 26A and FIG. 26B.

In addition the player control module 212 identifies an ATRAC audio stream which is an elementary stream having an attribute of "audio stream" from the four elementary streams multiplexed with the clip stream file "00001.PS" with stream_id that is 0xBD and private_stream_id that is 0x00 as described in the clip information file "00001.CLP" shown in FIG. 26A and FIG. 26B.

In addition, the player control module 212 identifies two subtitle streams, which are elementary streams having an attribute of "subtitle stream," from the four elementary streams multiplexed with the clip stream file "00001.PS" with stream_id that is 0xBD and private_stream_id that is 0x80 and with stream_id that is 0xBD and private_stream_id that is 0x81.

As described above, an elementary stream multiplexed with a clip stream file can be identified by stream_id and private_stream_id described as meta data of a clip information file corresponding to the clip stream file.

A combination of stream_id and private_stream_id is a mechanism provided to extend the multiplexing of the MPEG2-System. When a combination of stream_id and private_stream_id is used as meta data that are a database, an elementary stream can be securely identified. In addition, when private_stream_id is extended for increases of the number and types of corresponding elementary streams, the current mechanism can be used without any change. Thus, a combination of stream_id and private_stream_id has high extensibility.

In other words, for example the blu-ray disc (BD) standard uses a packet ID (PID) of a transport stream of the MPEG2 standard to identify data. Thus, the BD standard is restricted by the MPEG2 standard. On the other hand, the DVD-Video standard defines sub stream_id that is similar to private_stream_id. However, sub_stream_id cannot be described in a database to identify a stream. sub_stream_id is described in a fixed region or information of only eight to 32 streams (see VI4-49, Table 4.2.1-2 (VTS_AST_ATRT) and VI4-52, Table 4.2.1-3 (VTS_SPST_ATRT)). Thus, sub_stream_id does not have high extensibility.

On the other hand, a combination of stream_id and private_stream_id can be described with beta data. For example, clip information files Clip( ) shown in FIG. 10 can describe a combination of stream_id and private_stream_id corresponding to a value represented by number_of_streams. Thus, elementary streams multiplexed with a clip stream file can be identified by a combination of stream_id and private_stream_id as meta data described in the clip information file Clip( ) regardless of the number of elementary streams (in the range represented by number_of_streams).

According to this embodiment, a combination of stream_id and private_stream_id is used to identify an elementary stream multiplexed with a clip stream file corresponding to a clip information file shown in FIG. 10. In addition, this combination can be used to identify an elementary stream that correlates Mark( ) as a combination of entry_ES_stream_id and entry_ES_private_stream_id of PlayListMark( ) shown in FIG. 7. In addition, a combination of stream_id and private_stream_id is used to identify an elementary stream that describes information of a decode startable point in EP_map( ) shown in FIG. 14.

[Output Attribute Control Process]

Thereafter, the flow advances from step S125 to step S126. At step S126, the player control module 212 performs an output attribute control process for an elementary stream decided at step S125 as that to be reproduced at step S125.

Specifically the player control module 212 checks number_of_DynamicInfo (FIG. 10), which represents the number of DynamicInfo( )'s (FIG. 13), which describe output attributes of a video stream, an ATRAC audio stream, and an subtitle stream decided at step S125 as those to be reproduced.

In this case, a video stream, an ATRAC audio stream, and a subtitle stream to be reproduced are elementary streams multiplexed with the clip stream file "00001.PS". In the clip information file "00001.CLP" shown in FIG. 26A and FIG. 26B, number_of_DynamicInfo's are all 0. When number_of_DynamicInfo's are all 0 the player control module 212 does not perform the output attribute control process for output attributes of elementary streams to be reproduced.

When number_of_DynamicInfo of elementary streams to be reproduced is not 0/the output attribute control process for the elementary streams is performed. The output attribute control process will be described later.

[Reproduction Start Preparation Process]

After step S126, the flow advances to step S127. At step S127, the player control module 212 performs the reproduction start preparation process for elementary streams to be reproduced.

In other words, the player control module 212 supplies the file name of the clip stream file "00001.PS" with which an elementary stream to be reproduced has been multiplexed and RPN_EP_start (=305) described in EP_map( ) as the reproduction start position decided at step S122 to the content data supply module 213.

In addition, the player control module 212 initializes the buffer control module 215 before the program stream stored in the clip stream file "00001.PS" with which the elementary stream to be reproduced has been multiplexed is supplied to the buffer control module 215.

Specifically, the buffer control module 215 (FIG. 3) sets the same value to the data start pointer stored in the data start pointer storage portion 231, the data write pointer stored in the data write pointer storage portion 232, the video read pointer stored in the video read pointer storage portion 241, the audio read pointer stored in the audio read pointer storage portion 251, and the subtitle read pointer stored in the subtitle read pointer storage portion 262.

Thus, the data start pointer stored in the data start pointer storage portion 231 and the data write pointer stored in the data write pointer storage portion 232 hold the same position of the buffer 215A of the buffer control module 215. This represents that no valid data have been stored in the buffer 215A.

In addition, the player control module 212 supplies stream_id and if necessary private_stream_id as identification information for an elementary stream to be reproduced to the buffer control module 215.

In other words, as described above, a video stream having an attribute of "video stream" in elementary streams to be reproduced is identified by stream_id that is 0xE0. An ATRAC audio stream having an attribute of "audio stream" is identified by stream_id that is 0xBD and private_stream_id that is 0x00. A subtitle stream having an attribute of "subtitle stream" is identified by stream_id that is 0xBD and private_stream_id that is 0x80. The player control module 212 supplies these stream_id's and private_stream_id's to the buffer control module 215.

In the buffer control module 215 (FIG. 3), the video read function portion 233 stores stream_id that is 0xE0 for a video stream, received from the player control module 212, to the stream_id register 242. In addition, the audio read function portion 234 stores stream_id that is 0xBD and private_stream_id that is 0x00, received from the player control module 212, to the stream_id register 252 and the private_stream_id register 253, respectively. In addition, the subtitle read function portion 235 stores stream_id that is 0xBD and private_stream_id that is 0x80, received from the player control module 212, to the stream_id register 263 and the private_stream_id register 264, respectively.

The player control module 212 stores stream_id and private_stream_id for an elementary stream to be reproduced, supplied to the buffer control module 215 for a later process. The player control module 212 uses stream_id and private_stream_id when a stream change request message takes place or a stream that is being reproduced in a mark process, that will be described later is identified.

To initialize the buffer control module 215 (FIG. 3) the player control module 212 sets the subtitle read function flag having a value corresponding to the clip stream file multiplexed with an elementary stream to be reproduced to the subtitle read function flag storage portion 261.

In other words in this case, since the clip stream file "00001.PS" with which elementary streams to be reproduced have been multiplexed contains a subtitle stream the subtitle read function flag whose value is 1 is set to the subtitle read function flag storage portion 261 to activate the subtitle read function portion 235. When a clip stream file with which an elementary stream to be reproduced has not been multiplexed does not contain a subtitle stream the subtitle read function flag whose value is 0 is set to the subtitle read function flag storage portion 261. In this case the subtitle read function portion 235 is not activated (the subtitle read function portion 235 does not perform any process).

In addition, the player control module 212 supplies IN_time that is 180,090 and OUT_time that is 27,180,090, of the first PlayItem#0 (FIG. 25) contained in the first PlayList#0 that the script control module 211 has caused the player control module 212 to reproduce to the decode control module 214. The decode control module 214 uses IN_time to start decoding a clip reproduced by PlayItem( ) and OUT_time to stop decoding the clip and to control a PlayItem change process, that will be described later.

The player control module 212 initializes a subtitle stream display mode in which the graphics process module 219 displays a subtitle stream. In other words, the player control module 212 controls the graphics process module 219 to display a subtitle stream in a default display mode,

[Start Reading Data]

Thereafter, the flow advances from step S127 to step S128. The player control module 212 controls the content data supply module 213 to read a clip stream file that contains a program stream with which an elementary stream to be reproduced has been multiplexed using the function of the operating system 201. In other words, the content data supply module 213 designates the clip stream file "00001.PS" of the "STREAM" directory under the "VIDEO" directory of the disc 101 (FIG. 4), designates sector 305, which is the reproduction start position, which has been decided at step S122, and causes the operating system 201 to read the file. The content data supply module 213 causes the operating system 201 to supply data that have been read from the disc 101 to the buffer control module 215.

Thus, the program stream of the clip stream file "00001.PS" is read from the disc 101. The program stream is supplied to the buffer control module 215.

The buffer control module 215 (FIG. 3) writes the program stream that has been read from the disc 101 to the position represented by the data write pointer of the data write pointer storage portion 232 of the buffer 215A and increments the data write pointer by the size of the write data.

Unless otherwise specified, when the buffer 215A of the buffer control module 215 has a free space, the content data supply module 213 reads data from the disc 101, supplies and stores the data to the buffer 215A of the buffer control module 215. Thus, the buffer 215A always stores sufficient amount of data.

[Start of Controlling Decoder]

When data are read from the disc 101 and the data are stored to the buffer 215A of the buffer control nodule 215, the flow advances from step S128 to step S129. At step S129, the decode control module 214 controls the video decoder control module 216, the audio decoder control module 217, and the subtitle decoder control module 218 to start reading data from the buffer 215A as a pre-decode operation.

Thus, the video decoder control module 216 requests the video read function portion 233 of the buffer control module 215 (FIG. 3) to send data. The video decoder control module 216 obtains one video access unit stored in the buffer 215A, the PTS and DTS (sometimes referred to as time stamps) added to the video access unit, pic_struct_copy, au_ref_flag, and AU_length that are information (sometimes referred to as additional information) described in PES_packet( ) of private_stream_2 immediately preceded by a decode startable point, and so forth from the buffer control module 215 corresponding to the request. The time stamps are supplied from the video decoder control module 216 to the decode control module 214 whenever the video decoder control module 216 obtains a video access unit.

On the other hand, the audio decoder control module 217 requests the audio read function portion 234 of the buffer control module 215 (FIG. 3) to send data. The audio decoder control module 217 obtains one (ATRAC) audio access unit stored in the buffer 215A and the time stamps (PTS and DTS) added to the audio access unit from the buffer control module 215 corresponding to the request. The time stamps are supplied from the audio decoder control module 217 to the decode control module 214 whenever the audio decoder control module 217 obtains an audio access unit.

In addition, the subtitle decoder control module 218 requests the subtitle read function portion 235 of the buffer control module 215 (FIG. 3) to send data. The subtitle decoder control module 218 obtains one subtitle access unit stored in the buffer 215A and the time stamps added to the subtitle access unit from the buffer control module 215 corresponding to the request. The time stamps are supplied from the subtitle decoder control module 218 to the decode control module 214 whenever the subtitle decoder control module 218 obtains a subtitle access unit. When an elementary stream to be reproduced does not contain a subtitle stream or the buffer 215A does not store a subtitle access unit, data are not supplied from the buffer control module 215 to the subtitle decoder control module 218.

Whenever the video decoder control module 216, the audio decoder control module 217, and the subtitle decoder control module 218 request the buffer control module 215 to send data, they send the results to the decode control module 214.

Details of data that are read from the buffer 215A when the buffer control module 215 sends the data to the video decoder control module 216, the audio decoder control module 217, and the subtitle decoder control module 218 will be described later

[Start of Decoding Data]

When the video decoder control module 216, the audio decoder control module 217, and the subtitle decoder control module 218 start reading data from the buffer 215A of the buffer control module 215, the flow advances from step S129 to step S130. At step S130, these modules start decoding the data that have been read.

In other words, the decode control module 214 causes the video decoder control module 216, the audio decoder control module 217, and the subtitle decoder control module 218 to start decoding corresponding to IN_time, which is 180,090, of the first PlayItem#0 contained in PlayList#0, supplied from the player control module 212 at step S127 and corresponding to the time stamps supplied from the video decoder control module 216, the audio decoder control module 217, and the subtitle decoder control module 218 at step S129 or if necessary at changed timing so that data that are decoded are securely synchronized.

A method for starting decoding data at changed timing so that the data are securely synchronized is described in for example Japanese Patent No. 3496725. In short, the minimum value of time stamps supplied from the video decoder control module 216, the audio decoder control module 217, and the subtitle decoder control module 218 is set as an initial value of the time count portion 214A. The time count portion 214A starts counting a time from this set time. When the time counted by the time count portion 214A matches a time stamp, the decode control module 214 causes these modules to start decoding data.

The video decoder control module 216 receives a decode start command from the decode control module 214, supplies one video access unit obtained from the video read function portion 233 of the buffer control module 215 (FIG. 3) to the video decoder 116 (FIG. 1), and causes the video decoder 116 to decode the video access unit. In addition, the video decoder control module 216 supplies video data decoded by the video decoder 116 to the graphics process module 219.

Thereafter, the video decoder control module 216 causes the video decoder 116 to successively decode video access units obtained from the video read function portion 233 of the buffer control module 215 one at a time and supplies the decoded video access unit as video data to the graphics process module 219.

The audio decoder control module 217 receives a decode start command from the decode control module 214, supplies one audio access unit obtained from the audio read function portion 234 of the buffer control module 215 (FIG. 3) to the audio decoder 117 (FIG. 1), and causes the audio decoder 117 to decode the audio access unit. The audio decoder control module 217 supplies audio data decoded by the audio decoder 117 to the audio output module 221.

Thereafter, the audio decoder control module 217 causes the audio decoder 117 to successively decode audio access units obtained from the audio read function portion 234 of the buffer control module 215 one at a time and supplies the decoded audio access unit as audio data to the audio output module 221.

In addition, the subtitle decoder control module 218 receives a decode start command from the decode control module 214, causes the internal subtitle decode software to decode one subtitle access unit obtained from the subtitle read function portion 235 of the buffer control module 215 (FIG.

3) according to the command, and supplies the decoded subtitle access unit as subtitle data (image data of a subtitle) to the graphics process module 219.

Thereafter, the subtitle decoder control module 218 causes the internal decode software to successively decode subtitle access units obtained from the subtitle read function portion 235 of the buffer control module 215 one at a time and supplies the decoded subtitle access unit as subtitle data to the graphics process module 219

[Graphics Process]

Thereafter the flow advances from step S130 to step S131. At step S131, the graphics process module 219 performs a graphics process for video data supplied from the video decoder control module 216 and if necessary for subtitle data supplied from the subtitle decoder control module 218.

In other words, the graphics process module 219 performs a subtitle process that for example enlarges or reduces subtitle data supplied from the subtitle decoder control module 218 corresponding to a display mode command received from the player control module 212. When the graphics process module 219 has not received a display mode command from the player control module 212 or there is a default display mode, the graphics process module 219 stores subtitle data received from the subtitle decoder control module 218.

In addition, the graphics process module 219 adds video data received from the video decoder control module 216 and subtitle data received from the subtitle decoder control module 218 or subtitle data that have been processed, obtains output video data with which subtitle data have been overlaid and supplies the overlaid video data to the video output module 220.

When the graphics process module 219 receives an information display command for a menu, a message, a time code, a chapter number, or an index number from the script control module 211 or the player control module 212, the graphics process module 219 generates the information, overlays it with output video data, and supplies the overlaid data to the video output module 220.

[Output Process]

After step S131, the flow advances to step S132. At step S132, the video output module 220 successively stores output video data supplied from the graphics process module 219 to the FIFO 220A and outputs video data stored in the FIFO 220A at a predetermined output rate.

As long as the FIFO 220A has a sufficient storage capacity (free space), the video output module 220 receives output video data from the graphics process module 219. When the FIFO 220A does not have a sufficient storage capacity, the video output module 220 causes the graphics process module 219 to stop receiving the output video data. Thus, the graphics process module stops receiving the output data. In addition, the video output module 220 causes the video decoder control module 216 and the subtitle decoder control module 218 to stop their processes. Thus, the video decoder control module 216 and the subtitle decoder control module 218 stop their processes.

After the video output module 220 has caused the graphics process module 219 to stop receiving output video data and the FIFO 220A has output video data, when the FIFO 220A has a sufficient storage capacity, the video output module 220 causes the graphics process module 219 to receive output video data. Like output video data, the graphics process module 219 causes the video decoder control module 216 and the graphics process module 219 to stop receiving data. Thus, the graphics process module 219, the video decoder control module 216, and the subtitle decoder control module 218 resume the stopped processes.

On the other hand, the audio output module 221 also causes the FIFO 221A to successively store audio data supplied from the audio decoder control module 217 at step S130 and to output audio data at a predetermined output rate (sampling frequency).

As long as the FIFO 221A has a sufficient storage capacity (blank space) the audio output module 221 receives audio data from the audio decoder control module 217. However, when the FIFO 221A does not have a sufficient storage capacity, the audio output module 221 causes the audio decoder control module 217 to stop receiving audio data. Thus, the audio decoder control module 217 stops its process.

After the audio output module 221 has caused the audio decoder control module 217 to stop receiving audio data and the FIFO 221A has output audio data, when the FIFO 221A has a sufficient storage capacity, the audio output module 221 causes the audio decoder control module 217 to receive audio data. Thus, the audio decoder control module 217 resumes the stopped process.

In the foregoing manner, as the video output module 220 and the audio output module 221 output data, elementary streams are decoded.

The disc device shown in FIG. 1 reproduces data from the disc 101 corresponding to the flow charts shown in FIG. 29 and FIG. 30. Next, other processes or operations of the disc device that performs while it is reproducing data from the disc 101 will be described.

[Changing PlayItem's]

As described in FIG. 29 and FIG. 30, the first PlayItem#0 of the first PlayList#0 shown in FIG. 25 is reproduced. Corresponding to PlayList#0, after the first PlayItem#0 is reproduced, the second PlayItem#1 is reproduced. In other words, a PlayItem change process that changes PlayItem's from PlayItem#0 to PlayItem#1 is performed.

Figure 31:
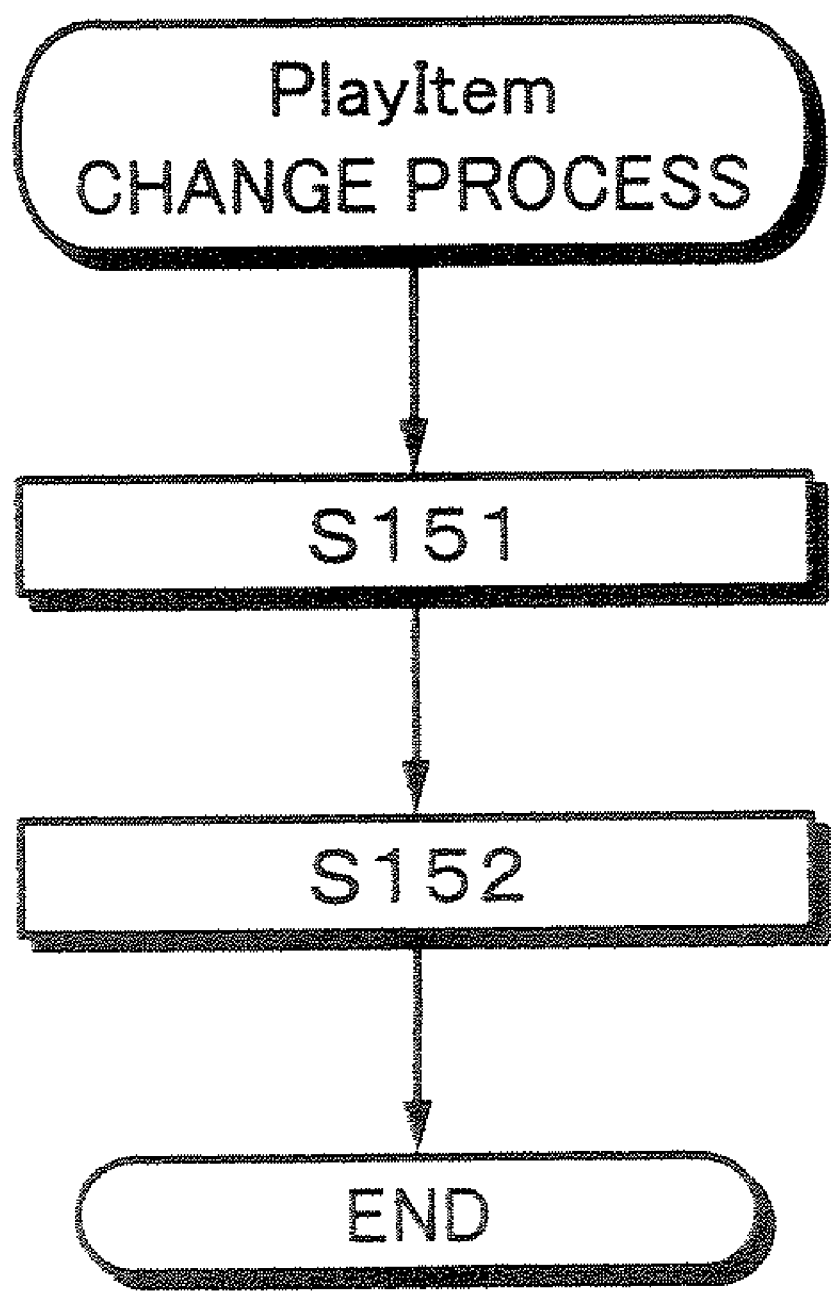
FIG. 31 is a flow chart describing a PlayItem change process.

Next, with reference to a flow chart shown in FIG. 31, the PlayItem change process will be described.

As described in FIG. 29 and FIG. 30, after the first PlayItem#0 (a clip thereof) of PlayList#0 shown in FIG. 25 is reproduced, while the first PlayItem#0 is being reproduced, the decode control module 214 (FIG. 2A and FIG. 23) checks time that a time count portion 214A is counting.

[End of Reproduction of PlayItem#0]

When the time that time count portion 214A has counted became 27,180,090 (FIG. 25) that is the same as OUT_time of the first PlayItem#0 supplied from the player control module 212 at step S127 shown in FIG. 30, the decode control module 214 performs a decode stop control to stop reproducing PlayItem#0 at step S151.

In other words, the decode control module 214 operates the video decoder control module 216, the audio decoder control module 217, and the subtitle decoder control module 218 to stop their decode operations. The decode control module 214 controls the video output module 220 to successively output video data.

In addition, the decode control module 214 sends a message that represents that the first PlayItem#0 has been reproduced to the player control module 212.

[Start of Reproduction of PlayItem#1]

As described above, the player control module 212 has recognized that the first PlayList#0 contains the first PlayItem#0 and the second PlayItem#1 at step S105 shown in FIG. 29. When the decode control module 214 has informed the layer control module 212 that the first PlayItem#0 had been reproduced the low advances from step S151 to step S152. At step S152, in the same manner as the first PlayItem#0, the player control module 212 starts reproducing the second PlayItem#1.

Like step S122 shown in FIG. 30, the player control module 212 decides one of RPN_EP_start's described in EP_map( ) as the reproduction start position of the second PlayItem#1.

In addition, the player control module 212 recognizes Mark( )'s that belong to the second PlayItem#1 described at step S124 shown in FIG. 30 and the number of elementary streams having attributes multiplexed with the clip stream file "00002.PS" reproduced by PlayItem#1 described at step S125. FIG. 30 and decides an elementary stream to be reproduced.

The player control module 212 performs the same process as that at step S127 shown in FIG. 30.

In other words, the player control module 212 supplies RPN_EP_start of EP_map( ) decided as the reproduction start position and the file name of a clip stream file multiplexed with an elementary stream to be reproduced, namely the file name of the clip stream file "00002.PS" corresponding to "00002.CLP" described in Clip_Information_file_name of the second PlayItem#1 (FIG. 25 to the content data supply module 213.

In addition, before a program stream stored in the clip stream file "00002.PS" multiplexed with an elementary stream to be reproduced is supplied to the buffer control module 215, the player control module 212 initializes the buffer control module 215.

In other words, the buffer control module 215 (FIG. 3) sets the same value to the data start pointer stored in the data start pointer storage portion 231, the data write pointer stored in the data write pointer storage portion 232, the video read pointer stored in the video read pointer storage portion 241, the audio read pointer stored in the audio read pointer storage portion 251, and the subtitle read pointer stored in the subtitle read pointer storage portion 262.

In addition, the player control module 212 supplies stream_id and if necessary private_stream_id as identification information that identifies an elementary stream to be reproduced to the buffer control module 215.

The video read function portion 233 of the buffer control module 215 (FIG. 3 receives stream_id of a video stream of elementary streams to be reproduced from the player control module 212 and stores it to the stream_id register 242. In addition, the audio read function portion 234 receives stream_id and private_stream_id of an audio stream of elementary streams to be reproduced from the player control module 212 and stores them to the stream_id register 252 and the private_stream_id register 253.

Since the clip stream file "00002.PS" multiplexed with an elementary stream to be reproduced contains a subtitle stream, stream_id and private_stream_id of the subtitle stream of elementary streams to be reproduced are supplied from the player control module 212 to the subtitle read function portion 235. The subtitle read function portion 235 stores stream_id and private_stream_id to the stream_id register 263 and the private_stream_id register 264, respectively.

The player control module 212 sets a subtitle read function flag that has a value corresponding to a clip stream file multiplexed with an elementary stream to be reproduced to the subtitle read function flag storage portion 261 to initialize the buffer control module 215 (FIG. 3).

In this case, since the clip stream file "00002.PS" multiplexed with elementary streams to be reproduced contains a subtitle stream, the subtitle read function flag having a value of 1 is set to the subtitle read function flag storage portion 261 to activate the subtitle read function portion 235.

The player control module 212 supplies 90,000 as IN_time and 27,090,000 as OUT_time of the second PlayItem#1 to be reproduced (FIG. 25) to the decode control module 214.

In addition, the player control module 212 initializes a subtitle scream display mode command for the graphics process module 219. In other words, the player control module 212 controls the graphics process module 219 to display subtitle data in the default display mode.

When configurable_flag (FIG. 12) of a subtitle stream to be reproduced is 1, which represents that the display mode is permitted to be changed, the subtitle stream display mode command that the player control module 212 sends to the graphics process module 219 may be the current display mode command.

In the same manner as the first PlayItem#0, the second PlayItem#1 is reproduced. While the second PlayItem#1 is being reproduced, the decode control module 214 monitors the time that the time count portion 214A is counting. When the time that the time count portion 214A has counted became 27,090,000 (FIG. 25) that is the same as OUT_time of the second PlayItem#1 supplied from the player control module 212 at step S152 (FIG. 31), the decode control module 214 performs the same decode stop control as that at step S151 to stop reproducing PlayItem#1.

[Display of Time Code]

Next, as described above, at step S123 shown in FIG. 30, a time code is displayed. The time code is successively updated.

Figure 32:
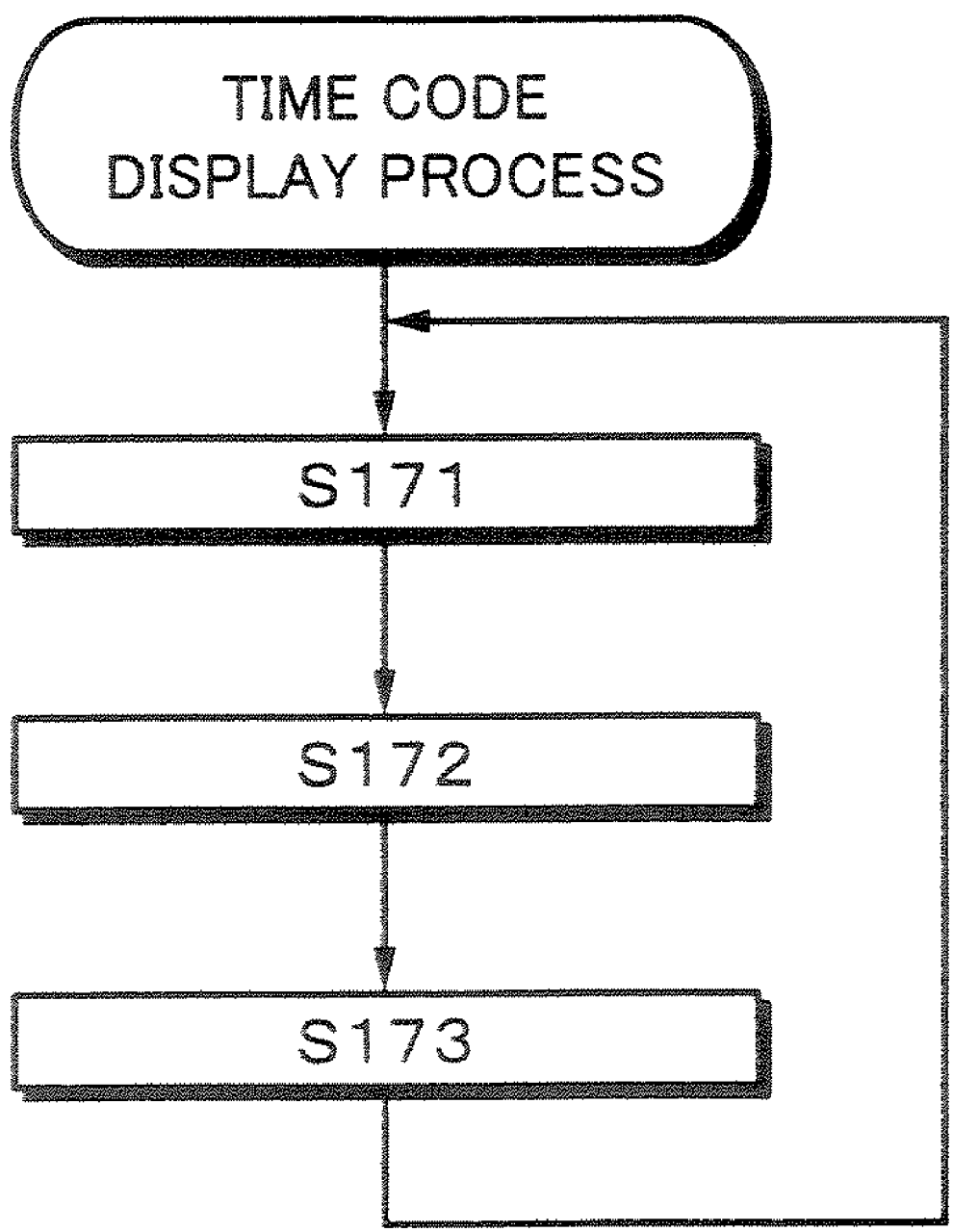
FIG. 32 is a flow chart describing a time code display process.

Next, with reference to a flow chart shown in FIG. 32, a time code display process will be described.

When the time count portion 214A of the decode control module 214 (FIG. 2A and FIG. 2B) has counted one second, the flow advances to step S171. At step S171, the decode control module 214 supplies a message that represents that one second has elapsed and the current time that the time count portion 214A has counted to the player control module 212. Thereafter, the flow advances to step S172. At step S172, the player control module 212 receives the message and the current time from the decode control module 214 and converts the current time into a time code. Thereafter, the flow advances to step S173.

At step S173, the player control module 212 controls the graphics process module 219 to display the time code obtained at step S172. Thereafter, the flow returns to step S171. Thus, the time code is updated at intervals of one second. The update intervals of the time code are not limited to one second.

[Changing Streams]

The clip stream file "00001.PS" reproduced by the first PlayItem#0, which composes the first PlayList#0 described in FIG. 25, and the clip stream file "00002.PS" reproduced by the second PlayItem#1 are multiplexed with two subtitle streams as described in FIG. 26A and FIG. 26B.

When a plurality of elementary streams having the same attribute are multiplexed with a clip stream file elementary streams to be reproduced can be changed from one elementary stream to another elementary stream.

Figure 33:
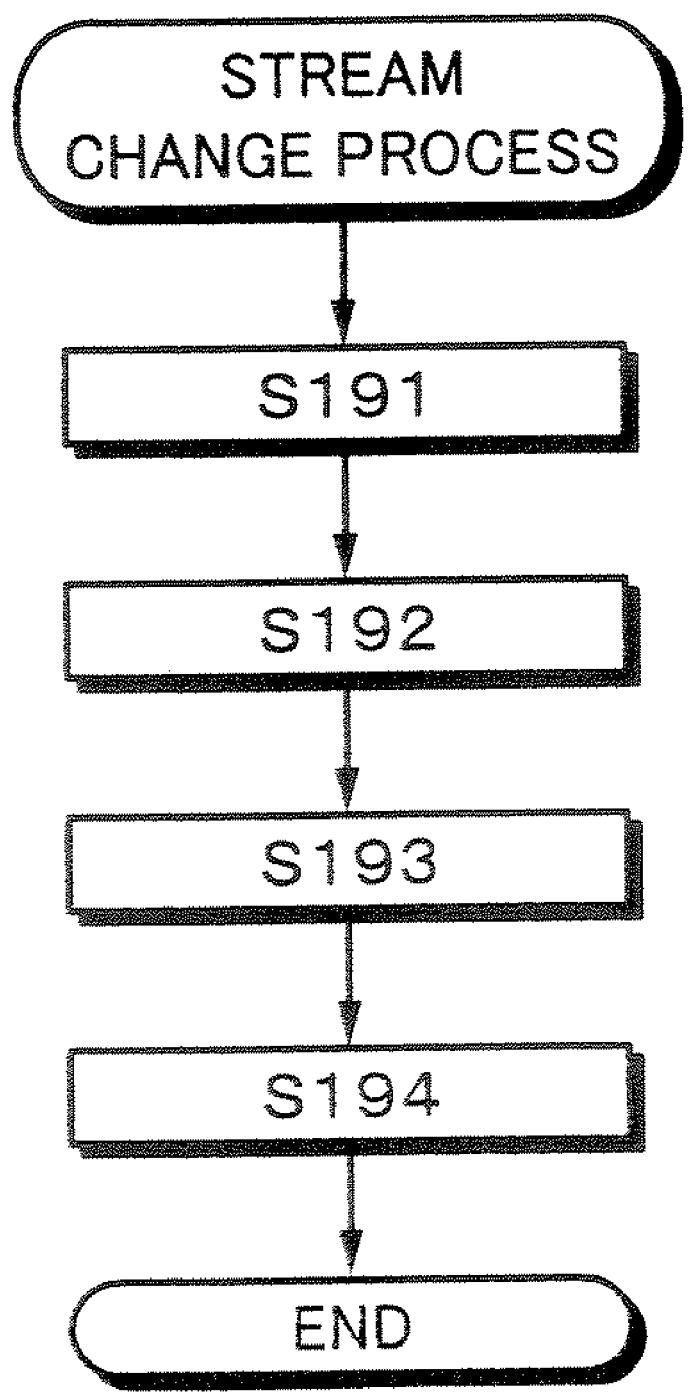
FIG. 33 is a flow chart describing a stream change process.

Next, with reference to a flow chart shown in FIG. 33, a stream change process will be described.

When a stream change command is described as a script program in for example the "SCRIPT.DAT" file (FIG. 4) and the script control module 211 executes the script program or the user operates the remote controller to change streams, a stream change command is supplied to the player control module 212.

When the script control module 211 executes a script program that describes the stream change request, the script control module 211 supplies a stream change request message to the player control module 212. When the user inputs a stream change command with the remote controller, the input interface 115 receives the stream change command signal from the remote controller and supplies the stream change request message to the player control module 212.

When the subtitle stream change request message, which causes the player control module 212 to change subtitle streams, is supplied to the player control module 212, it checks the number of subtitle streams of elementary streams to be reproduced, which has been recognized at step S125 shown in FIG. 30.

When the number of subtitle streams that the player control module 212 has checked is 1 or less the player control module 212 ignores the subtitle stream change request message. Thus, the player control module 212 does not perform the process from step S192 to step S194.

In contrast, when the number of subtitle streams is two or more, the flow advances to step S192 to S194. At these steps the player control module 212 changes a subtitle stream that is being reproduced to another subtitle stream.

In other words, at step S192, the player control module 212 identifies a subtitle stream which is being reproduced, on a clip information file. Specifically, assuming that a subtitle stream whose stream_id is 0xBD and private_stream_id is 0x80 and that is multiplexed with the clip stream file "00002.PS" is being reproduced corresponding to the second PlayItem#1, which composes the first PlayList#0 described in FIG. 25, the player control module 212 identifies a subtitle stream that is being reproduced as stream#2 which is the third subtitle stream of the clip information file "00002.CLP" shown in FIG. 26A and FIG. 26B of two subtitle streams multiplexed with the clip stream file "00002.PS" at step S192.

Thereafter the flow advances to step S193. At step S193 the player control module 212 recognizes (identifies) the next subtitle stream of the clip information file identified at step S192 as a subtitle stream to be reproduced next. In FIG. 26A and FIG. 26B, the next subtitle stream of the third subtitle stream stream#2 is the fourth subtitle stream stream#3. Thus, at step S193, the player control module 212 recognizes the fourth subtitle stream stream#3 as a subtitle stream to be reproduced next.

When a subtitle stream that is being reproduced is identified as stream#3, which is the fourth subtitle stream in the clip information file "00002.CLP" shown in FIG. 26A and FIG. 26B, of two subtitle streams multiplexed with the clip stream file "00002.PS," the player control module 212 recognizes for example the third subtitle stream stream#2 as a subtitle stream to be reproduced next.

Thereafter, the flow advances to step S194. At step S194, the player control module 212 supplies stream_id and private_stream_id of the subtitle recognized at step S193 as a subtitle stream to be reproduced next to the subtitle read function portion 235 of the buffer control module 215 (FIG. 3) so that the subtitle read function portion 235 reads the next subtitle access unit identified by stream_id and private_stream_id from the buffer 215A.

The subtitle read function portion 235 of the buffer control module 215 (FIG. 3) newly sets stream_id and private_stream_id supplied from the player control module 212 at step S194 to the stream_id register 263 and the private_stream_id register 264, respectively. The subtitle read function portion 235 reads the next subtitle access unit identified by stream_id and private_stream_id newly set to the stream_id register 263 and the private_stream_id register 264, respectively.

In the foregoing manner, a subtitle stream that is being reproduced is changed to another subtitle stream that is reproduced next.

[Processes of Buffer Control Module 215]

Next, with reference to FIG. 34 to FIG. 38, processes of the buffer control module 215 (FIG. 3), data write process and data read process to and from the buffer 215A, will be described.

As described in FIG. 3, the buffer control module 215 has five pointers that are used to read and write data from and to the buffer 215A.

Figure 34:
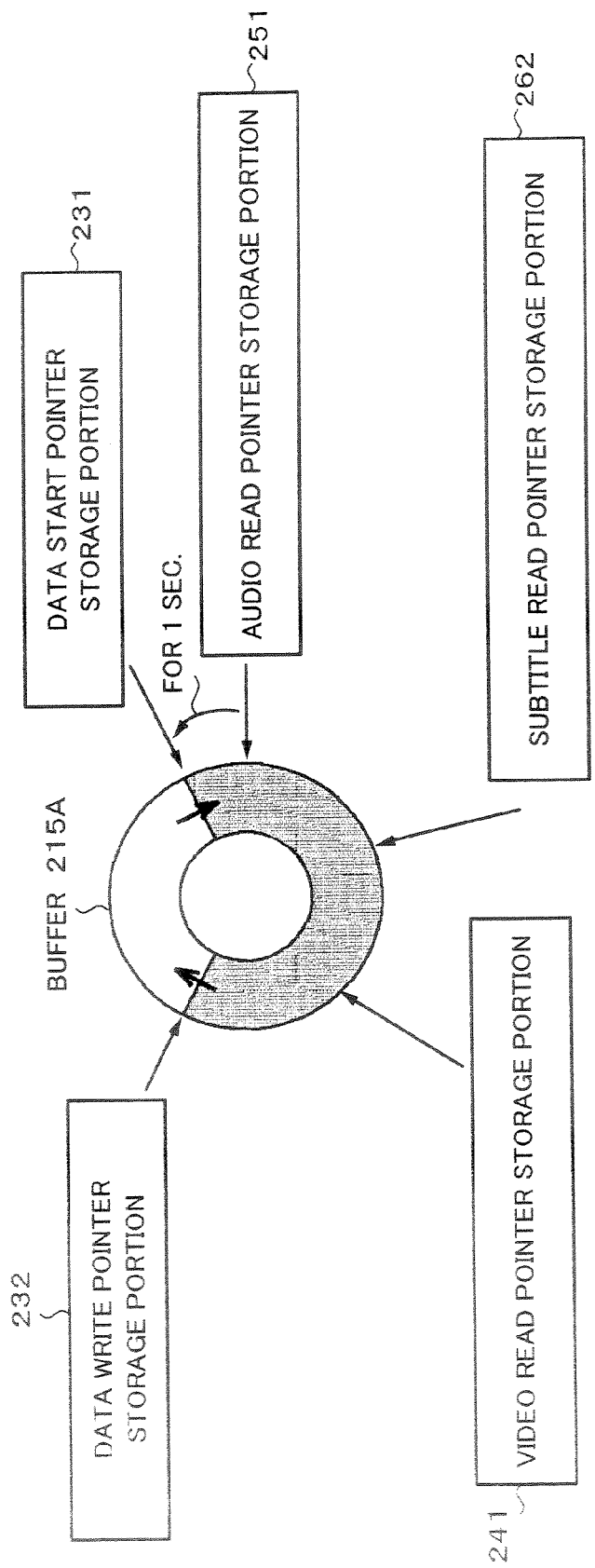
FIG. 34 is a flow chart describing a process of a buffer control module 215.
Figure 35:
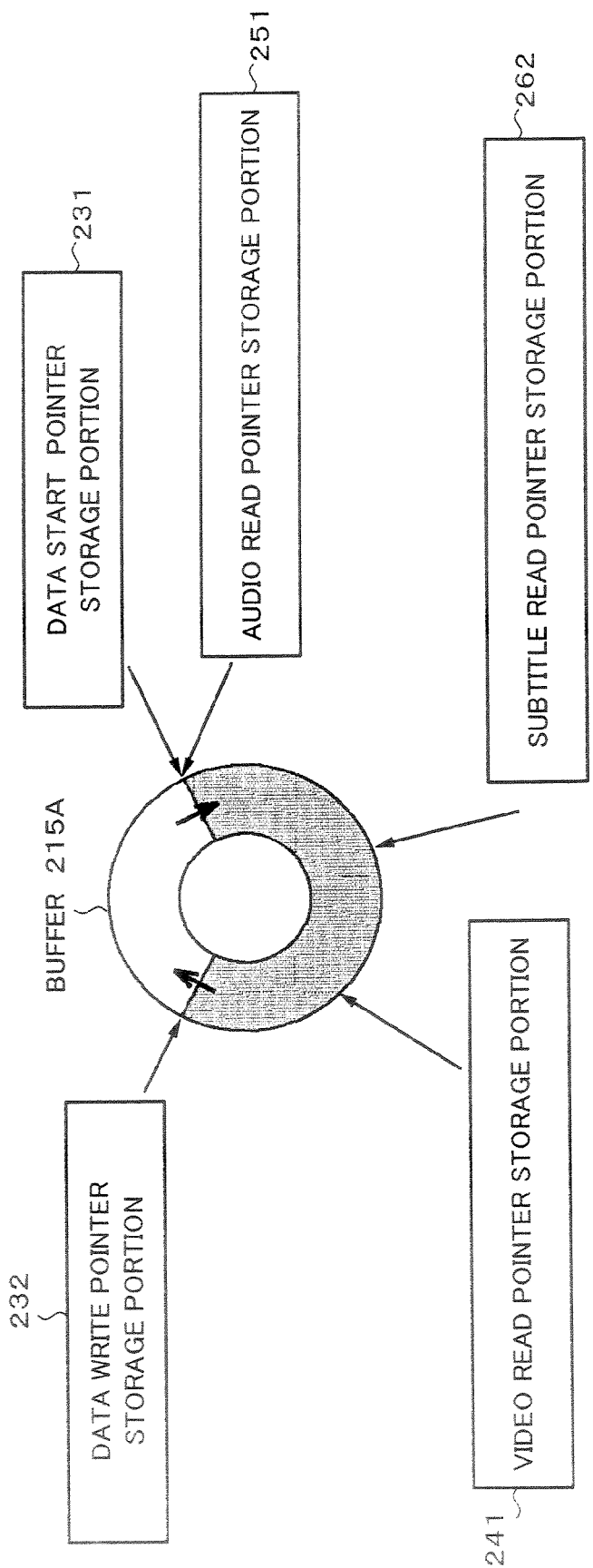
FIG. 35 is a flow chart describing the process of the buffer control module 215.

In other words, as shown in FIG. 34 and FIG. 35, the buffer control module 215 has the data start pointer stored in the data start pointer storage portion 231, the data write pointer stored in the data write pointer storage portion 232, the video read pointer stored in the video read pointer storage portion 241, the audio read pointer stored in the audio read pointer storage portion 251, arm the subtitle read pointer stored in the subtitle read pointer storage portion 262.

In FIG. 34 and FIG. 35 the stream_id register 242 and the au_information( ) register 243 of the video read function portion 233 shown in FIG. 3 the stream_id register 252 and the private_stream_id register 253 of the audio read function portion 234 and the subtitle read function flag storage portion 261 the stream_id register 263 and the private_stream_id register 264 of the subtitle read function portion 235 are omitted.

The data start pointer stored in the data start pointer storage portion 231 represents the position of the oldest data (that need to be read and have not been read) stored in the buffer 215A. The data write pointer stored in the data write pointer storage portion 232 represents the write position of data in the buffer 215A. This position is the position to which the newest data are written.

The video read pointer stored in the video read pointer storage portion 241 represents the position of a video stream that is read from the buffer 215A. The audio read pointer stored in the audio read pointer storage portion 251 represents the position of an audio stream read from the buffer 215A. The subtitle read pointer stored in the subtitle read pointer storage portion 262 represents the position of a subtitle stream read from the buffer 215A.

As described in FIG. 3, the data start pointer, the data write pointer, the video read pointer, the audio read pointer, and the subtitle read pointer are moved in the clockwise direction in the buffer 215A.

As shown in FIG. 35, according to this embodiment, the data start pointer is always updated so that it represents the same position as the oldest data position of the video read pointer, the audio read pointer, and the subtitle read pointer. In FIG. 35, the audio read pointer represents the position of the oldest data in the video read pointer, the audio read pointer, or the subtitle read pointer. The data start pointer matches the audio read pointer.

In the buffer control module 215, which has the data start pointer, the data write pointer, the video read pointer, the audio read pointer, and the subtitle read pointer, when new data are read from the disc 101 and written to the buffer 215A the data write pointer is updated in the clockwise direction so that the data write pointer represents the position immediately after the newly written data.

When a video stream, an audio stream, or a subtitle stream is read from the buffer 215A, the video read pointer, the audio read pointers or the subtitle read pointer is updated in the clockwise direction for the amount of data that are read. The amount of data that are read is the sum of video data, audio data, or subtitle data that are actually read and a data portion of another stream intervened in the data that are read and that are omitted when they are read.

When the video read pointer, the audio read pointer, or the subtitle read pointer is updated, the data start pointer is updated so that it represents the position of the oldest data represented by the video read pointer, the audio read pointer, or the subtitle read pointer.

The buffer control module 215 controls the data write operation of the buffer 215A so that the data write pointer does not get ahead of the data start pointer.

Unless the data write pointer gets ahead of the data start pointer, the buffer control module 215 writes data read from the disc 101 to the position of the buffer 215A represented by the data write pointer and updates the data write pointer. On the other hand, if the data write pointer is going to get ahead of the data start pointer, the buffer control module 215 causes the content data supply module 213 to stop reading data from the disc 101 and stops writing data to the buffer 215A. Thus, the buffer 215A car be prevented from overflowing.

As described above, data that are read from the disc 101 are written to the buffer 215A corresponding to the relationship of the positions of the two pointers, the data start pointer and the data write pointer.

On the other hand, the buffer control module 215 controls the data read operation of the buffer 215A so that the video read pointer, the audio read pointer, and the subtitle read pointer, and the data start pointer do not get ahead of the data write pointer.

In other words, unless the video read pointer, the audio read pointer, or the subtitle read pointer gets ahead of the data write pointer, the buffer control module 215 reads data from the position of the buffer 215A represented by the video read pointer, the audio read pointer, or the subtitle read pointer corresponding to a request received from the video decoder control module 216, the audio decoder control module 217, or the subtitle decoder control module 218 and updates the video read pointer, the audio read pointer, or the subtitle read pointer and if necessary the data start pointer. On the other hand, if the video read pointer, the audio read pointer, or the subtitle read pointer is going to get ahead of the data write pointer, the buffer control module 215 causes the video decoder control module 216, the audio decoder control module 217, or the subtitle decoder control module 218 to stop sending the request or wait until the buffer 215A stores enough data. As a result, the buffer 215A can be prevented from under-flowing.

Thus, the buffer 215A stores data to be supplied to the video decoder control module 216, the audio decoder control module 217, and the subtitle decoder control module 218 in a region (shaded in FIG. 34 and FIG. 35) in the clockwise direction from the position represented by the data start pointer to the position represented by the data write pointer. In addition, the video read pointer, the audio read pointer, and the subtitle read pointer are present in the region.

In the foregoing case, the data start pointer is updated so that it represents the position of the oldest data represented by the video read pointer, the audio read pointer, and the subtitle read pointer represent. Alternatively, the data start pointer may be updated so that it represents the position of data that are earlier by a predetermined time (for example, one second) than the position of the oldest data.

It can be assumed that the video read pointer and the audio read pointer in the video read pointer, the audio read pointer, and the subtitle read pointer represent the position of the oldest data.

Thus, when the data start pointer is updated so that it represents the position of data that are earlier by for example one second than the position of the oldest data that the video read pointer or the audio read pointer represents as shown in FIG. 34, earlier data by one second than the oldest data that the video read pointer or the audio read pointer represents can be stored in the buffer 215A. In FIG. 34, the audio read pointer represents the position of the oldest data, whereas the data start pointer represents the position of data that are earlier by one second than the oldest data.

When the data start pointer is updated so that it represents the position of data that are earlier by one second than the position of the oldest data, the response of the disc device can be improved.

In other words, as shown in FIG. 35, when the data start pointer is updated so that it represents the position of the oldest data that the audio read pointer represents, if a special reproduction command for example a reverse reproduction command is issued, data that have been read from the buffer 215A need to be re-read from the disc 101. Thus, after the special reproduction command is issued until the special reproduction operation is performed, it takes a time to some extent.

In contrasts as shown in FIG. 34, when the data start pointer is updated so that it represents the position of data that are earlier by one second than the position of the oldest data that the audio read pointer represents, if a special reproduction command for example a reverse reproduction command is issued and data necessary for starting the special reproduction operation are data earlier by one second than the oldest data and stored in the buffer 215A, the special reproduction operation can be quickly started without need to re-read the data from the disc 101.

When the data start pointer is updated so that it represents the position of data that are earlier by one second than the position of the oldest data that the audio read pointer represents, data necessary for starting the special reproduction operation may not be stored in the buffer 215A. In this case, the data necessary for starting the special reproduction operation are re-read from the disc 101.

Next, the read operations for a video stream, an audio stream, and a subtitle stream from the buffer 215A will be described in detail.

As described at step S127 shown in FIG. 30, when the reproduction operation of a clip stream file is started, the buffer control module 215 initializes the data start pointer, the data write pointer, the video read pointer, the audio read pointer, and the subtitle read pointer so that they represent the same position in the buffer 215A.

When a program stream (MPEG2-system program stream) stored in a clip stream file is read from the disc 101 and supplied to the buffer control module 215, it stores the program stream at the position that the data write pointer of the buffer 215A represents. In addition, the data write pointer is updated in the clockwise direction.

In addition, the video read function portion 233 of the buffer control module 215 (FIG. 3) parses the program stream stored in the buffer 215A, extracts (separates) a video stream (a video access unit) from the program stream stored in the buffer 215A corresponding to a request received from the video decoder control module 216, and supplies the extracted video stream to the video decoder control module 216.

Likewise, the audio read function portion 234 parses a program stream stored in the buffer 215A, extracts an audio stream (an audio access unit) from the program stream stored in the buffer 215A corresponding to a request received from the audio decoder control module 217, and supplies the audio stream to the audio decoder control module 217. The subtitle read function portion 235 parses a program stream stored in the buffer 215A, extracts a subtitle stream (a subtitle access unit) from the program stream stored in the buffer 215A corresponding to a request received from the subtitle decoder control module 218, and supplies the subtitle streak to the subtitle decoder control module 218.

[Reading Video Stream]

Next, with reference to a flow chart shown in FIG. 36, a video stream read process for the buffer 215 of the video read function portion 233 (FIG. 3) will be described in detail.

At step S211, the video read function portion 233 searches a program stream stored in the buffer 215A for PES_packets of private_stream_2. As described in FIG. 20, in PBS_packet( ) of private_stream_2, stream_id is 10111111B (=0xBF). The video read function portion 233 searches for PES_packet( ) whose stream_id is 10111111B.

Assuming that an elementary stream multiplexed with a program stream stored in the clip stream file "00001.PS" is an elementary stream to be reproduced, when the program stream is read from the disc 101 and stored in the buffer 215A, sector 305 is decided as the reproduction start position with information about a decode startable point described in EP_map( ) (FIG. 27) of the clip stream file "00001.PS." At step S128 shown in FIG. 30, sector 305, which is the reproduction start point, is designated. The video read function portion 233 causes the operating system 201 to read the program stream from the clip stream file "00001.PS."

Information about the decode startable point described in EP_map( ) of the video stream represents the position of PES_packet( ) of private_stream_2 immediately preceded by the real decode startable point.

Thus, immediately after the program stream stored in the clip stream file "10001.PS" is read from the disc 101 and stored in the buffer 215A PES_packet( ) of private_stream_2 is stored at a position represented by the data start pointer and the video read pointer in the buffer 215A.

When the video read function portion 233 has found PES_packet( ) of private_stream_2 at step S211 the flow advances to step S212. At step S212, the video read function portion 233 extracts video_stream_id from private_stream2_PBS_payload( ) (FIG. 23), which is PES_packet_data_byte of PES_packet( ) of private_stream_2. At step S127 shown in FIG. 30, the video read function portion 233 determines whether video-stream_id matches stream_id of the video stream to be reproduced which is stored in the stream_id register 242 (FIG. 3).

When the determined result at step S212 represents that video-stream_id described in private_stream2_PES_payload( ) does nor match stream_id stored in the stream_id register 242 namely PES_packet( ) of private_stream_2, found at step S211, is not at the decode startable point of the video stream to be reproduced the flow returns to step S211. At step S211, the video read function portion 233 searches the program stream stored in the buffer 215A for PES_packet( ) of private_stream_2 and repeats the same process.

In contrast, when the determined result at step S212 represents that video_stream_id described in private_stream2_PES_payload( ) matches stream_id stored in the stream_id register 242, namely PES_packet( ) of private_stream_2 found at step S211 is at the decode startable point of the video stream to be reproduced, the flow advances to step S213. At step S213, the video read function portion 233 reads au_information( ) described in private_stream2_PES_payload( ) of PES_packet( ) of private_stream_2 from the buffer 215A and stores au_information( ) to the au_information( ) register 243 (FIG. 3). Thereafter, the flow advances to step S214.

At step S214 the video read function portion 233 updates the video read pointer stored in the video read pointer storage portion 231 for the size of PES_packet( ) of private_stream_2 (that video_stream_id (FIG. 23) matches stream_id stored in the stream_id register 242 (FIG. 3)) found at step S211.

In other words, in a clip stream file, PES_packet( ) of private_stream_2 is immediately followed by a video stream (PES_packet( )) whose stream_id matches video_stream_id. Thus at step S214, the video read function portion 233 updates the video read pointer so that it represents the position of the decode startable point of the video stream.

Thereafter, the flow advances from S214 to step S215. The video read function portion 233 determines whether the video decoder control module 216 has issued a data request. When the determined result at step S215 represents that the video read function portion 233 has not issued a data request, the flow returns to step S215. At step S215, the video decoder control module 216 repeats the same process.

In contrast, when the determined result at step S215 represents that the video decoder control module 216 has issued a data request, the flow advances to step S216. At step S216, the video read function portion 233 parses the program stream from the position represented by the video read pointer in the buffer 215A, reads data of bytes described in AU_length of au_information( ) stored in the au_information( ) register 243, namely one video access unit, from the buffer 215A, supplies the data to the video decoder control module 216, and updates the video read pointer for the size of one video access unit that has been read from the buffer 215A.

In other words, as described in FIG. 24, au_information( ) describes number_of_access_unit that represents the number of video access units (pictures) contained from PES_packet( ) of private_stream_2, containing au_information( ), to PES_packet( ) of the next private_stream_2.

In addition, as shown in FIG. 24, au_information( ) describes pic_struct_copy, au_ref_flag, and AU_length as information about each of video access units represented by number_of_access_unit.

As described in FIG. 24, since each of AU_length's described in au_information( ) corresponding to number_of_access_unit represents the size of each of video access units represented by number_of_access_unit from PES_packet) of private_stream_2 to PES_packet( ) of the next private_stream_2, the video read function portion 233 can extract access units with AU_length's without need to parse the video stream.

In other words, when MPEG2-Video or MPEG4-AVC access units are extracted, it is necessary to know the structure of the video stream and then parse it. However, a program stream stored in a clip stream file recorded on the disc 101 contains PES_packet( ) of private_stream_2, which describes AU_length that represents the size of a video access unit, and which is immediately followed by at least one decode startable point of the video stream. Thus, the video read function portion 233 can read video access units (a video stream as video access units) from the buffer 215A and supply the video access units to the video decoder control module 216 corresponding to AU_length described in PES_packet( ) of private_stream_2 without need to parse the video stream.

At step S216, when the video read function portion 233 supplies video access units to the video decoder control module 216, the video read function portion 233 also supplies pic_struct_copy, au_ref_flag, and AU_length described in au_information( ) and time stamps (PTS and DTS) added for each of the video access units as information about the video access units to the video decoder control module 216.

After the video read function portion 233 has read one video access unit from the buffer 215A and supplied it to the video decoder control module 216, the flow advances to step S217. At step S217, the video read function portion 233 determines whether it has processed access units represented by number_of_access_unit of au_information( ) (FIG. 24) stored in the au_information( ) register 243.

When the determined result at step S217 represents that the video read function portion 233 has not yet processed access units represented by number_of_access_unit, namely the video read function portion 233 has not yet read access units represented by number_of_access_unit from the buffer 215A and supplied them to the video decoder control module 2167 the flow returns to step S215. At step S215, the video read function portion 233 repeats the same process.

In contrast, when the determined result at step S217 represents that the video read function portion 233 has already processed access units represented by number_of_access_unit, namely the video read function portion 233 has already read access units represented by number_of_access_unit from the buffer 215A and supplied them to the video decoder control module 216, the flow returns to step S211. A step S211, the video read function portion 233 searches for PES_packet( ) of private_stream_2 and repeats the same process.

[Reading Audio Stream]

Figure 37:
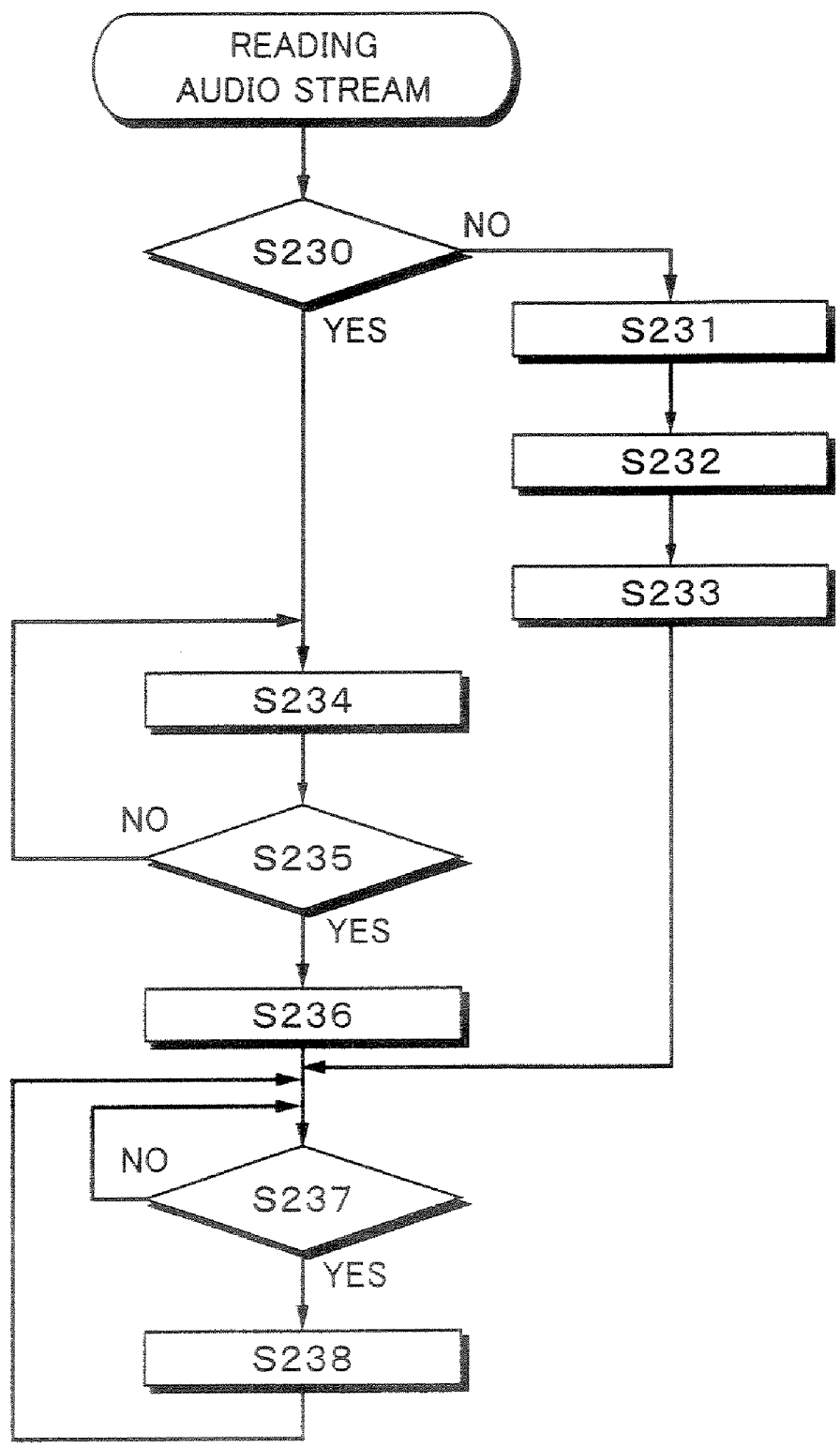
FIG. 37 is a flow chart describing an audio stream read process.

Next, with reference to a flow chart shown in FIG. 37, an audio stream read process for the buffer 215A of the audio read function portion 234 (FIG. 3) will be described.

At step S230, the audio read function portion 234 determines whether stream_id of an audio stream to be reproduced, which has been stored in the stream_id register 252 (FIG. 3) at step S127 shown in FIG. 30, represents PES_packet( ) of private_stream_1.

When the determined result at step S230 represents that stream_id stored in the stream_id register 252 does not represent PES_packet( ) of private_stream_1, namely as described in FIG. 20, stream_id stored in the stream_id register 252 is 110xxxxxB assigned to an audio stream that has been encoded corresponding to the MPEG standard, the flow advances to step S231. At step S231, the audio read function portion 234 searches a program stream stored in the buffer 215A for a synchronous code that represents the beginning of an audio frame defined in the MPEG Audio. Since the position of the synchronous code is at the beginning of an audio frame, the audio read function portion 234 updates the audio read pointer so that it represents the position of the beginning of an audio frame. Thereafter, the flow advances from step S231 to step S232. At step S232, the audio read function portion 234 searches the program stream stored in the buffer 215A for PES_packet( ) that matches stream_id stored in the stream_id register 252 corresponding to the position represented by the audio read pointer and obtains PES_packet( ). Thereafter the flow advances to step S233

At step S233 the audio read function portion 234 updates the audio read pointer stored in the audio read pointer storage portion 251 so that the audio read pointer represents the beginning of PES_packet data_byte of PES_packet( ) FIG. 16A and FIG. 16B to FIG. 18A and FIG. 18B), which has been found at step S232. Thereafter the flow advances to step S237.

At step S237, the audio read function portion 234 determines whether the audio decoder control module 217 has issued a data request. When the determined result at step S237 represents that audio decoder control module 217 has not issued a data request, the flow returns to step S237. At step S237, the audio read function portion 234 repeats the same process.

In contrast, when the determined result at step S237 represents that the audio decoder control module 217 has issued a data request, the flow advances to step S238. At step S238, the audio read function portion 234 parses the program stream from the position represented by the audio read pointer in the buffer 215A, reads one audio access unit having a predetermined fixed length from the buffer 215A, and supplies the audio access unit together with time stamps (PTS and DTS) added to the audio access unit to the audio decoder control module 217.

The audio read function portion 234 updates the audio read pointer for the size of one audio access unit read from the buffer 215A. Thereafter, the flow returns to step S237. At step S237, the audio read function portion 234 repeats the same process.

In contrast, when the determined result at step S230 represents that stream_id stored in the stream_id register 252 represents PS_packet( ) of private_stream_1, namely stream_id stored in the X59 stream_id register 252 is 10111101B (=0xBD) and represents PES_packet( ) of private_stream_1 as described in FIG. 20, the flow advances to step S234. At step S234, the audio read function portion 234 searches the program stream stored in the buffer 215A for PES_packet( ) of private_stream_1 and obtains PES_packet( ). In other words, the audio read function portion 234 searches for PES_packet( ) whose stream_id is 101111101B and obtains PES_packet( ).

When the audio read function portion 234 has found PES_packet( ) of private_stream_1 at step S234, the flow advances to step S235. At step S235, the audio read function portion 234 extracts private_stream_id from private_stream1_PES_payload( ) (FIG. 21), which is PES_packet_data_byte of PES_packet( ) of private_stream_1 and determines whether private_stream_id matches private_stream_id of an audio stream to be reproduced, which has been stored in the private stream_id register 253 (FIG. 3) at step S127 shown in FIG. 30.

When the determined result at step S235 represents that private_stream_id described in private_stream1_PES_payload( ) does not match private_stream_id stored in the private_stream_id register 253 namely PES_packet( ) of private_stream_1 found at step S234 is not an audio stream to be reproduced, the flow returns to step S234. At step S234, the audio read function portion 234 searches the program stream stored in the buffer 215A for PES_packet( ) of private_stream_1. Thereafter, the audio read function portion 234 repeats the same process.

On the other hand, when the determined result at step S235 represents that private_stream_id described in program_stream_PES_payload( ) matches private_stream_id stored in the private_stream_id register 253 namely PES_packet( ) of private_stream_1 found at step S234 is an audio stream to be reproduced, the flow advances to step S236. At step S236, the audio read function portion 234 reads AU_locator described in private_stream1_PES_payload( ) (FIG. 21) of PES_packet( ) of private_stream_1 from the buffer 215A, adds the position immediately after AU_locator and the value that AU_locator represents, and obtains the start position of the audio access unit.

In other words, as described in FIG. 21, AU_locator represents the start position of an audio access unit (or a subtitle access unit) stored in private_payload( ) of private_stream1_PES_payload( ) based on the position immediately after AU_locator. Thus, by adding the value of AU_locator and the position immediately after AU_locator, the (absolute) start position of the audio access unit can be obtained.

At step S236, the audio read function portion 234 updates the audio read pointer stored in the audio read pointer storage portion 251 so that the audio read pointer represents the start position of the audio access unit that has been obtained. Thereafter, the flow advances to step S237.

At step S237, the audio read function portion 234 determines whether the audio decoder control module 217 has issued a data request. When the determined result at step S237 represents that the audio decoder control module 217 has not issued a data request, the flow returns to step S237. At step S237, the audio read function portion 234 repeats the same process.

In contrast, when the determined result at step S237 represents that the audio decoder control module 217 has issued a data request, the flow advances to step S238. At step S238, the audio read function portion 234 parses the program stream from the position represented by the audio read pointer in the buffer 215A, reads one audio access unit having a predetermined length from the buffer 215A, and supplies the audio access unit together with time stamps added to the audio access unit to the audio decoder control module 217.

The audio read function portion 234 updates the audio read pointer for the size of one audio access unit read from the buffer 215A. Thereafter, the flow returns to step S237. At step S237, the audio read function portion 234 repeats the same process.

[Reading Subtitle Stream]

Figure 38:
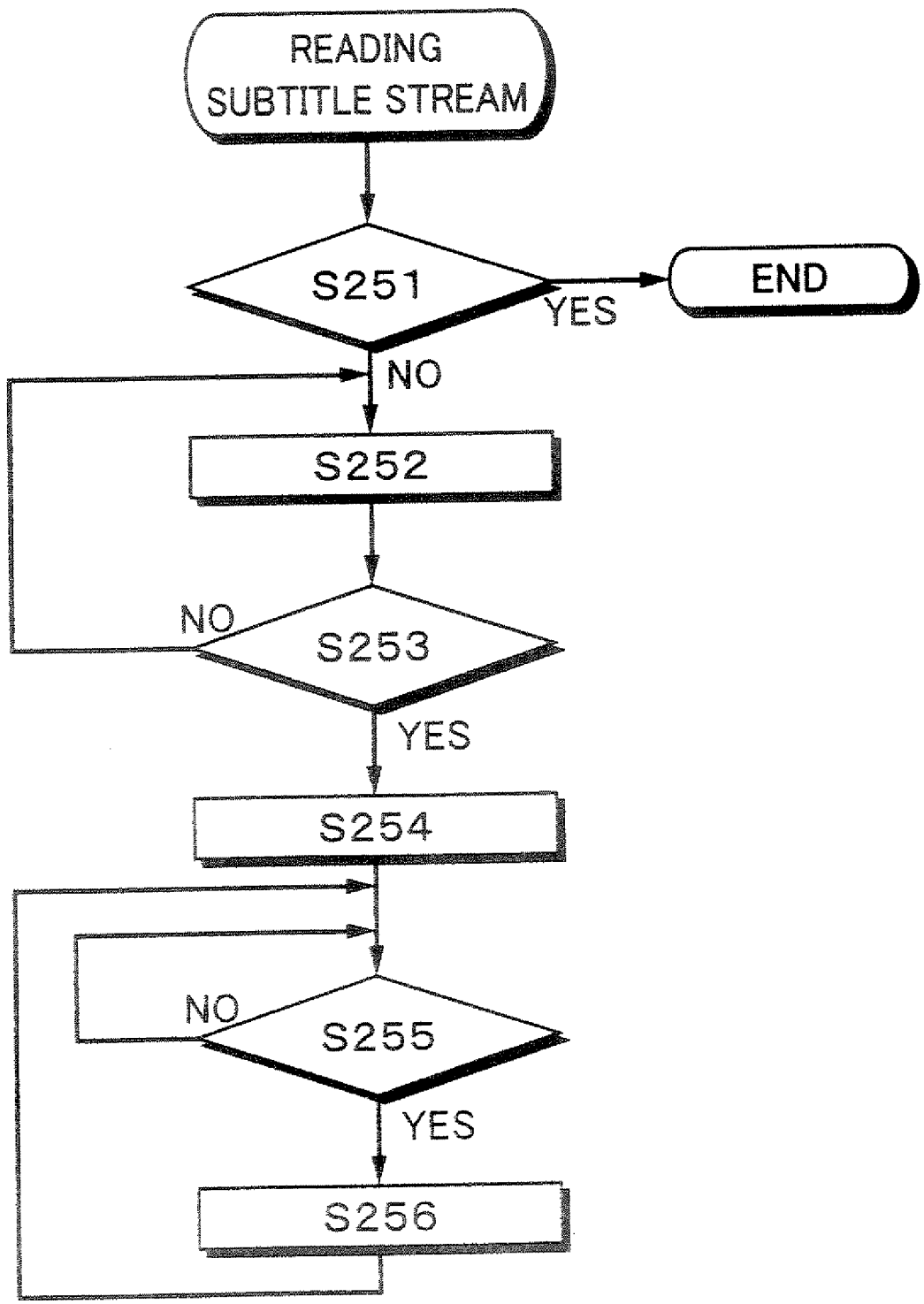
FIG. 38 is a flow chart describing a subtitle stream read process.

Next, with reference to a flow chart shown in FIG. 38, a subtitle stream read process for the buffer 215A of the subtitle read function portion 235 (FIG. 3) will be described.

At step S251, the subtitle read function portion 235 determines the subtitle read function flag, which has been stored in the video decoder control module 216 at step S127 shown in FIG. 30. When the determined result at step S251 represents that the subtitle read function flag is 0, namely a clip stream file multiplexed with an elementary stream to be reproduced does not contain a subtitle stream and 0 has been set to the subtitle read function flag storage portion 261 at step S127 shown in FIG. 30, the subtitle read function portion 235 does not perform any process.

In contrast, when the determined result at step S251 represents that the subtitle read function flag is 1, namely a clip stream file multiplexed with an elementary stream to be reproduced contains a subtitle stream and 1 has been set to the subtitle read function flag storage portion 261; at step S127 shown in FIG. 30, the flow advances to step S252. At step S252, the subtitle read function portion 235 searches the program stream stored in the buffer 215A for PES_packet( ) that matches stream_id of the subtitle stream to be reproduced, which has been stored in the stream_id register 263 (FIG. 3).

As described at step S127 shown in FIG. 30, stream_id of the subtitle stream to be reproduced is stored in the stream_id register 263 (FIG. 3). On the other hand, as described in FIG. 20, stream_id of the subtitle stream as 10111101B (=0xBD), which represents PES_packet( ) of private_stream_1.

Thus, at step S252, the subtitle read function portion 235 searches the program stream stored in the buffer 215A for PES_packet( ) of private_stream_1.

When the subtitle read function portion 235 has searched for PES_packets of private_stream_1 and obtained it, the flow advances to step S253. The subtitle read function portion 235 extracts private_stream_id from private_stream PES_payload( ) (FIG. 21), which is PES_packet data_byte of PES_packet( ) of private_stream_1 and determines whether private_stream_id matches private_stream_id of the subtitle stream to be reproduced, which has been stored in the private_stream_id register 264 (FIG. 3) at step S127 shown in FIG. 30.

When the determined result at step S253 represents that private_stream_id described in private_stream_PES_payload( ) does not match private_stream_id stored in the private_stream_id register 264, namely PES_packet) of private_stream_1, which has been obtained at step S252, is not the subtitle stream to be reproduced, the flow returns to step S252. At step S252, the subtitle read function portion 235 searches the program stream stored in the buffer 215A for PES_packet( ) of another private_stream_1. Thereafter, the subtitle read function portion 235 repeats the same process.

In contrast, when the determined result at step S253 represents that private_stream_id described in private_stream1_PES_payload( ) matches private_stream_id stored in the private_stream_id register 264, namely PES_packet( ) of private_stream_1, which has been obtained at step S252, is the subtitle stream to be reproduced, the flow advances to step S254. At step S254, the subtitle read function portion 235 reads AU_locator described in private_stream1_PES_payload( ) (FIG. 21) of PES_packet( ) of private_stream_1 from the buffer 215A, adds the position immediately after AU_locator and the value that AU_locator represents, and obtains the start position of the subtitle access unit.

As described in FIG. 21, AU_locator represents the star position of a subtitle access unit (or an audio access unit) stored in private_payload( ) of private_stream1_PES_payload( ) based on the position immediately after AU_locator. Thus, by adding the value that AU_locator represents and the position immediately after AU_locator, the (absolute) start position of the subtitle access unit can be obtained.

In addition, at step S254, the subtitle read function portion 235 updates the subtitle read pointer stored in the subtitle read pointer storage portion 262 so that the subtitle read pointer represents the start position of the obtained subtitle access unit. Thereafter, the flow advances to step S255.

At step S255, the subtitle read function portion 235 determines whether the subtitle decoder control module 218 has issued a data request. When the determined result at step S255 represents that the subtitle read function portion 235 has not issued a data request, the flow returns to step S255. At step S255, the subtitle read function portion 235 repeats the same process.

In contrast, when the determined result at step S255 represents that the subtitle decoder control module 218 has issued a data request, the flow advances to step S256. At step S256, the subtitle read function portion 235 parses the program stream from the position represented by the subtitle read pointer in the buffer 215A, reads one subtitle access unit for the size described at the beginning of the subtitle access units from the buffer 215A, and supplies the subtitle access unit together with time stamps added to the subtitle access unit to the subtitle decoder control module 218. As described in FIG. 2A and FIG. 2B, the size of a subtitle access unit is described at the beginning thereof. The subtitle read function portion 235 reads data for the size from the position represented by the subtitle read pointer in the buffer 215A and supplies the subtitle access unit together with time stamps added to the subtitle access unit to the subtitle decoder control module 218.

The subtitle read function portion 235 updates the subtitle read pointer for the size of one subtitle access unit read from the buffer 215A. Thereafter, the flow returns to step S255. At step S255 the subtitle read function portion 235 repeats the same process

[Resynchronization Process]

Next, a synchronization control for video data and audio data of the decode control module 214 shown in FIG. 2A and FIG. 2B will be described.

As described at step S130 shown in FIG. 30, the decode control module 214 causes the video decoder control module 216, the audio decoder control module 217, and the subtitle decoder control module 218 to start decoding their data. If necessary, the decode control module 214 causes these modules to start decoding their data at different timings to synchronize them. For example, when the video decoder 116 and the audio decoder 117 perform their decode processes, depending on their progress degrees, they may output video data and audio data at different timings.

Thus, the decode control module 214 performs a re-synchronization process that compensates the difference of the output timings for video data and audio data and causes the video decoder 116 and the audio decoder 117 to synchronously output video data and audio data.

Next, with reference to a flow chart shown in FIG. 39, the re-synchronization process will be described.

In the re-synchronization process, at step S271, the decode control module 214 determines the difference between the time stamp of a video access unit that is output from the video decoder control module 216 and the time stamp of an audio access unit that is output from the audio decoder control module 217 is large.

As described at step S129 shown in FIG. 30, whenever the video decoder control module 216 receives a video access unit from the buffer control module 215, the video decoder control module 216 supplies the time stamp of the video access unit to the decode control module 214. Likewise whenever the audio decoder control module 217 receives an audio access unit from the buffer control module 215, the audio decoder control module 217 supplies the time stamp of the audio access unit to the decode control module 214.

At step S271, the decode control module 214 compares the time stamps received from the video decoder control module 216 and the audio decoder control module 217 at the same timing (in a predetermined time period considered to be the same timing) and determines whether the difference of the time stamps is large.

When the determined result at step S271 represents that the difference between the time stamp of the video access unit received from the video decoder control module 216 and the time stamp of the audio access unit received from the audio decoder control module 217 is not large, namely the difference between the time stamp of the video access unit and the time stamp of the audio access unit is in a predetermined range of which the access units can be considered to be synchronized, for example two video frames (around 66 milliseconds), the flow returns to step S271. At step S271, the decode control module 214 determines (monitors) the difference of the time stamps.

In contrast, when the determined result at step S271 represents that the difference between the time stamp of the video access unit received from the video decoder control module 216 and the time stamp of the audio access unit received from the audio decoder control module 217 is large, namely the difference is not in a predetermined range of which the access units cannot be considered to be synchronized, the flow advances to step S272. At step S272, the decode control module 214 compares the time stamp of the video access unit received from the video decoder control module 216 and the time stamp of the audio access unit received from the audio decoder control module 217 so as to determine which of the output of the video data and the output of the audio data is later than the other.

When the determined result at step S272 represents that the output of the video data is later than the output of the audio data, the flow advances to step S273. At step S273, the decode control module 214 causes the video decoder control module 216 to stop decoding and outputting (displaying) a video access unit, namely skip the process for a video access unit, to advance the process for one video access unit. Thereafter, the flow advances to step S274.

At step S274, the video decoder control module 21 receives a skip request from the decode control module 214 and checks au_ref_flag (FIG. 24) supplied together with the video access unit from the buffer control module 215.

In other words, au_information( ) (FIG. 24) stored in private_stream2_PES_payload( ) (FIG. 23) of PES_packet( ) of private_stream_2 contains au_ref_flag as information about an access unit. As described at step S129 shown in FIG. 30 and step S216 shown in FIG. 36, together with the video access unit the buffer control module 215 supplies au_ref_flag thereof to the video decoder control module 216.

At step S274, the video decoder control module 216 checks au_ref_flag of the access unit supplied together with the access unit.

Thereafter, the flow advances from step S274 to step S275. At the step S275, the video decoder control module 216 determines whether the video access unit is a non-reference image that is not referenced when another picture is decoded corresponding to the check result of au_ref_flag of the video access unit, which has been supplied from the buffer control module 215.

As described in FIG. 24, au_ref_flag of a video access unit represents whether the access unit is a reference image. When the access unit is a reference image, au_ref_flag is 1. In contrast, when the access unit is not a reference image, au_ref_flag is 0.

When the determined result at step S275 represents that the video access unit supplied from the buffer control module 215 is not a non-reference image (a video access unit thereof), namely the video access unit supplied from the buffer control module 215 is a reference image, the flow advances to step S276. At step S276, the video decoder control module 216 causes the video decoder 116 to normally process the video access unit. After the video decoder control module 216 has received the next video access unit from the buffer control module 215, the flow returns to step S274

In contrast, when the determined result at step S275 represents that the video access unit supplied from the buffer control module 215 is a non-reference image, the flow advances to step S277. At step S277, the video decoder control module 216 causes the video decoder 116 to skip the process for the video access unit. After the buffer control module 215 has supplied the next video access unit, the flow returns to step S271.

Since the process for a video access unit is skipped, the process is advanced for almost one video access unit (the process time is decreased). As a result, the output of video data that is later than the output of audio data is advanced.

In contrast, when the determined result at step S272 represents that the output of video data is not later than the output of audio data, namely the output of audio data is later than the output of video data, the flow advances to step S278. At step S278, the decode control module 214 outputs a continuous output command to the video decoder control module 216 to continuously output video data corresponding to the video access unit that is being decoded to keep the video decoder control module 216 waiting for the process for the next video access unit. Thereafter, the flow advances to step S279.

At step S279, the video decoder control module 216 receives the continuous output request from the decode control module 214 and continuously outputs video data of the video access unit that is being decoded to the graphics process module 219 corresponding to the continuous output request. After the buffer control module 215 has supplied the next video access unit, the flow advances to step S271.

As described above, the decode control module 214 determines whether the output of video data is later than the output of audio data. When the output of video data is later than the output of audio data, the decode control module 214 causes the video decoder control module 216 to skip the process for one access unit. The video decoder control module 216 determines whether the access unit to be skipped is a reference image or a non-reference image corresponding to au_ref_flag of the access unit. When the access unit is a non-reference images the decode control module 214 causes the video decoder 116 to skip the process for the access unit. Thus, the output of video data and the output of audio data can be easily synchronized.

In other words, when an access unit to be skipped is a reference image, video data of the access unit need to be decoded so that the video data are referenced when another access unit is decoded. Thus, when the output of video data and the output of audio data are synchronized, if the process for an access unit of a reference image is skipped, another access unit that references the reference image cannot be decoded. As a result, when video data synchronized with audio data are displayed, noise appears.

Thus, it is preferred that an access unit that is not a non-reference image be skipped.

On the other hand, to search a conventional elementary stream for an access unit that is a non-reference image, the elementary stream needs to be parsed. An elementary stream encoded corresponding to for example the MPEG4-AVC system is very complicated. Thus, when the elementary stream is parsed, very high cost is required.

In contrast, a program stream stored in a clip stream file recorded on the disc 101 is multiplexed with PES_packet( ) of private_stream_2 that contains private_stream2_PES_payload( ) (FIG. 23), which is an extension of PES_packet_data_byte, besides PES_packet( ) (FIG. 16A and FIG. 16B to FIG. 18A and FIG. 18B) having PES_packet_data_byte, which contains a video access unit. au_information( ) (FIG. 24) of private_stream2_PES_payload( ) describes au_ref_flag, which represents whether the video access unit is a reference image or a non-reference image. au_ref_flag and the corresponding video access unit are supplied from the buffer control module 215 to the video decoder control module 216. Thus, the video decoder control module 216 can determine whether a video access unit is a reference image or a non-reference image by checking au_ref_flag of the video access unit almost without extra cost.

[Mark Process]

Figure 40:
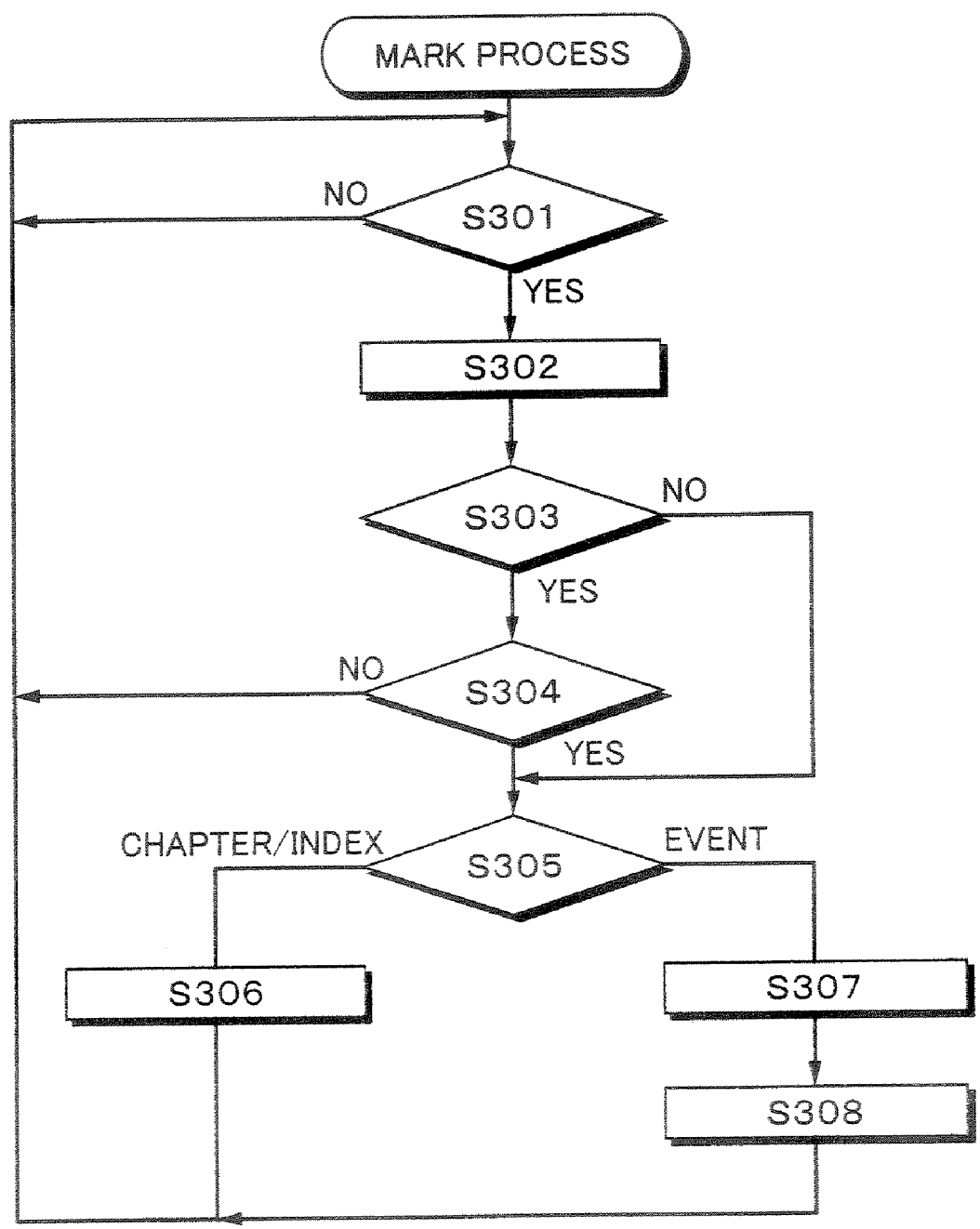
FIG. 40 is a flow chart describing a mark process.

Next, with reference to a flow chart shown in FIG. 40, a mark process based on Mark( ) described in PlayListMark( ) (FIG. 7) will be described.

The decode control module 214 always checks the current time counted by the built-in time count portion 214A. At step S301, the decode control module 214 determines whether the current time matches mark_time_stamp of any Mark( ) described in PlayListMark( ) (FIG. 7).

As described at step S124 shown in FIG. 30, when the player control module 212 reproduces the first PlayItem#0 of the first PlayList# shown in FIG. 25, the player control module 212 recognizes that four Mark( )'s, which are the first to fourth Mark( )'s, of seven Mark( )'s contained in PlayList-Mark( ) in the upper table shown in FIG. 28 belong to the first PlayItem#0 of PlayList#0 and supplies {180,090}, {5,580,090}, {10,980,090}, and {16,380,090}, which are mark_time stamp's of the four Mark( )'s together with information that represents that an attribute of times that mark_time_stamp's represent is "mark process" to the decode control module 214.

At step S301, the decode control module 214 determines which of the four times (mark_time_stamp's) having an attribute of "mark process," which have been supplied from the player control module 212, matches the current time.

When the determined result at step S301 represents that the current time does not match any of the times having an attribute of "mark process," the flow returns to step S301. At step S301, the decode control module 214 repeats the same process.

In contrast, when the determined result at step S301 represents that the current time matches one of the four times having an attribute of "mark process," the decode control module 214 supplies a message that represents that the current time became a time having an attribute of "mark process" together with the matched time having an attribute of "mark process" to the player control module 212. Thereafter, the flow advances to step S302.

At step S302 the player control module 212 receives the message, which represents that the current time became a time having an attribute of "mark process," together with the matched time, which has an attribute of "mark process," from the decode control module 214 and recognizes Mark( ) whose mark_time_stamp matches the current time as Mark( ) to be processed for the mark process (hereinafter, this Mark( ) is sometimes referred to as a target mark).

In other words, the player control module 212 has recognized PlayItem( ) of PlayList( ) that is being reproduced. By referencing PlayListMark( ) (FIG. 7) of the "PLAYLIST.DAT" file (FIG. 5) with PlayList( ) PlayItem( ), and the matched time (mark_time_stamp), which an attribute of "mark process" (hereinafter this time is sometimes referred to as a mark time), the player control module 212 recognizes a target mark.

Specifically assuming that the first PlayItem#0 of the first PlayList#0 shown in FIG. 25 is being reproduced, the player control module 212 recognizes a mark time is mark_time_stamp of any one of the four Mark( )'s, which are the first to fourth Mark( )'s of seven Mark( )'s contained in PlayList-Mark( ) in the upper table shown in FIG. 28.

When the mark time supplied from the decode control module 214 to the player control module 212 is for example 16,380,090, the player control module 212 recognizes the fourth Mark( ) whose mark_time_stamp matches 16,380,090, which is the mark time, of four Mark( )'s, which are the first to fourth Mark( )'s, contained in PlayListMark( ) in the upper table shown in FIG. 28 as the target mark.

When the player control module 212 has recognized the target mark, the flow advances from step S302 to step S303. At step S303, the player control module 212 determines whether the target mark describes entry_ES_stream_id and entry_ES_private_stream_id (FIG. 7), which identify an elementary stream.

When the determined result at step S303 represents that the target mark does not describe entry_ES_stream_id and entry_ES_private stream_id (FIG. 7), which identify an elementary stream, namely both entry_ES_stream_id and entry_ES_private_stream_id are 0x00, the flow advances to step S305, skipping step S304. At step S305, the decode control module 214 performs the process for the target mark.

In contrast, when the determined result at step S303 represents that the target mark describes entry_ES_stream_id and entry_ES_private_stream_id (FIG. 7), which identify an elementary stream, the flow advances to step S304. At step S304, the player control module 212 determines whether the elementary stream that is being reproduced contains an elementary stream_identified by entry_ES_stream_id and if necessary entry_ES_private_stream_id.

When the determined result at step S304 represents that the elementary stream that is being reproduced does not contain an elementary stream identified by entry_ES_stream_id and entry_ES_private_stream_id of the target mark, the flow returns to step S301. In other words, when the elementary stream_identified by entry_ES_stream_id and entry_ES_private stream_id of the target mark is not being reproduced, the target mark is ignored.

In contrast, when the determined result at step S304 represents that the elementary stream that is being reproduced contains an elementary stream identified by entry_ES_stream_id and entry_ES_private_stream_id of the target mark, namely an elementary stream identified by entry_ES_stream_id and entry_ES_private_stream_id of the target mark is being reproduced, it is determined that the target mark be valid. Thereafter, the flow advances to step S305. At step S305, the player control module 212 performs the process for the target mark.

In other words, at step S305, by referencing mark_type of a target mark (FIG. 7), the player control module 212 determines the target mark.

When the determined result at step S335 represents that the target mark is a chapter mark or an index mark, namely mark_type of the target mark is "Chapter" or "Index," the flow advances to step S306. At step S306, the player control module 212 causes the graphics process module 219 to update the chapter number or index number with that of the target mark. Thereafter, the flow returns to step S301.

When the determined result at step S305 represents that the target mark is an event mark, namely mark_type of the target mark is "Event," the flow advances to step S307. At step S307, the player control module 212 informs the script control module 211 of both an event message that represents that an event has taken place and mark_data of the target mark. Thereafter, the flow advances to step S308.

At step S308, the script control module 211 receives an event message and mark_data from the player control module 212 and performs a sequence of processes described in the "SCRIPT.DAT" file with an argument of mark_data corresponding to an interrupt request of the event message. Thereafter, the flow returns to step S301.

In other words, the script control module 211 performs a process corresponding to mark_data.

Specifically, in PlayListMark( ) of PlayList#1 in the lower table shown in FIG. 28, mark_type of each of the second Mark( ) (Mark#1) and the third Mark( ) (Mark#2) is "Event" and mark_data of Mark#1 is different from mark_data of Mark#2.

When the script control module 211 receives an event message corresponding to the second Mark( ) and an event message corresponding to the third Mark( ), the script control module 211 performs a process corresponding to the received event message with the same event handler (interrupt process routine). The script control module 211 checks mark_data supplied together with the event message and performs a process corresponding to mark_data.

Specifically, when mark_data is for example 1, the script control module 211 controls the graphics process module 219 to display a first type icon. When mark_data is for example 2, the script control module 211 controls the graphics process module 219 to display a second type icon.

mark_data is not limited to 1 and 2. In addition, the process corresponding to mark_data is not limited to the display of simple icons.

In other words, when mark_data is in the range from 3 to 18, the script control module 211 controls the graphics process module 219 to display the first type icon with intensity corresponding to a value of which 2 is subtracted from mark_data (a value in the range from 1 to 16). On the other hand, when mark_data is in the range from 19 to 34, the script control module 211 controls the graphics process module 219 to display the second type icon with intensity corresponding to a value of which 18 is subtracted from mark_data (a value in the range from 1 to 16).

When a controller that the user operates is connected to the input interface 115 (FIG. 1) and the controller has a vibration motor that is a direct current (DC) motor with an eccentric weight mounted on the motor shaft and that vibrates when the motor is driven, if the value of mark_data is in the range from 35 to 42, the vibration motor can be driven for an operation time period corresponding to a value of which 34 is subtracted from mark_data (a value in the range from 1 to 8).

mark_data is a numeric value. The use and algorithm of mark_data can be described with a script program that the script control module 211 executes. Thus mark_data can be used corresponding to a predetermined rule or an original rule designated by the manufacturer of the disc 101 or a content provider that provides data recorded on the disc 101.

When the current time matches a time having an attribute of "mark process," a target mark is recognized from the mark time, which is the time having an attribute of "mark process." When a target mark does not describe entry_ES_stream_id and entry_ES_private_stream_id that identify an elementary stream a process corresponding to mark_type of the target mark is preformed. Even if a target mark describes entry_ES_stream_id and entry_ES_private stream_id that identify an elementary stream while the elementary stream_identified by entry_ES_stream_id and entry_ES_private_stream_id is being reproduced, a process corresponding to mark_type of the target mark is performed.

While the second PlayList#1 shown in FIG. 25 is being reproduced, the following mark process is performed.

In other words, as shown in the lower table shown in FIG. 28, PlayListMark( ) of the second PlayList#1 describes first Mark( ) (Mark#0), second Mark( ) (Mark#1), and third Mark( ) (Mark#2), whose mark_time_stamp's are 90,000, 27,090,000, and 27,540,000, respectively.

In addition, since entry_ES_stream_id's of the second Mark( ) and the third Mark( ) of PlayListMark( ) in the lower table shown in FIG. 28 describe 0xE0 and 0xE1, the second Mark( ) and the third Mark( ) are correlated with elementary streams identified by stream_id's that are 0xE0 and 0xE1, respectively.

As described in FIG. 25, the second PlayList#1 describes only one PlayItem( ) (PlayItem#0). With PlayItem#0, the clip stream file "00003.PS" is reproduced. As described in the clip information file "00003.CLP" shown in FIG. 26A and FIG. 26B, which corresponds to the clip stream file "00003.PS," the clip stream file "00003.PS" is multiplexed with three elementary streams, which are the video stream stream#0 identified by stream_id that is 0xE0, the video stream stream#1 identified by stream_id that is 0xE1, and the audio stream#2 identified by private_stream_id that is 0x00.

Thus, the second Mark( ) of PlayListMark( ) in the lower table shown in FIG. 28 is correlated with the video stream file stream#0 whose stream_id is 0xE0, which is multiplexed with the clip stream file "00003.PS." The third Mark( ) is correlated with the video stream stream#1 whose stream_id is 0xE1, which is multiplexed with the clip stream file "00003.PS."

When PlayItem#0 of the second PlayItem#1 shown in FIG. 25 is reproduced, as described at step S124 shown in FIG. 30, the player control module 212 recognizes that three Mark( )'s contained in PlayListMark( ) in the lower table shown in FIG. 28 belong to PlayItem#0 of PlayList#1 and supplies {90, 000}, {27,090,000}, and {27,540,000}, which are mark_time_stamp's of three Mark( )'s, together with information that represents that the times have an attribute of "mark process" to the decode control module 214.

In the mark process, while PlayItem#0 of PlayList#1 is being reproduced, the decode control module 214 always determines which of times {90,000}, {27,090,000}, and {27,540,000} matches the current time counted by the time count portion 214A (at step S301). When the current time matches a time having an attribute of "mark process," the decode control module 214 supplies a mark time that is a time having an attribute of "mark process," matches the current time, together with a message that represents that the current time became a time having an attribute of "mark process" to the player control module 212.

When the current time matches 27,090,000 of times {90, 000}, {27,090,000}, and {27,540,000} having an attribute of "mark process," the decode control module 214 supplies a mark time having an attribute of "mark process," 27,090,000, together with the message that represents that the current time became a time having an attribute of "mark process" to the player control module 212.

The player control module 212 has recognized that PlayItem#0 of PlayList#1 is being reproduced. The player control module 212 compares 90,000, 27,090,000, and 27,540,000, which are mark_time_stamp's of three Mark( )'s that belong to PlayItem#0 of Mark( )'s described in PlayListMark( ) in the lower table shown in FIG. 28 with 27,090,000, which is the mark time supplied from the decode control module 214 and recognizes that Mark( ) whose mark_time_stamp matches 27,090,000, which is a mark time, namely the second Mark( ) (Mark#1) described in PlayListMark( ) in the lower table shown in FIG. 28 is a target mark (at step S302).

In the second Mark( ), which is a target mark, described in PlayListMark( ) in the lower table shown in FIG. 28, entry_ES_stream_id is 0xE0. As described above, entry_ES_stream_id, which is 0xE0, represents the video stream stream#0 (FIG. 26A and FIG. 26B) whose stream_id is 0xE0, multiplexed with the clip stream file "00003.PS." The player control module 212 determines whether an elementary stream that is being reproduced contains the video stream stream#0 (at steps S303 and S304).

When an elementary stream that is being reproduced does not contain the video stream stream#0, the player control module 212 ignores the target mark (at step S304).

In contrast, when an elementary stream that is being reproduced contains the video stream stream#0, the player control module 212 treats the target mark to be valid and performs a process corresponding to the target mark (at steps S305 to 3308).

In this case in the second Mark( ), which is a target mark, described in PlayListMark), in the lower table shown in FIG. 28, mark_type is "Event." Thus, the second Mark( ) is an event mark. The player control module 212 supplies an event message that represents that an event has taken place and mark_data of the target mark to the script control module 211 (at steps S305 and S307). The script control module 211 performs a sequence of processes described in the "SCRIPT.DAT" with an argument of mark_data corresponding to an interrupt request of the event message received from the player control module 212 (at step S308).

As described above, in the mark process, the player control modules determines whether the current time that is a reproduction time of a clip stream file reproduced corresponding to mark_time_stamp that represents one reproduction time on the time axis of is PlayList( ), mark_type that represents the type of Mark( ), and PlayList( ) (FIG. 5) that contains PlayListMark) (FIG. 7) that has no Mark( ) or more than one Mark( ) that contains mark_data as an argument of an event mark matches mark_time_stamp. When the current time matches mark_time_stamp, the player control module 212 recognizes Mark( ) that has mark_time_stamp equal to a mark time, which is the current time, as a target mark. When mark_type that has a target mark represents a type of which an event takes place, namely the target mark is an event mark, mark_type that the target mark has and the event message are supplied. The player control module 212 executes a process corresponding to mark_data. Thus, the player control module 212 can execute a process corresponding to mark_data for the reproduction time of the clip stream file.

[Output Attribute Control Process]

Next, with reference to a flow chart shown in FIG. 41, an output attribute control process performed at step S126 shown in FIG. 30 will be described in detail.

As described at step S126 shown in FIG. 30, the player control module 212 checks number_of_DynamicInfo (FIG. 10), which represents the number of DynamicInfo( )'s (FIG. 13), which describe an output attribute for at least one elementary stream to be reproduced, namely at least one elementary stream to be reproduced, which has been decided at step S125.

When number_of DynamicInfo of each of at least one elementary stream to be reproduced is 0, the player control module 212 does not perform any process.

Figure 41:
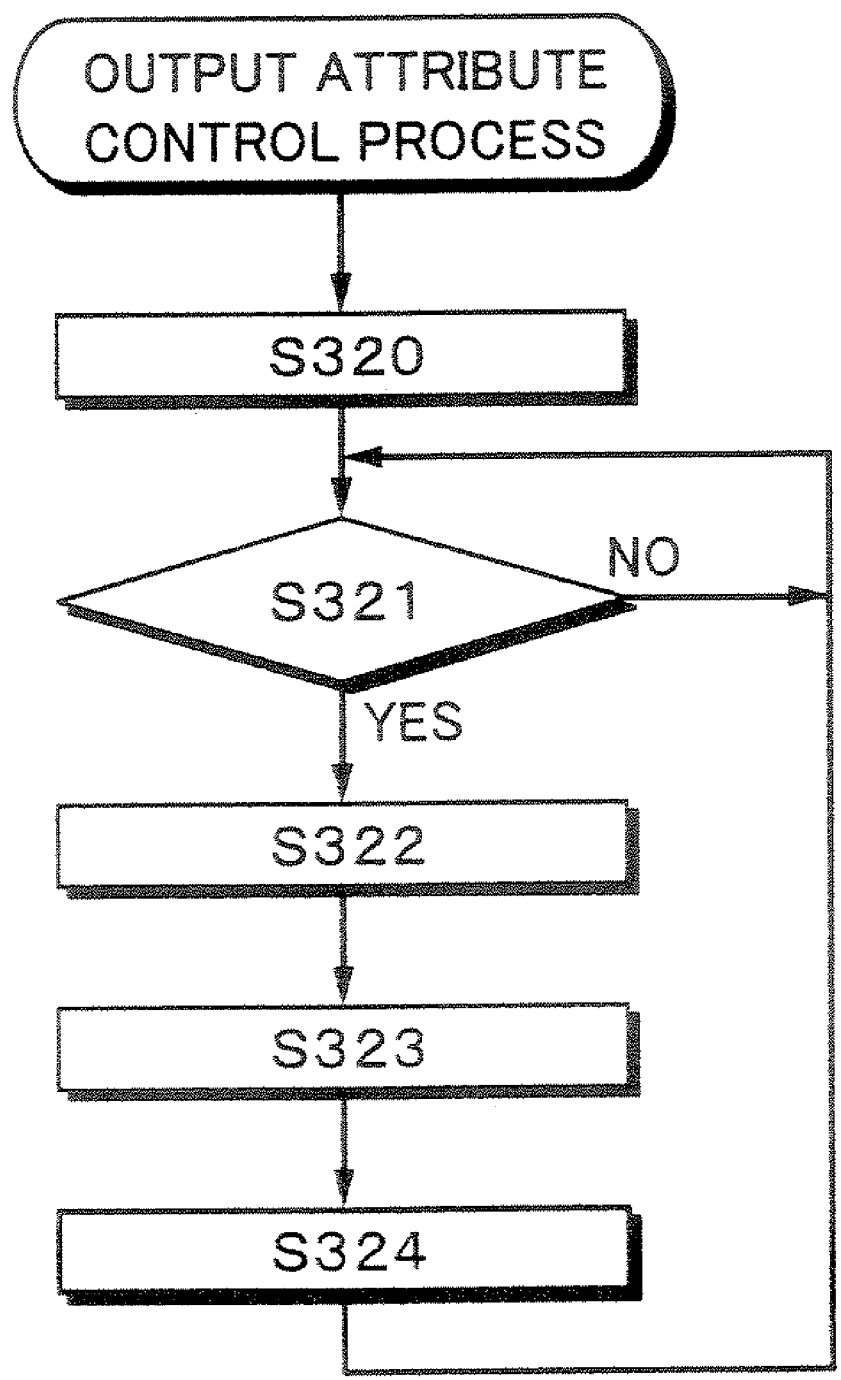
FIG. 41 is a flow chart describing an output attribute control process.

In contrast, when number_of_DynamicInfo of an elementary stream to be reproduced is not 0, the player control module 212 performs an output attribute control process corresponding to a flow chart shown in FIG. 41.

Thus, when three clip information files "00001.CLP," "00002.CLP," and "00003.CLP" recorded on the disc 101 are as shown in FIG. 26A and FIG. 26B and the clip stream file "00001.PS" (the first PlayItem#0 of the first PlayList#; that reproduces the clip stream file "00001.PS") corresponding to the clip information file "00001.CLP" is reproduced, since number_of_DynamicInfo's of all the four elementary streams, which are stream#0 to stream#3, are 0, the player control module 212 does not perform the output attribute control process.

Likewise, when the clip stream file "00002.PS" (the second PlayItem#1 of the first PlayList#0 that reproduces the clip stream file "00002.PS) corresponding to the clip information file "00002.CLP" is reproduced, since all number_of_DynamicInfo's of four elementary streams, which are stream#0 to stream#3, multiplexed with the clip stream file "00002.PS" are 0, the player control module 212 does not perform the output attribute control process.

In contrast, when the clip stream file "00003.PS" (PlayItem#0 of the second PlayList#1 that reproduces the clip stream file "00003.PS" corresponding to the clip information file "00003.CLP" is reproduced, since number_of_DynamicInfo's of the video stream stream#0, which is the first elementary stream, and the audio stream stream#2, which is the third elementary stream, are 2 and 3, respectively, the player control module 212 performs the output attribute control process.

In other words, in the output attribute control process, at step S320, the player control module 212 supplies pts_change_point described in the clip information file Clip( ) (FIG. 10) corresponding to the clip stream file to be reproduced together with information that represents a time having an attribute of "DynamicInfo( ) process" to the decode control module 214. The decode control module 214 receives pts_change_point, which is a time having an attribute of "DynamicInfo( ) process" from the player control module 212. Thereafter, the flow advances to step S321.

At step S321, the decode control module 214 determines whether the current time counted by the time count portion 214A matches one of pts_change_point's, which are times having an attribute of "DynamicInfo( ) process." When the determined result at step S321 represents that the current time does not match any one of pts_change_point's, the flow returns to step S321.

In contrast, when the determined result at step S321 represents that the current time matches any one of times having an attribute of "DynamicInfo( ) process," the decode control module 214 supplies a message that represents that the current time became a time having an attribute of "DynamicInfo( ) process" and the matched time, which has an attribute of "DynamicInfo( ) process" (hereinafter sometimes referred to as DynamicInfo time), to the player control module 212. Thereafter, the flow advances to step S322.

At step S332, the player control module 212 receives the message, which represents that the current time became a time having an attribute of "DynamicInfo( ) process," and a DynamicInfo time from the decode control module 214 and recognizes DynamicInfo( ) paired with pts_change_point (FIG. 10) that matches the DynamicInfo time as a target DynamicInfo( ). Thereafter, the flow advances to step S323.

At step S323, the player control module 212 supplies an output attribute described in DynamicInfo( ) (FIG. 13) that is the target DynamicInfo( ) to the graphics process module 219 or the audio output module 221. Thereafter, the flow advances to step S324.

At step S324, the graphics process module 219 or the audio output module 221 starts controlling an output of video data or audio data corresponding to the output attribute, which has been supplied from the player control module 212 at step S323. Thereafter, the flow returns to step S321.

Thus, video data are output corresponding to for example an aspect ratio described as the output attribute (display mode). Alternatively, audio data are output corresponding to for example stereo mode or dual (bilingual) mode described as the output attribute.

Next, with reference to FIG. 42, the output attribute control process will be described in detail.

Figure 42:
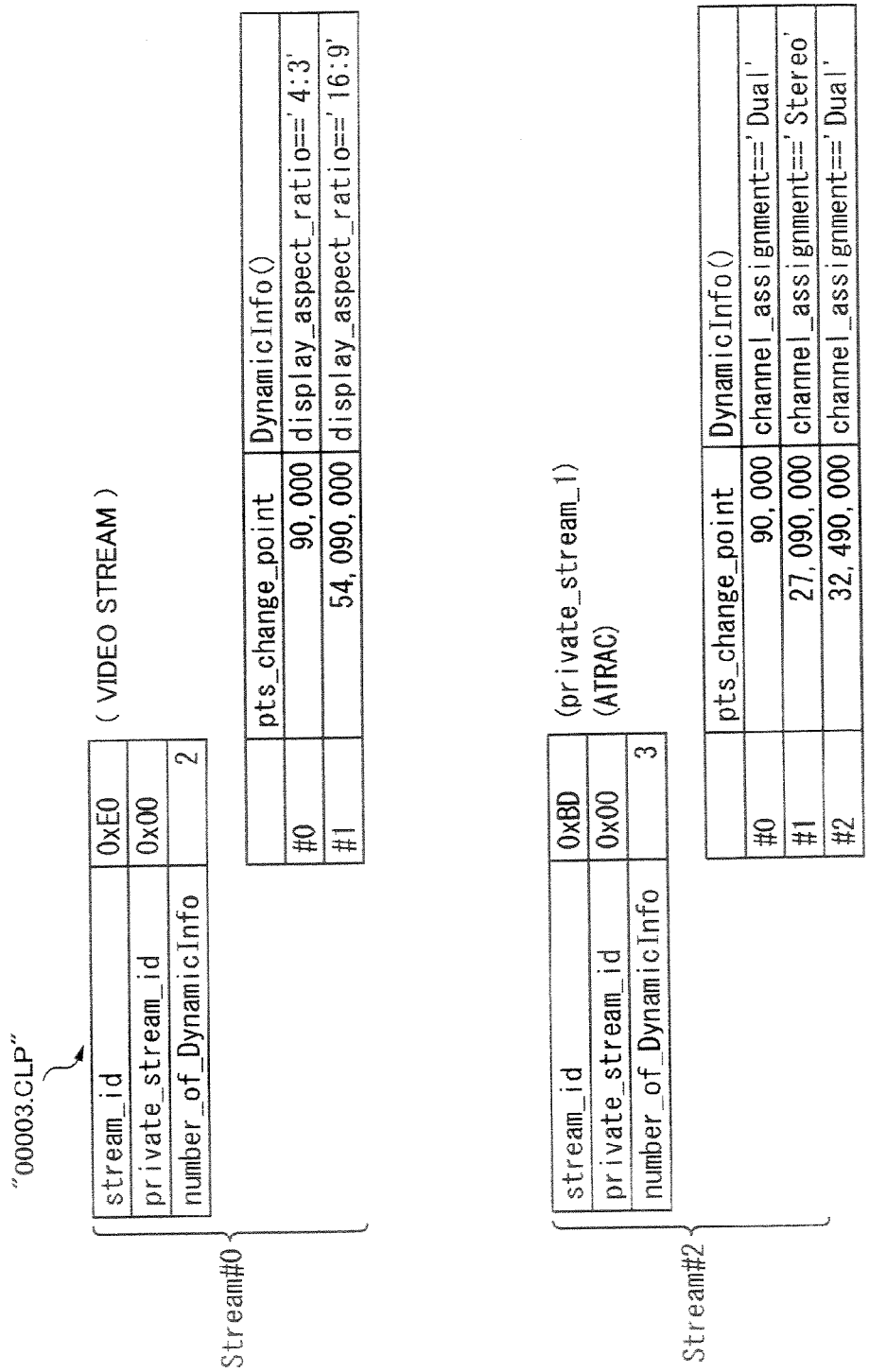
FIG. 42 is a schematic diagram showing a specific example of a set of pts_change_point and DynamicInfo( ) described in a clip information file "00003.CLP"

FIG. 42 shows a pair of pts_change_point and DynamicInfo( ) (FIG. 10) described in the clip information file "00003.CLP" shown in FIG. 26A and FIG. 26B.

As described above, number_of_DynamicInfo's of the video stream stream#0 and the audio stream stream#2, which are the first elementary stream and the third elementary stream of the three elementary streams, stream#0 to stream#2 multiplexed with the clip stream file "00003.PS," are 2 and 3, respectively, in the clip information file "00003.CLP" shown in FIG. 26A and FIG. 26B. Thus, the clip information file "00003.CLP" describes two sets of pts_change_point's and DynamicInfo( )'s for the first video stream stream#0 of the clip stream file "00003.PS" and three sets of pts_change_point's and DynamicInfo( )'s for the third audio stream stream#2 of the clip stream file "00003.PS."

An upper table shown in FIG. 42 shows two sets of pts_change_point's and DynamicInfo( )'s of the first video stream stream#0 of the clip stream file "00003.PS." A lower table shown in FIG. 42 shows three sets of pts_change_point's and DynamicInfo( )'s of the third audio stream stream#2 of the clip stream file "00003.PS."

In addition to the two sets of pts_change_point's and DynamicInfo( )'s of the first video stream stream#0, the upper table shown in FIG. 42 also represents stream_id (=0xE0), private_stream_id (=0x00), and number_of_DynamicInfo (=2) of the clip information file "00003.CLP," shown in FIG. 26A and FIG. 26B, of the first video stream#0. Likewise, in addition to the three sets of pts_change_point's and DynamicInfo( )'s of the third audio stream stream#2, the lower table shown in FIG. 42 also represents stream_id (=0xBD), private_stream_id (=0x00), and number_of_DynamicInfo (=3) of the clip information file "00003.CLP," shown in FIG. 26A and FIG. 26B, of the audio stream stream#2.

In the upper table shown in FIG. 42, pts_change_point of the first set of two sets of pts_change_point's and DynamicInfo( )'s of the video stream stream#0 is 90,000 and display_aspect_ratio (FIG. 13) of DynamicInfo( ) thereof is "4:3." pts_change_point of the second set is 54,090,000 and display_aspect_ratio of DynamicInfo( ) thereof is "16:9."

In the lower table shown in FIG. 42, pts_change_point of the first set of the three sets of pts_change_point's and DynamicInfo( )'s of the audio stream stream#2 is 90,000 and channel_assignment (FIG. 13) of DynamicInfo( ) thereof is "Dual." pts_change_point of the second set is 27,090,000 and channel_assignment of DynamicInfo( ) thereof is "Stereo." pts_change_point of the third set is 32,490,000 and channel_assignment of DynamicInfo( ) thereof is "Dual."

Now, it is assumed that at step S125 shown in FIG. 30, the first video stream stream#0, identified by stream_id that is 0xE0, and the third audio stream stream#2, identified by stream_id that is 0xBD and private_stream_id that is 0x00, have been decided as streams to be reproduced from the clip stream file "00003.PS."

In this case, the player control module 212 checks the two sets of pts_change_point's and is DynamicInfo( )'s in the upper table shown in FIG. 42 for the video stream stream#0, identified by stream_id that is 0xE0, and three sets of pts_change_point's and DynamicInfo( )'s in the lower table shown in FIG. 42 for the audio stream stream#2, identified by stream_id that is 0xBD and private_stream_id that is 0x00, and recognizes an initial value.

In other words, pts_change_point of the first set of the two sets of pts_change_point's and DynamicInfo( )'s in the upper table shown in FIG. 42 for the video stream stream#0, identified by stream_id that is 0xE0, is 90,000. 90,000 matches 90,000 described in presentation_start_time, which represents the start time of the clip stream file "00003.PS" in the clip information file "00003.CLP" shown in FIG. 26A and FIG. 26B corresponding to the clip stream file "00003.PS" with which the video stream stream#0 has been multiplexed.

Likewise, pts_change_point of the first set of the three sets of pts_change_point's and DynamicInfo( )' in the lower table shown in FIG. 42 for the audio stream stream#2, identified by stream_id that is 0xBD and private_stream_id that is 0x00, is 90,000. 90,000 matches 90,000 described in presentation_start_time, which represents the start time of the clip stream file "00003.PS" in the clip information file "00003.CLP"

shown in FIG. 26A and FIG. 26B corresponding to the clip stream file "00003.PS" with which the audio stream stream#2 has been multiplexed.

The player control module 212 recognizes pts_change_point that matches 90,000 described in presentation_start_time, which represents the start time of the clip stream file "00003.PS" as an initial value. Thus, the player control module 212 recognizes pts_change_point of the first set of the two sets of pts_change_point's and DynamicInfo( )'s in the upper table shown in FIG. 42 and pts_change_point of the first set of the three sets of pts_change_point's and DynamicInfo( )'s in the lower table shown in FIG. 42 as initial values.

The player control module 212 designates an output attribute of an elementary stream corresponding to DynamicInfo( ) paired with pts_change_point recognized as an initial value before the clip stream file "00003.PS" is reproduced (at step S126 shown in FIG. 30).

For the video stream stream#0, identified by stream_id that is OXEN, in the upper table shown in FIG. 42, display_aspect_ratio of DynamicInfo( ) paired with pts_change_point, which is 90,000 as an initial value, is "4:3," In this case, the player control module 212 controls the graphics process module 219 with information that represents that display_aspect_ratio is "4:3," namely information about an output attribute that represents that the video stream stream#0 is video data whose aspect ratio is 4:3.

For the audio stream stream#2, identified by stream_id that is 0xBD and private_stream_id that is 0x00, in the lower table shown in FIG. 42, channel_assignment of DynamicInfo( ) paired with pts_change_point, which is 90,000 as an initial value, is "Dual." In this case, the player control module 212 supplies information that represents that channel_assignment is "Dual," namely information about an output attribute that represents that the audio stream stream#2 is dual audio data to the audio output module 221.

At step S126 shown in FIG. 30, the player control module 212 performs the output attribute control process for pts_change_point's as initial values.

Thereafter, the player control module 212 supplies 90,000 and 54,090,000, which are two pts_change_point's for the video stream stream#0 in the upper table shown in FIG. 42 and {27,090,000}, and {32,490,000} of 90,000, 27,090,000, and 32,490,000, which are times of three pts_change_point's except for 90,000, which is an initial value, for the audio stream stream#2 in the lower table shown in FIG. 42 together with information that represents that these times have an attribute of "DynamicInfo( ) process" to the decode control module 214 (at step S320).

The decode control module 214 receives times {27,090,000}; {32,490,000}, and {54,090,000} having an attribute of "DynamicInfo( ) process" from the player control module 212. After starting reproducing the video stream stream#0 and the audio stream stream#2 (PlayItem#0 of the second PlayList#1 that reproduces the clip stream file "00003.PS") the decode control module starts monitoring the current time counted by the time count portion 214A.

When the current time matches one of times {27,090,000}, {32,490,000}, and {54,090,000}, which have an attribute of "DynamicInfo( ) process," the decode control module 214 supplies a DynamicInfo time, which is a time that has an attribute of "DynamicInfo( ) process" and that matches the current time, to the player control module 212 (at step S321).

When the current time became for example 27,090,000, the decode control module 214 supplies 27,090,000, which matches the current time and is one of times having an attribute of "DynamicInfo( ) process" as a DynamicInfo time, to the player control module 212.

The player control module 212 receives 27,090,000, which is a DynamicInfo time, from the is decode control module 214, checks pts_change_point that matches 27,090,000 as a DynamicInfo time from two pts_change_point's for the video stream#0 in the upper table shown in FIG. 42 and three pts_change_point's for the audio stream#2 in the lower table shown in FIG. 42, and recognizes DynamicInfo( ) paired with pts_change_point that matches 27,090,000, namely the second DynamicInfo( ) for the audio stream stream#2 in the lower table shown in FIG. 42 as a target DynamicInfo( ) (at step S322).

When the target DynamicInfo( ) is DynamicInfo( ) of a video stream, the player control module 212 supplies an output attribute described in the target DynamicInfo( ) to the graphics process module 219 (at step S323). When the target DynamicInfo( ) is DynamicInfo( ) of an audio stream, the player control module 212 supplies an output attribute described in the target DynamicInfo( ) to the audio output module 221 (at step S323).

When the graphics process module 219 has received an output attribute from the player control module 212 the graphics process module 219 starts controlling an output of video data corresponding to the output attribute (at step S324).

In other words, the graphics process module 219 converts an aspect ratio of video data that are output to the video output module 220 corresponding to an aspect ratio of video data (display_aspect_ratio (FIG. 13)) represented by an output attribute received from for example the player control module 212 and an aspect ratio of a video output device connected to the video output terminal 120 shown in FIG. 1.

Specifically when the aspect ratio of the video output device is for example 16:9 and the aspect ratio of video data represented by the output attribute is 4:3 the graphics process module 219 performs a squeeze process for video data that are output to the video output module 220 in the horizontal direction and causes the left and right ends of the video data to be black. When the aspect ratio of video data of the video output device is for example 4:3 and the aspect ratio of video data represented by the output attribute is 16:9 the graphics process module 219 performs a squeeze process for the video data that are output to the video output module 220 in the vertical direction and causes the upper and lower ends of the video data to be black. When the aspect ratio of the video output device and the aspect ratio of video data as an output attribute are the same, for example 4:3 or 16:9, the graphics process module 219 outputs the video data to the video output module 220 without performing a squeeze process for the video data.

With two sets of pts_change_point's and DynamicInfo( )'s for the video stream stream#0, identified by stream_id that is 0xE0, in the upper table shown in FIG. 42, video data having an aspect ratio of 4:3 are obtained after time 90,000, which is a reproduction start time of the video stream stream#0, before time 54,090,000. After time 54,090,000 video data having an aspect ratio of 16:9 are obtained.

Thus, assuming that the aspect ratio of the video output device connected to the video output terminal 120 shown in FIG. 1 is 4:3, the graphics process module 219 supplies video data having an aspect ratio of 4:3 obtained from the video stream stream#0 to the video output device whose aspect ratio is 4:3 after time 90,000 before time 54,090,000. The video output device displays the received video data.

After time 54,090,000, the graphics process module 219 performs a squeeze process for video data having an aspect ratio of 16:9 in the vertical direction and causes upper and lower ends of the video data to be black to convert the video data having an aspect ratio of 16:9 into a video signal having an aspect ratio of 4:3. The converted video signal is supplied to the video output device. The video output device displays the converted video data.

When the audio output module 221 receives an output attribute from the player control module 212, the audio output module 221 starts controlling an output of audio data corresponding to the output attribute (at step S324).

In other words, the audio output module 221 processes audio data received from the audio decoder control module 217 corresponding to a channel assignment for audio data (channel_assignment (FIG. 13)) represented by an output attribute received from the player control module 212 and corresponding to an audio output mode supplied from the player control module 212 through the input interface 115 (FIG. 1) that the user operates with the remote controller and outputs the processed audio data to the audio output terminal 121 (FIG. 1).

Specifically, when the channel assignment for audio data represented by the output attribute is a dual (bilingual) mode of which the left channel is "main audio" data and the right channel is "sub audio" data, the audio output module 221 processes the audio data supplied from the audio decoder control module 217 corresponding to the audio output mode supplied from the player control module 212 and outputs the processed audio data to the audio output terminal 121.

In other words, if the "main sound" has been designated as an audio output mode, the audio output module 221 copies the left channel of audio data received from the audio decoder control module 217 as the right channel of audio data and outputs the left and right channel of audio data "main audio" data) to the audio output terminal 121. If "sub audio" has been designated as an audio output mode, the audio output module 221 copies the right channel of audio data received from the audio decoder control module 217 as the left channel and outputs the left and right channel ("sub audio" data) to the audio output terminal 121. If both "main and sub audios" have been designated as an audio output mode, the audio output module 221 directly outputs audio data received from the audio decoder control module 217 to the audio output terminal 121.

If the channel assignment of audio data represented by the output attribute is for example stereo mode, the audio output module 221 directly outputs the audio data received from the audio decoder control module 217 to the audio output terminal 121 regardless of what audio output mode has been designated.

With the three sets of pts_change_point's and DynamicInfo( )'s for the audio stream stream#2, identified by stream_id that is 0xBD and private_stream_id that is 0x00, in the lower table shown in FIG. 42, dual audio data are obtained from the audio stream stream#2 after time 90,000 as the reproduction start time before time 27,090,000. In addition, stereo audio data are obtained from the audio stream stream#2 after time 27,090,000 before time 32,490,000. In addition, dual audio data are obtained from the audio stream stream#2 after time 32,490,000.

Thus, when "main audio" has been designated as an audio output mode, the audio output module 221 copies audio data of the left channel of the dual audio data that are obtained from the audio stream stream#2 after time 90,000 before time 27,090,000 as the right channel of audio data. The left channel and right channel of audio data are output to the audio output terminal 121.

Stereo audio data obtained from the audio stream stream#1 after time 27,090,000 before time 32,490,000 are output to the audio output terminal 121.

The left channel of the dual audio data obtained from the audio stream stream#2 after time 32,490,000 are copied as the right channel of audio data. The left channel and right channel of audio data are output to the audio output terminal 121.

As described above, in the output attribute control process, it is determined whether a reproduction time of an elementary stream that is being reproduced matches pts_change_point corresponding to the clip information file Clip( ) (FIG. 10) that contains n sets of pts_change_point's that represent a reproduction time of each elementary stream multiplexed with a clip stream file and DynamicInfo( )'s that represents an output attribute of the elementary stream (where n is 0 or larger any integer). When the reproduction time of an elementary stream that is being reproduced matches pts_change_point, DynamicInfo( ) paired with pts_change_point is recognized. The output of the elementary stream that is being reproduced is controlled corresponding to the output attribute described in DynamicInfo( ). Thus, the output of the elementary stream can be controlled corresponding to the reproduction time of the elementary stream and the output attribute.

[Subtitle Display Control Process]

Next with reference to a flow chart shown in FIG. 43, a subtitle display control process that controls the display of subtitle data corresponding to a subtitle stream will be described.

When the reproduction of PlayList( ) (FIG. 5) (PlayList( ) thereof) is started, the player control module 212 initializes a subtitle data display mode for the graphics process module 219 at step S341. In other words, the player control module 212 controls the graphics process module 219 to change the subtitle data display mode to the default display mode. The initialization of the display mode performed at step S341 corresponds to the initialization of the display mode performed at step S127 shown in FIG. 30.

After step S341, the flow advances to step S342. At step S342, the player control module 212 determines whether the user has input a new subtitle data display mode command to the input interface 115 through the remote controller.

When the determined result at step S342 represents that a new display mode command has been input, the flow advances to step S343. At step S343, the player control module 212 determines whether a subtitle stream (subtitle data corresponding thereto) is being reproduced.

When the determined result at step S343 represents that a subtitle stream is not being reproduced, the flow returns to step S342.

In contrast, when the determined result at step S343 represents that a subtitle stream is being reproduced, the flow advances to step S345. At step S345, the player control module 212 determines whether the new display mode command is the default display mode commands. When the determined result at step S343 represents that the new display mode command is the default display mode command, the flow returns to step S341. At step S341, as described above, the player control module 212 controls the graphics process module 219 to change the subtitle data display mode to the default display mode.

In contrast, when the determined result at step S345 represents that the new display mode command is not the default display mode command, namely the new display mode command is a non-default display mode command for example a subtitle data enlargement command, a subtitle data reduction command, or a brightness increase command, the flow advances to step S346. At step S346, the player control module 212 obtains StaticInfo( ) of the subtitle stream, which is being reproduced, of StaticInfo( )'s (FIG. 12) of the clip information file Clip( ) (FIG. 10) corresponding to the clip stream file with which the subtitle stream that is being reproduced is multiplexed. Thereafter, the flow advances to step S347.

At step S347, the player control module 212 determines configurable_flag of StaticInfo( ) obtained at step S346.

When the determined result at step S347 represents that configurable_flag is 0, which represents that the subtitle data display mode is not permitted to be changed, the flow advances to step S348. At step S348, the player control module 212 controls the graphics process module 219 to overlay output video data with a message that represents that the subtitle data display mode cannot be changed. Thereafter, the flow returns to step S342. At step S342, the error message is displayed.

In contrast, when the determined result at step S347 represents that configurable_flag is 1, which represents that the subtitle data display mode is permitted to be changed, the flow advances to step S349. At step S349, the player control module 212 supplies the new display mode command, which has been input from the remote controller by the user through the input interface 115, to the graphics process module 219. Thereafter, the flow advance to step S350.

At step S350, the graphics process module 219 starts performing an enlargement process, a reduction process, or a brightness change process for the subtitle data supplied from the subtitle decoder control module 218 corresponding to the display mode command which has been supplied from the player control module 212 at step S349. Thereafter, the flow returns to step S342. Thus, the subtitle data are displayed in the display size, at the display position, or in the display colors corresponding to the display mode command that has been input by the user through the remote controller.

In contrast, when the determined result at step S342 represents that the new display mode command has not been input, the flow advances to step S351. At step S351, the player control module 212 determines whether PlayItem( )'s have been changed as described in FIG. 31. When the determined result at step S342 represents that PlayItem( )'s have not been changed, the flow returns to step S342.

In contrast, when the determined result at step S351 represents that PlayItem( )'s have been changed, the flow returns to step S341. At step S341, as was described above, the player control module 212 controls the graphics process module 219 to change the subtitle data display mode to the default display mode. In other words, when PlayItem( )'s have been changed, the subtitle data display mode is restored to the default display mode.

As was described above, only when configurable_flag of the subtitle stream is 1, which represents that the display mode is permitted to be changed, the subtitle data display mode for the subtitle stream can be changed corresponding to a display mode command that is input by the user through the remote controller.

Thus, for example in the clip information file "00001.CLP" shown in FIG. 26A and FIG. 26B, since configurable_flag of the subtitle stream stream#2 which is the third elementary stream of four elementary streams multiplexed with the clip stream file "00001.PS," is 0, which represents that the display mode is not permitted to be changed, while the subtitle stream stream#2 is being displayed, even if the user operates the remote controller to change the subtitle display mode, the display mode is not changed.

In contrast, since configurable_flag of the subtitle stream stream#3, which is the fourth elementary stream of four elementary streams multiplexed with the clip stream file "00001.PS," is 1, which represents that the display mode is permitted to be changed, while the subtitle stream stream#3 is being displayed, when the user operates the remote controller to change the subtitle display mode, the display size of the subtitle is changed.

Now, it is assumed that the clip stream file "00001.PS" is being reproduced corresponding to the first PlayItem#1 of the first PlayList#1 shown in FIG. 25. In addition, in the clip information file "00001.CLP" described in FIG. 26A and FIG. 26B, it is assumed that the third and fourth elementary streams of four elementary streams multiplexed with the clip stream file "00001.PS" are subtitle streams and that the third subtitle stream stream#2 of the third and fourth subtitle streams stream#2 and stream#3 is being reproduced.

When the user operates the remote controller to input a subtitle display mode command (at step S342), the display mode command is supplied from the input interface 115 (FIG. 1) to the player control module 212. When the player control module 212 receives the display mode command, the player control module 212 searches the clip information file for StaticInfo( ) (FIG. 10) corresponding to the subtitle stream that is being reproduced (at step S346).

In other words the subtitle stream that is being reproduced is the third subtitle stream stream#2 multiplexed with the clip stream file "00001.PS." The player control module 212 searches the corresponding clip information file "00001.CLP" for StaticInfo( ) of the third subtitle stream stream#2.

In addition, the player control module 212 determines configurable_flag, which is 0, described in StaticInfo of the third subtitle stream stream#2 shown in FIG. 26A and FIG. 26B (at step S3471). Thus, the player control module 212 recognizes that the display mode of the third subtitle stream stream#2 is not permitted to be changed.

In this case, the player control module 212 determines that the subtitle stream (subtitle data corresponding thereto) that is being reproduced does not correspond to enlargement and reduction modes and controls the graphics process module 219 to generate a corresponding error message (at step S348), overlays the error message with video data, and outputs the overlaid video data.

While the fourth subtitle stream stream#3 of the third and fourth subtitle streams stream#2 and stream#3 of the four elementary streams multiplexed with the clip stream file "00001.PS" is being reproduced, when the player control module 212 receives a display mode command that has been input by the user through the remote controller, the player control module 212 searches the corresponding clip information file "00001.CLP" for StaticInfo( ) of the fourth subtitle stream stream#3.

The player control module 212 determines configurable_flag, which is 1, described in StaticInfo( ) of the fourth subtitle stream stream#3 shown in FIG. 26A and FIG. 26B (at step S347). Thus, the player control module 212 recognizes that the display mode of the fourth subtitle stream stream#3 has been permitted to be changed.

In this case, the player control module 212 determines that subtitle stream (subtitle data corresponding thereto) that is being reproduced corresponds to an enlargement mode or a reduction mode and supplies the display mode command that has been input by the user through the remote controller to the graphics process module 219 (at step S349).

Thus, the graphics process module 219 for example enlarges or reduces subtitle data received from the subtitle decoder control module 218 corresponding to the display mode command received from the player control module 212, overlays the resultant subtitle data with video data supplied from the video decoder control module 212, and outputs the overlaid data.

When the player control module 212 starts reproducing the first PlayItem( ) of PlayList( ), the player control module 212 initializes the subtitle data display mode for the graphics process module 219 (at step S341). In other words the player control module 212 controls the graphics process module 219 to change the subtitle data display mode to the default display mode.

When PlayItem( )'s are changed, the player control module 212 initializes the subtitle data display mode for the graphics process module 219 (at steps S341 and S351).

When PlayItem( )'s are changed the player control module 212 checks configurable_flag for a new subtitle stream to be reproduced corresponding to PlayItem( ) that is newly reproduced. When configurable_flag is 0, the player control module 212 initializes the subtitle data display mode for the graphics process module 219. When configurable_flag is 1 the player control module 212 causes the graphics process module 219 to keep the display mode for PlayItem( ).

Figure 43:
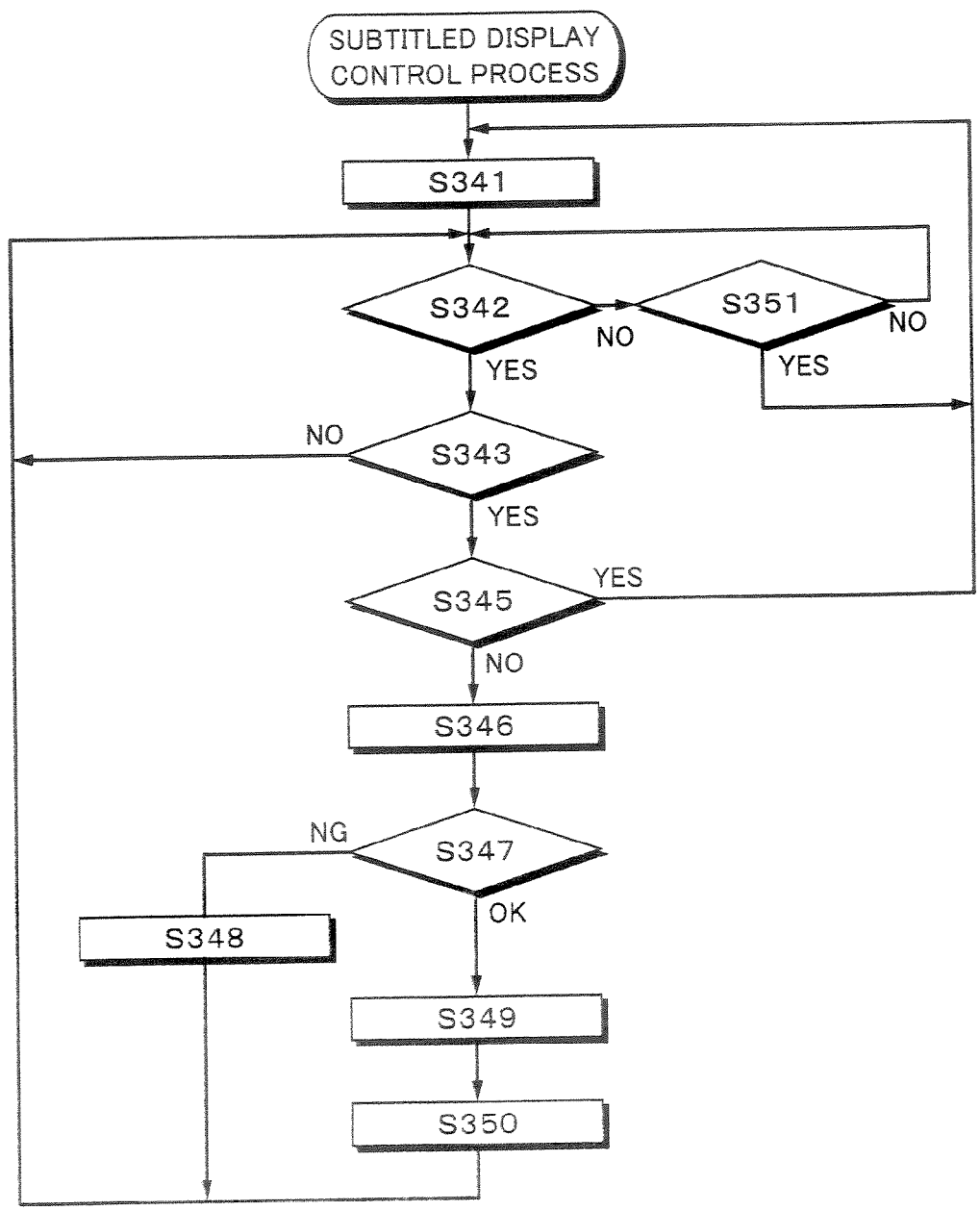
FIG. 43 is a flow chart describing a subtitle display control process.

In the subtitle display control process shown in FIG. 43, when a new display mode command is input by the user through the remote controller, the new display mode command is supplied to the graphics process module 219 (at step S349). The display mode command may be stored in for example a non-volatile memory that composes the memory 113 (FIG. 1). The display mode command stored in the non-volatile memory may be supplied to the graphics process module 219.

Assuming that a display mode command that the user has set is stored in the non-volatile memory as an initial setting of the disc device shown in FIG. 1, when the user inputs a new display mode command with the remote controller, the display mode command stored in the nonvolatile memory is replaced with the new display mode command and the new display mode command stored in the non-volatile memory is supplied to the graphics process module 219. In this case, since the non-volatile memory stores the display mode command that has been set upon completion of the last reproduction, when the next PlayList( ) is reproduced the subtitle data are displayed with the display mode command without need to input the display command through the remote controller.

In this case, it is assumed that the display mode command stored in the nonvolatile memory includes for example an enlargement rate or a reduction rate at which a subtitle stream is enlarged or reduced.

As was described above, in the subtitle display control process, it is determined whether the subtitle data display mode is permitted to be changed from the default display mode corresponding to configurable_flag contained in StaticInfo( ) for subtitle data that are not changed while elementary streams contained in the clip information file Clip( ) (FIG. 10) are being reproduced. When the default display mode of the subtitle data that are being reproduced is permitted to be changed, a display process for example an enlargement process, a reduction process, or a color change process for subtitle data is performed. Thus, the subtitle data display mode can be controlled

[Capture Control Process]

Figure 44:
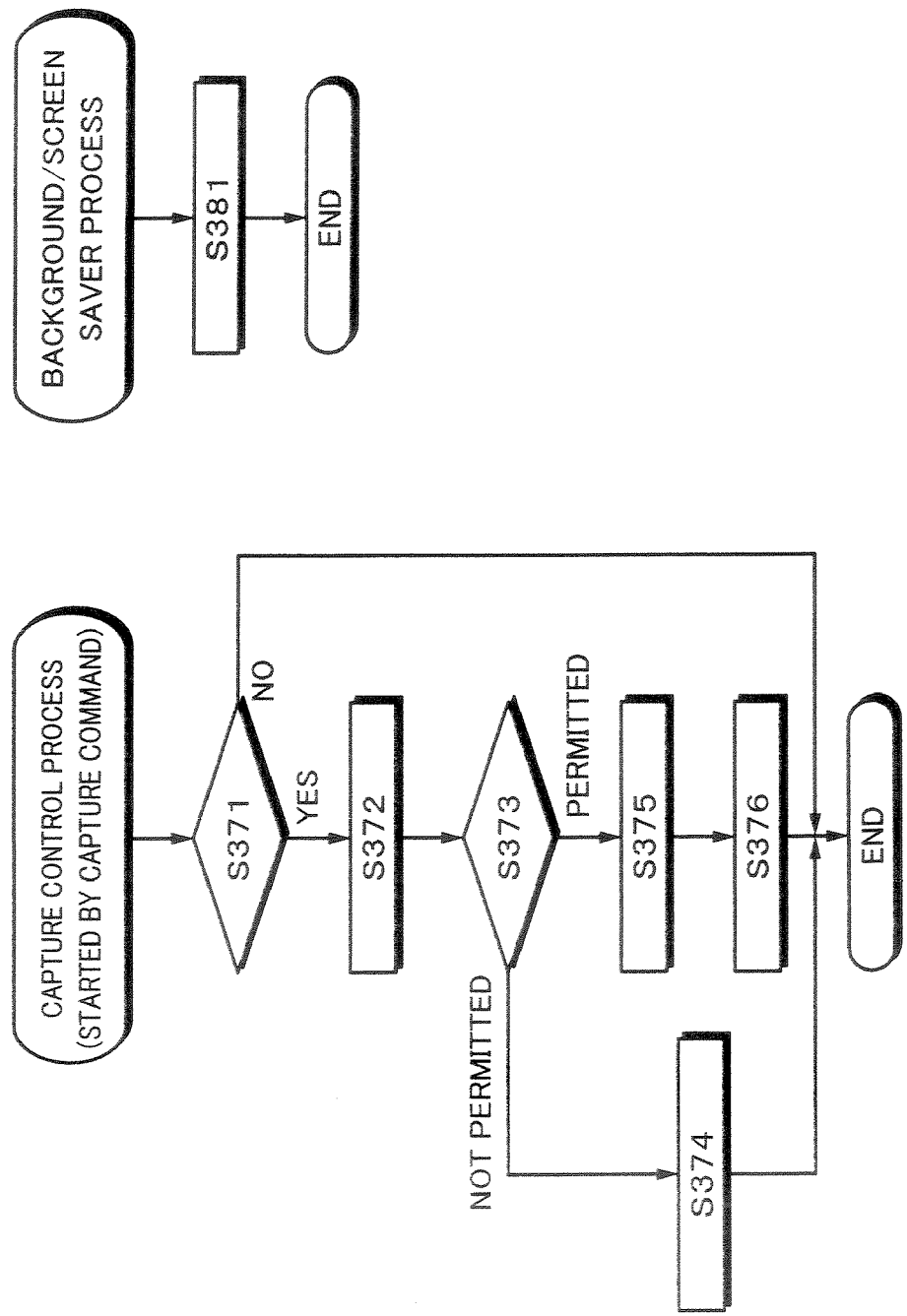
FIG. 44 is a flow chart describing a capture control process and a background/screen saver process.

Next, with reference to a flow chart shown in FIG. 44, a capture control process that controls capturing of video data corresponding to a video stream will be described. FIG. 44 also shows a flow chart that describes a background/screen saver process that secondarily uses video data that have been captured in the capture control process.

When a video data capture command is input by the user from the remote controller through the input interface 115 (FIG. 1) to the player control module 212, the capture control process is started.

In other words, in the capture control process at step S371, the player control module 212 determines whether a video stream is being reproduced. When the determined result at step S371 represents that a video stream is not being reproduced, the player control module 212 completes the capture control process.

In contrast, when the determined result at step S371 represents that a video stream is being reproduced, the flow advances to step S372. The player control module 212 obtains capture_enable_flag_PlayList from PlayList( ) (FIG. 5) corresponding to the video stream that is being reproduced and capture_enable_flag_Clip from the clip information file Clip( ) (FIG. 10) corresponding to the video stream that is being reproduced.

As was described in FIG. 5, capture_enable_flag_PlayList of PlayList( ) represents whether video data (video data contained in PlayList( )) corresponding to a video stream reproduced corresponding to PlayList( ) is permitted to be secondarily used. On the other hand, as was described in FIG. 10, capture_enable_flag_Clip of the clip information file Clip( ) represents whether video data corresponding to the video stream stored in a clip stream file corresponding to the clip information file Clip( ) is permitted to be secondarily used.

After step S372, the flow advances to step S373. The player control module 212 determines whether a picture of video data that are being reproduced when the capture command is input from the input interface 115 (FIG. 1) is permitted to be captured corresponding to capture_enable_flag_PlayList and capture_enable_flag_Clip, which have been obtained at step S373.

When the determined result at step S373 represents that a picture of video data that is being reproduced when the capture command is input from the input interface 115 is not permitted to be captured, namely at least one of capture_enable_flag_PlayList and capture_enable_flag_Clip obtained at step S373 is 0, which represents that video data are not permitted to be secondarily used, the flow advances to step S374. At step S374, the player control module 212 controls the graphics process module 219 to overlay an error message that represents that video data are not permitted to be captured with video data and completes the capture control process. As a result, the error message is displayed.

In contrast, when the determined result at step S373 represents that a picture of video data that is being reproduced when the capture command is input from the input interface 115 is permitted to be captured, namely both capture_enable_flag_PlayList and capture_enable_flag_Clip that have been obtained at step S373 are 1, which represents that video data are permitted to be secondarily used, the flow advances to step S375. At step S375, the player control module 212 supplies the capture command for the video data that are being reproduced when the capture command is input from the input interface 115 to the graphics process module 219. Thereafter, the flow advances to step S375.

At step S376, the graphics process module 219 captures a picture of video data from the video decoder control module 216 corresponding to the capture command received from the player control module 212, stores the picture in the memory 113 (FIG. 1), and completes the capture control process. When capture_enable_flag is composed of a plurality of bits and their use conditions are designated, at this point, a corresponding operation is performed. In other words, when the size of a capture picture is restricted a picture whose size is reduced is captured. When an application that is used is restricted a flag that represents the restriction is also recorded.

As described above, in the capture control process, capture_enable_flag_PlayList's and capture_enable_flag_Clip's of PlayList( ) (FIG. 5) and the clip information file Clip( ) (FIG. 101) corresponding to a video stream that is being reproduced when the user inputs the capture command and are ANDed. When the ANDed result is 1, namely both capture_enable_flag_PlayList's and capture_enable_flag_Clip's are 1, which represents that video data are permitted to be secondarily used, it is determined that video data can be secondarily used. As a result, the video data are captured.

When a video stream is reproduced corresponding to the first PlayItem#0 of the first PlayList# shown in FIG. 25, namely a video stream multiplexed with the clip stream file "00001.PS" is being reproduced, if the user inputs the capture command, since capture_enable_flag_PlayList of the first PlayList#0 is 1 and capture_enable_flag_Clip of the clip information file "00001.CLP" shown in FIG. 26A and FIG. 26B, corresponding to the clip stream file "00001.PS" reproduced by the first PlayItem#0 is 1, it is determined that video data that are being reproduced (video data corresponding to a video stream multiplexed with the clip stream file "00001.PS") can be secondarily used and the video data are captured.

While a video stream is being reproduced corresponding to the second PlayItem#1 of the first PlayList#0 shown in FIG. 25, namely a video stream multiplexed with the clip stream file "00002.PS" is being reproduced, when the user inputs the capture command, since capture_enable_flag_PlayList of the first PlayList#0 is 1 and capture_enable_flag_Clip of the clip information file "00002.CLP," shown in FIG. 26A and FIG. 26B, corresponding to the clip stream file "00002.PS" represented corresponding to the second PlayItem#1 is 0, it is determined that video data that are being reproduced (video data corresponding to a video stream multiplexed with the clip stream file "00002.PS") cannot be secondarily used and the video data are not captured.

While a video stream is being reproduced corresponding to PlayItem#0 of the second PlayList#1 shown in FIG. 25, namely a video stream multiplexed with the clip stream file "00003.PS" is being reproduced, when the user inputs the capture command, since capture_enable_flag_PlayList of the second PlayList#1 is 0 and capture_enable_flag_Clip of the clip information file "00003.CLP" shown in FIG. 26A and FIG. 26B corresponding to the clip stream file "00003.PS" reproduced corresponding to PlayItem#0 of the second PlayList#1 is 1, it is determined that video data that are being reproduced (video data corresponding to a video stream multiplexed with the clip stream file "00003.PS") is not permitted to be secondarily used. Thus the video data are not captured.

In this case, when it has been checked that capture_enable_flag_PlayList of the second PlayList#1 is 0, it can be determined that the video data are not permitted to be secondarily used. Thus checking of capture_enable_flag_Clip of the clip information file "00003.CLP" shown in FIG. 26A and FIG. 26B, corresponding to the clip stream file "00003.PS" reproduced corresponding to PlayItem#0 of the second PlayList#1 can be omitted.

A picture captured in the capture control process and stored in the memory 113 can be secondarily used in the background/screen saver process.

The background/screen saver process is performed for example while the player control module 212 is operating, but an elementary stream is not being reproduced, namely the disc 101 has not been inserted into the disc drive 102 (FIG. 1) or an elementary stream has been already reproduced.

In the background/screen saver process, at step S381, the player control module 212 controls the graphics process module 219 to display a picture that has been stored in the memory 113 in the capture control process. The graphics process module 219 displays a picture that has been stored in the memory 113 in the capture control process under the control of the player control module 212.

When the graphics process module 219 displays a picture stored in the memory 113 as a still picture, so-called wall paper (background) is accomplished. When a picture is displayed while it is being enlarged, reduced, and moved, a screen saver is accomplished. The background/screen saver process that displays a picture stored in the memory 113 in the capture control process can be performed by another independent application rather than the player control module 212.

When a flag that represents a restriction is added to a picture stored in the memory 113, the picture that is displayed is restricted corresponding to the flag.

As described above, capture_enable_flag_PlayList and capture_enable_flag_Clip, which represent whether video data being reproduced are permitted to be secondarily used, are obtained corresponding to for example PlayList( ) or PlayItem( ) which is larger than a video access unit. Corresponding to capture_enable_flag_PlayList and capture_enable_flag_Clip, it is determined whether video data that are being reproduced are permitted to be secondarily used. When the determined result represents that video data that are being reproduced are permitted to be secondarily used, the video data that are being reproduced are captured and the background/screen saver process using the captured video data is executed. Thus, the secondary use of the video data can be controlled.

In the capture control process shown in FIG. 44, PlayList( ) (FIG. 5) contains capture_enable_flag_PlayList and clip information file (FIG. 10) corresponding to a clip stream file reproduced by PlayItem( ) contains capture_enable_flag_Clip. With both capture_enable_flag_PlayList and capture_enable_flag_Clip, it is determined whether video data are permitted to be secondarily used. Alternatively, when PlayList( ) (FIG. 5) that contains capture_enable_flag_PlayList and the clip information file Clip( ) (FIG. 10) corresponding to a clip stream file reproduced by PlayItem( ) that contains capture_enable_flag_Clip, with either capture_enable_flag_PlayList or capture_enable_flag_Clip, it can be determined whether video data are permitted to be secondarily used.

In the capture control process shown in FIG. 44, at step S376, the graphics process module 219 captures only one picture of video data from the video decoder control module 216 corresponding to a capture command received from the player control module 212. Alternatively the graphics process module 219 may capture a plurality of pictures from the video decoder control module 216. In other words, a plurality of pictures (a series of a plurality of pictures as a moving picture) that the video decoder control module 216 outputs can be captured. In this case, the number of pictures captured at a time can be pre-designated. Alternatively, bits of capture_enable_flag_PlayList and capture_enable_flag_Clip can be extended for information that represents the number of pictures that can be captured at a time.

In the foregoing case, use permission information that represents whether video data are permitted to be secondarily used, which are capture_enable_flag_PlayList and capture_enable_flag_Clip, is described in PlayList( ) and clip information file Clip( ). With the use permission information, it is determined whether entire video data reproduced corresponding to PlayList( ) and entire video data corresponding to a video stream multiplexed with a clip stream file corresponding to the clip information file flip( ) are permitted to be secondarily used. The use permission information car describe video data of any unit. With the use permission information, it can be determined whether video data in any unit are permitted to be secondarily used.

FIG. 45 shows the syntax of private_stream2_PES_payload( ) that contains use permission information. FIG. 46 shows the syntax of au_information( ) that contains use permission information.

private_stream2_PES_payload) shown in FIG. 45 is the same as that shown in FIG. 23 except that the video_stream_id is immediately preceded by capture_enable_flag_ps2 as use permission information. Likewise, au_information( ) shown in FIG. 46 is the same as that shown in FIG. 24 except that pic_struct_copy is immediately preceded by capture_enable_flag_AU as use permission information.

capture_enable_flag_ps2 contained in private_stream2_PES_payload( ) shown in FIG. 45 represents whether video data of a video stream after PES_packet( ) of private_stream_2 that contains private_stream2_PES_payload( ) before PBS_packet( ) of the next private_stream_2 are permitted to be secondarily used. Thus, with capture_enable_flag_ps2 contained in private_stream2_PES_payload( ) shown in FIG. 45, it can be determined whether video data after a particular decode startable point before the next decode startable point are permitted to be secondarily used.

In addition, capture_enable_flag_AU contained in au_information( ) shown in FIG. 46 represents whether video data in each video access unit corresponding to capture_enable_flag_AU are permitted to be secondarily used. Thus, with capture_enable_flag_AU contained in au_information( ) shown in FIG. 46, it can be determined whether video data in each video access unit, namely in each picture, are permitted to be secondarily used.

At least two of capture_enable_flag_PlayList as use permission information of PlayList( ) (FIG. 5), capture_enable_flag_Clip as use permission information of the clip information file Clip( ) (FIG. 10), capture_enable_flag_ps2 as use permission information of private_stream2_PES_payload( ) (FIG. 45), and capture_enable_flag_AU as use permission information of au_information( ) (FIG. 46) can be simultaneously used. In this case, with the result of which at least two of them as use permission information are ANDed, it can be determined whether a picture of video data is permitted to be secondarily used.

Figure 36:
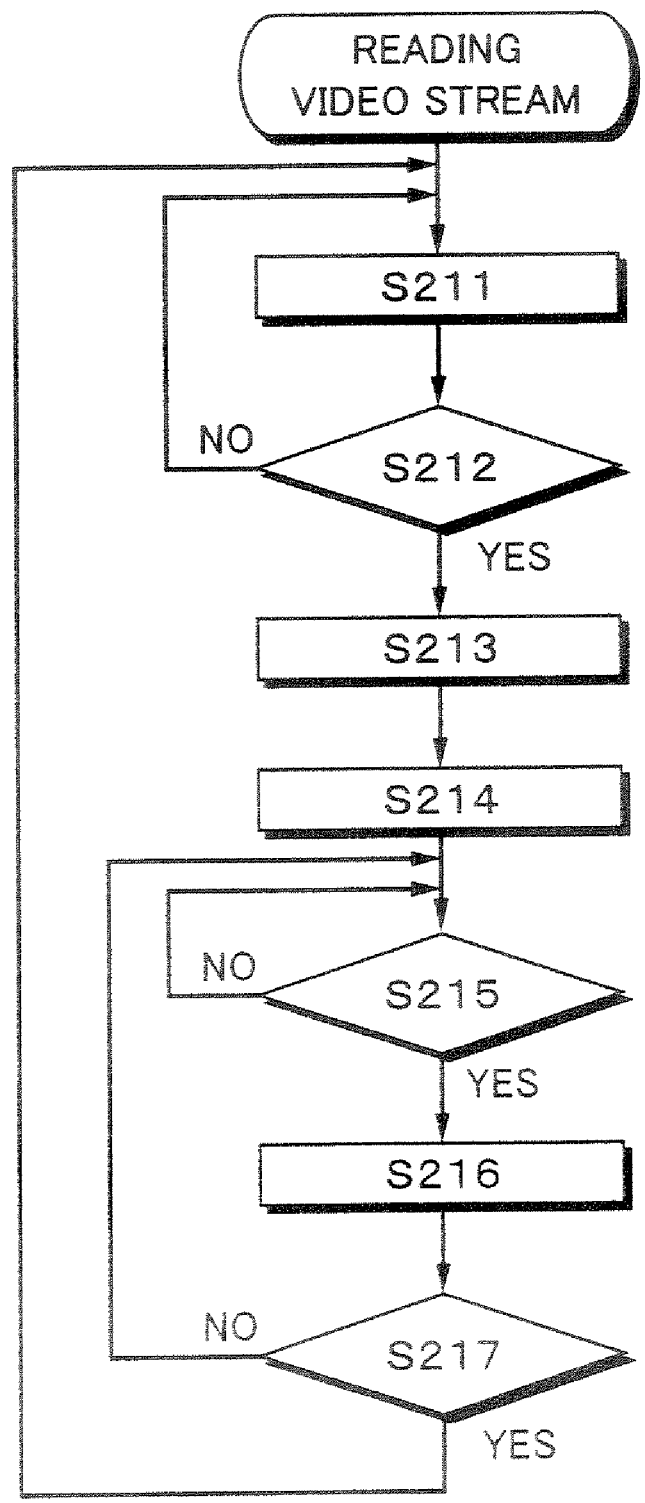
FIG. 36 is a flow chart describing a video stream; read process.

As described at step S211 shown in FIG. 36, the video read function portion 233 of the buffer control module 215 (FIG. 3) searches a program stream stored in the buffer 215A for PES_packet( ) of private_stream_2 that contains private_stream2_PES_payload( ), shown in FIG. 23 or FIG. 45, which contains au_information( ) shown in FIG. 46. Thus, when private_stream2_PES_payload( ), shown in FIG. 45, which contains capture_enable_flag_ps2, and au_information), shown in FIG. 46, which contains capture_enable_flag_AU, are used, the player control module 212 needs to ask the video read function portion 233 for capture_enable_flag_ps2 and capture_enable_flag_AU to determine whether video data are permitted to be secondarily used.

According to the foregoing embodiment, the sequence of processes are performed by software. Alternatively, these processes may be performed by dedicated hardware.

In addition, according to the embodiment, the video decoder 116 (FIG. 1) is a hardware decoder. Alternatively, the video decoder 116 may be a software decoder. This relation applies to the audio decoder 117 (FIG. 1).

In addition, according to the embodiment, the subtitle decoder is a software decoder. Alternatively, the subtitle decoder may be a hardware decoder.

The invention claimed is:

1. A data processing apparatus that processes encoded data, the encoded data containing:
   encoded video data obtained by encoding video data every a predetermined unit that is an access unit,
   output data that are output in synchronization with the video data, and
   utilization information immediately followed by at least one decode startable point of the encoded video data and utilized for decoding the encoded video data,
   the utilization information containing reference information that represents whether video data corresponding to the encoded video data of at least one access unit that are present from the utilization information to the next utilization information are referenced when other encoded video data are decoded,
   the data processing apparatus comprising:
   first determination means for determining whether an output of the video data is later than an output of the output data;
   command means for causing a process for one access unit of the encoded video data to be skipped when the determined result of the first determination means represents that the output of the video data is later than the output of the output data;
   second determination means for determining whether the video data are referenced when other encoded video data are decoded corresponding to the reference information of the encoded video of the access unit whose process has been caused to be skipped by the command means; and
   skip control means for skipping the process of the encoded video data of the access unit whose process has been caused to be skipped by the command means when the second determination means has determined that video data corresponding to the encoded video data of the access unit whose process has been caused to be skipped by the command means are not referenced when the other encoded data are decoded.

2. The data processing apparatus as set forth in claim 1, further comprising:
   output control means for continuously outputting the video data when the first determination means has determined that the output of the output data is later than the output of the video data.

3. A data processing method of processing encoded data, the encoded data containing:
   encoded video data obtained by encoding video data every a predetermined unit that is an access unit,
   output data that are output in synchronization with the video data, and
   utilization information immediately followed by at least one decode startable point of the encoded video data and utilized for decoding the encoded video data,
   the utilization information containing reference information that represents whether video data corresponding to the encoded video data of at least one access unit that are present from the utilization information to the next utilization information are referenced when other encoded video data are decoded,
   the data processing method comprising the steps of:
   determining whether an output of the video data is later than an output of the output data;
   causing a process for the encoded video data of one access unit to be skipped when the determined result at the first determination step represents that the output of the video data is later than the output of the output data;

determining whether the video data are referenced when other encoded video data are decoded corresponding to the reference information of the encoded video of the access unit whose process has been caused to be skipped at the command step; and skipping the process of the encoded video data of the access unit whose process has been caused to be skipped at the command step when it has been determined at the second determination step that video data corresponding to the encoded video data of the access unit whose process has been caused to be skipped at the command step are not referenced when the other encoded video data are decoded.

4. A non-transitory recording medium on which a program has been recorded, the program causing a computer to execute a data process of processing encoded data, the encoded data containing:

encoded video data obtained by encoding video data every a predetermined unit that is an access unit, output data that are output in synchronization with the video data, and utilization information immediately followed by at least one decode startable point of the encoded video data and utilized for decoding the encoded video data, the utilization information containing reference information that represents whether video data corresponding to the encoded video data of at least one access unit that are present from the utilization information to the next utilization information are referenced when other encoded video data are decoded, the program comprising the steps of:

determining whether an output of the video data is later than an output of the output data;

causing a process for the encoded video data of one access unit to be skipped when the determined result at the first determination step represents that the output of the video data is later than the output of the output data;

determining whether the video data are referenced when other encoded video data are decoded corresponding to the reference information of the encoded video of the access unit whose process has been caused to be skipped at the command step; and skipping the process of the encoded video data of the access unit whose process has been caused to be skipped at the command step when it has been determined at the second determination step that video data corresponding to the encoded video data of the access unit whose process has been caused to be skipped at the command step are not referenced when the other encoded video data are decoded.

5. A method of recording encoded data onto a non-transitory recording medium, the method comprising: recording, onto the non-transitory recording medium, encoded data including: encoded video data obtained by encoding video data every a predetermined unit that is an access unit, output data that is output in synchronization with the video data, and utilization information immediately followed by at least one decode startable point of the encoded video data and utilized for decoding the encoded video data, wherein the utilization information contains reference information that represents whether video data corresponding to the encoded video data of at least one access unit that are present from the utilization information to the next information are referenced when other encoded video data are decoded.

6. A data processing apparatus that processes encoded data, the encoded data containing:

encoded video data obtained by encoding video data every a predetermined unit that is an access unit, output data that are output in synchronization with the video data, and utilization information immediately followed by at least one decode startable point of the encoded video data and utilized for decoding the encoded video data, the utilization information containing reference information that represents whether video data corresponding to the encoded video data of at least one access unit that are present from the utilization information to the next utilization information are referenced when other encoded video data are decoded, the data processing apparatus comprising:

a processor configured to:

determine whether an output of the video data is later than an output of the output data;

cause a process for one access unit of the encoded video data to be skipped when a result of the determining represents that the output of the video data is later than the output of the output data;

determine whether the video data are referenced when other encoded video data are decoded corresponding to the reference information of the encoded video of the access unit whose process has been caused to be skipped; and skip the process of the encoded video data of the access unit whose process has been caused to be skipped when it is determined that video data corresponding to the encoded video data of the access unit whose process has been caused to be skipped are not referenced when the other encoded data are decoded.

* * * * *